(12) United States Patent
Nishihara et al.

(10) Patent No.: US 7,449,225 B2
(45) Date of Patent: Nov. 11, 2008

(54) INFORMATION RECORDING MEDIUM AND METHOD FOR MANUFACTURING THE SAME

(75) Inventors: Takashi Nishihara, Hirakata (JP); Rie Kojima, Kadoma (JP); Noboru Yamada, Hirakata (JP); Takeshi Sakaguchi, Ibaraki (JP)

(73) Assignee: Panasonic Corporation, Osaka (JP)

( * ) Notice: Subject to any disclaimer, the term of this patent is extended or adjusted under 35 U.S.C. 154(b) by 428 days.

(21) Appl. No.: 10/527,354

(22) PCT Filed: Sep. 12, 2003

(86) PCT No.: PCT/JP03/11680

§ 371 (c)(1),
(2), (4) Date: Mar. 10, 2005

(87) PCT Pub. No.: WO2004/025640

PCT Pub. Date: Mar. 25, 2004

(65) Prior Publication Data

US 2006/0044991 A1 Mar. 2, 2006

(30) Foreign Application Priority Data

Sep. 13, 2002 (JP) ............................. 2002-268537
Sep. 18, 2002 (JP) ............................. 2002-271121

(51) Int. Cl.
*B32B 3/02* (2006.01)

(52) U.S. Cl. .................... 428/64.4; 428/64.5; 428/64.6; 430/270.13

(58) Field of Classification Search ................ 428/64.1, 428/64.4, 64.5; 430/270.13
See application file for complete search history.

(56) References Cited

U.S. PATENT DOCUMENTS

| | | | |
|---|---|---|---|
| 5,221,588 A * | 6/1993 | Morimoto et al. ............. 430/19 |
| 5,591,501 A | 1/1997 | Ovshinsky et al. | |
| 6,268,034 B1 * | 7/2001 | Kitaura et al. ............. 428/64.1 |
| 6,416,837 B1 * | 7/2002 | Kojima et al. ............. 428/64.1 |
| 6,432,502 B1 * | 8/2002 | Kitaura et al. ............. 428/64.1 |
| 6,456,584 B1 | 9/2002 | Nagata et al. | |
| 6,670,013 B2 * | 12/2003 | Zhou ......................... 428/64.1 |
| 6,670,014 B2 * | 12/2003 | Nishihara et al. ........... 428/64.1 |
| 6,699,637 B2 * | 3/2004 | Ogawa et al. ........... 430/270.13 |
| 6,723,411 B2 * | 4/2004 | Hirotsune et al. ........... 428/64.1 |
| 2002/0160306 A1 * | 10/2002 | Hanaoka et al. ......... 430/270.13 |

FOREIGN PATENT DOCUMENTS

| | | |
|---|---|---|
| EP | 0 825 595 | 3/1997 |
| EP | 1 039 448 | 9/2000 |
| JP | 10-275360 | 10/1998 |
| JP | 2000-36130 | 2/2000 |
| JP | 2001-273673 | 10/2001 |
| JP | 2002-2116 | 1/2002 |
| JP | 2002-123977 | 4/2002 |
| JP | 2002-225436 | 8/2002 |
| JP | 2003-288737 | 10/2003 |
| WO | WO 97/34298 | 9/1997 |
| WO | WO 01/82297 | 11/2001 |

OTHER PUBLICATIONS

Tsunoda et al. "Basics and Applications of Optical Disc Storage", *The Institute of Electronics, Information and Communication Engineers*, Chapter 2, (1995) with partial English translation.
Morigaki et al. *Basics of Amorphous Semiconductor*, Chapter 8. Kikuchi et al. (Ed.) (1982) with partial English translation.
Yamada et al. "Phase-change optical disk having a nitride interface layer". *Japanese Journal of Applied Physics*, vol. 37, pp. 2104-2110 (1998).
Kubota. *Wave Optics*, Chapter 3. (1971) with partial English translation.

* cited by examiner

*Primary Examiner*—Elizabeth Mulvaney
(74) *Attorney, Agent, or Firm*—Hamre, Schumann, Mueller & Larson, P.C.

(57) ABSTRACT

An information recording medium of the present invention includes a substrate and an information layer arranged on the substrate. The information layer includes a recording layer that is changed in phase reversibly between a crystalline phase and an amorphous phase by at least one of optical means and electrical means, and at least one crystalline nucleation layer that contains at least one element selected from Bi and Te and at least one element (M1) selected from Sc, Y, La, Ce, Pr, Nd, Sm, Gd, Tb, Dy, Ho, Er, Yb, and Lu and is provided in contact with the recording layer.

30 Claims, 19 Drawing Sheets

INFORMATION RECORDING MEDIUM AND METHOD FOR MANUFACTURING THE SAME

TECHNICAL FIELD

The present invention relates to an information recording medium on which information recording, erasing, rewriting, and reproduction are performed optically or electrically, and a method for manufacturing the same.

BACKGROUND ART

Phase-change type optical information recording media have been known as information recording media on which information recording, erasing, rewriting, and reproduction are performed optically by using laser beams. Information recording, erasing, and rewriting are performed on a phase-change type optical information recording medium by utilizing a phenomenon in which a recording layer included in the medium is changed in phase reversibly between a crystalline phase and an amorphous phase. Generally, when recording information, a recording layer is allowed to melt by irradiation of a laser beam at a high power (recording power) and cooled rapidly, so that an irradiated portion is changed in phase to an amorphous phase, thereby allowing the information to be recorded. On the other hand, when erasing the information, the recording layer is raised in temperature by irradiation of a laser beam at a lower power (erasing power) than the power used for recording and cooled gradually, so that a laser beam irradiated portion is changed in phase to a crystalline phase, thereby allowing the recorded information to be erased. Thus, in a phase-change type optical information recording medium, a laser beam that is modulated in power level between a high power level and a low power level is irradiated to a recording layer, thereby making it possible to record new information while erasing information that has been recorded, i.e., to rewrite information (see, for example, "Basics and Applications of Optical Disk Storage" by Yoshito TSUNODA et al., The Institute of Electronics, Information and Communication Engineers, 1995, Chapter 2).

Further, phase-change type electrical information recording media also have been known on which information recording is performed by changing the state of a phase change material in a recording layer by, instead of irradiation of a laser beam, Joule heat generated by application of a current. In such a phase-change type electrical information recording medium, a phase change material in a recording layer is changed in state between a crystalline phase (low resistance) and an amorphous phase (high resistance) by Joule heat generated by application of a current, and a difference in electrical resistance between the crystalline phase and the amorphous phase is detected and read as information. When a current is applied to a recording layer of an amorphous phase sandwiched between electrodes gradually, the recording layer is changed in phase to a crystalline phase at a certain threshold current, so that the electrical resistance decreases rapidly. Further, by applying a large current pulse having a short time pulse width to the recording layer of a crystalline phase, the recording layer is allowed to melt and is cooled rapidly, thereby regaining the recording layer of an amorphous phase of high resistance. Thus, such recording media can be used as rewritable information recording media. The difference in electrical resistance between a crystalline phase and an amorphous phase can be detected easily by usual electrical means, and thus by using a recording layer that is changed in phase reversibly between a crystalline phase and an amorphous phase, a rewritable information recording medium can be obtained (see, for example, "Basics of Amorphous Semiconductor" by Makoto KIKUCHI, Ohmsha, Ltd., 1982, Chapter 8).

Examples of phase-change type optical information recording media include a 4.7 GB/DVD-RAM that has been commercialized by the inventors. The 4.7 GB/DVD-RAM, which is shown in FIG. 21 as an information recording medium 1000, has an information layer 1010 of an eight-layer structure in which, seen from an incident side of a laser beam 10, a first dielectric layer 1002, a second dielectric layer 1003, a crystalline nucleation layer 1004, a recording layer 1005, a third dielectric layer 1006, a fourth dielectric layer 1007, a light absorption correction layer 1008, and a reflective layer 1009 are laminated in this order. The information layer 1010 is laminated to a dummy substrate 1012 with an adhesive layer 1011.

The first dielectric layer 1002 and the fourth dielectric layer 1007 have an optical function and a thermal function. For the optical function, an optical distance is adjusted so that the light absorption efficiency with respect to the recording layer 1005 is increased, and thus a change in reflectance between a crystalline phase and an amorphous phase is increased, thereby allowing the signal amplitude to be increased. For the thermal function, the substrate 1001, the dummy substrate 1012, and the like that have low resistance to heat are insulated from the recording layer 1005 that is heated to a high temperature in recording. A mixture of 80 mol % ZnS and 20 mol % $SiO_2$ (hereinafter, which may be referred to as "$(ZnS)_{80}(SiO_2)_{20}$ (mol %)"), which is used generally for the first dielectric layer 1002 and the fourth dielectric layer 1007, is an excellent dielectric material that is transparent, has a high refractive index, a low thermal conductivity and a good thermal insulation property, and is excellent in mechanical properties and moisture resistance.

As a material of the crystalline nucleation layer 1004, Sn—Te or Pb—Te is used, which is a material that accelerates crystallization of the recording layer 1005 when it is provided in contact with the recording layer 1005. By using such a material, the crystallization ability of the recording layer is allowed to be increased without decreasing the signal amplitude of the information recording medium 1000 and with archival characteristics secured, and not only an initial recording/rewriting capability but also excellent archival characteristics (capability of reproducing recorded information that has been stored for a long term) and archival overwrite characteristics (capability of recording/rewriting information that has been stored for a long term) are realized (see, for example, JP 2001-273673 A).

As a material of the recording layer 1005, a pseudobinary phase change material represented by a point on a line of GeTe—$Sb_2Te_3$ is used, thereby realizing an excellent repeated rewriting capability.

The second dielectric layer 1003 and the third dielectric layer 1006 have a function of preventing mass transfer from being caused between the first dielectric layer 1002 and the recording layer 1005 and between the fourth dielectric layer 1007 and the recording layer 1005. The mass transfer is a phenomenon caused when $(ZnS)_{80}(SiO_2)_{20}$ (mol %) is used for each of the first dielectric layer 1002 and the fourth dielectric layer 1007. In this phenomenon, when recording/rewriting is performed repeatedly by irradiation of laser beams to the recording layer 1005, S is diffused in the recording layer 1005. When S is diffused in the recording layer 1005, the repeated rewriting capability is deteriorated (see, for example, N. Yamada et al., Japanese Journal of Applied Physics, Vol. 37 (1998), pp. 2104-2110). In order to prevent the deterioration in repeated rewriting capability, a nitride containing Ge should be used for the second dielectric layer 1003 and the third dielectric layer 1006 (see, for example, WO 97-34298 and JP 10 (1998)-275360).

The above-mentioned technology has allowed an excellent rewriting capability and high reliability to be achieved and led to the commercialization of the 4.7 GB/DVD-RAM.

Furthermore, various forms of technologies for increasing the capacity of information recording media further have been studied. For example, for optical information recording media, a technology is studied for achieving high-density recording using a laser beam with a reduced spot diameter, which can be obtained by the use of a blue-violet laser beam having a wavelength shorter than that of a conventionally used red laser beam, or the use of a substrate that is thinner on an incident side of a laser beam in combination with the use of an objective lens having a high numerical aperture (NA). Furthermore, studies also have been made on a technology in which a recording capacity is doubled by using an optical information recording medium including two information layers and with respect to these two information layers, recording/reproduction is performed using a laser beam incident from a side of one side of the optical information recording medium (see, for example, JP 2000-36130 A).

In order to perform recording using a laser beam with a reduced spot diameter to increase the capacity of information recording media, it is necessary to use an optical information recording medium that allows even a recording mark reduced in size to be formed into an excellent shape. When recording is performed using a laser beam with a reduced spot diameter, the laser beam is irradiated to a recording layer for a relatively shorter time. Thus, to form a recording mark reduced in size, it is necessary to use a material that realizes a high crystallization speed for the recording layer, or to provide a film having a high effect of accelerating crystallization in contact with the recording layer.

In the optical information recording medium including two information layers (hereinafter, which may be referred to as a "two-layer optical information recording medium") that allows information recording/reproduction to be performed with respect to the two information layers by irradiation of a laser beam from a side of one side, the laser beam that has been transmitted through an information layer (hereinafter, referred to as a "first information layer") arranged at a position closer to an incident surface of the laser beam is used to perform recording/reproduction with respect to an information layer (hereinafter, referred to as a "second information layer") arranged at a position farther from the laser beam incidence surface. To this end, it is required that a much thinner film be used as a recording layer in the first information layer so that a higher light transmittance can be obtained. However, when the recording layer becomes thinner, crystalline nuclei formed when the recording layer is crystallized are reduced, and further a distance in which atoms are allowed to move becomes shorter. For theses reasons, a thinner recording film hinders the formation of a crystalline phase more (which means the crystallization speed is decreased).

Further, when an information transfer rate is increased by decreasing a time for information recording on an information recording medium, a time for crystallization is reduced. Thus, to realize information recording media adaptable to a high transfer rate, it also is required that the recording layer have a higher crystallization ability. Further, when information recording is performed at a high transfer rate, the recording layer that has been raised in temperature is cooled at a speed higher than that achieved when recording is performed at a lower transfer rate, and thus microcrystalline nuclei are less likely to be formed in an amorphous phase after recording. In other words, a more stable amorphous phase is likely to be obtained. An amorphous phase tends to be changed to a still more stable energy state after long-term storage. Therefore, when information recording is performed at a high transfer rate, it becomes more difficult to allow the recording layer to be crystallized, resulting in a deterioration in archival overwrite characteristics.

According to the test performed by the inventors, it has been revealed that by the use of a recording layer having a composition in which Sn is substituted for a part of Ge in a pseudobinary composition represented by a point on or near the line of $GeTe$—$Sb_2Te_3$, the crystallization speed of a recording layer can be increased. However, in this case, as the amount of Sn as a substituent is increased, the change in optical property between a crystalline phase and an amorphous phase becomes small, thereby decreasing the signal amplitude. Further, when the amount of Sn is increased, a recorded amorphous phase is crystallized gradually, and thus the archival characteristics are deteriorated in the case where recording is performed at a particularly low transfer rate.

As described above, as the capacity of information recording media increases, it becomes difficult to realize in a single information recording medium both the archival overwrite characteristics at a high transfer rate and the archival characteristics at a low transfer rate.

To allow the crystallization ability of the recording layer to be increased without decreasing the signal amplitude and with the archival characteristics secured, as described above, a crystalline nucleation layer made of Sn—Te or the like that accelerates crystallization of the recording layer should be provided in contact with the recording layer. According to the test performed by the inventors, it has been revealed that the crystallization ability of the recording layer can be increased by the use of Bi—Te for the crystalline nucleation layer. However, Sn—Te and Bi—Te have a low melting point, and thus a phenomenon is caused in which when the recording layer is raised in temperature in recording, Sn—Te or Bi—Te melts and, after repeated rewriting operations, is mixed into the recording layer gradually. As a result, the repeated rewriting capability is deteriorated.

As described above, in conventional information recording media, it is difficult to realize both an excellent information erasing rate (a phase change to a crystalline phase) as well as excellent archival overwrite characteristics at a high transfer rate and excellent archival characteristics at a low transfer rate, and at the same time, an excellent repeated rewriting capability.

DISCLOSURE OF INVENTION

An information recording medium of the present invention includes a substrate and an information layer arranged on the substrate. The information layer includes: a recording layer that is changed in phase reversibly between a crystalline phase and an amorphous phase by at least one of optical means and electrical means; and at least one crystalline nucleation layer that contains at least one element selected from Bi and Te and at least one element (M1) selected from Sc, Y, La, Ce, Pr, Nd, Sm, Gd, Tb, Dy, Ho, Er, Yb, and Lu, and is provided in contact with the recording layer.

A method for manufacturing an information recording medium of the present invention is a method for manufacturing an information recording medium that is provided with at least one information layer on a substrate. A step of forming the information layer includes: a step of forming a recording layer that is changed in phase reversibly between a crystalline phase and an amorphous phase by at least one of optical means and electrical means; and a step of forming a crystalline nucleation layer by performing sputtering using a sputtering target containing at least one element selected from Bi and Te and at least one element (M1) selected from Sc, Y, La, Ce, Pr, Nd, Sm, Gd, Tb, Dy, Ho, Er, Yb, and Lu. The step of forming the recording layer and the step of forming the crystalline nucleation layer are performed sequentially.

BEST MODE FOR CARRYING OUT THE INVENTION

Figure 1:
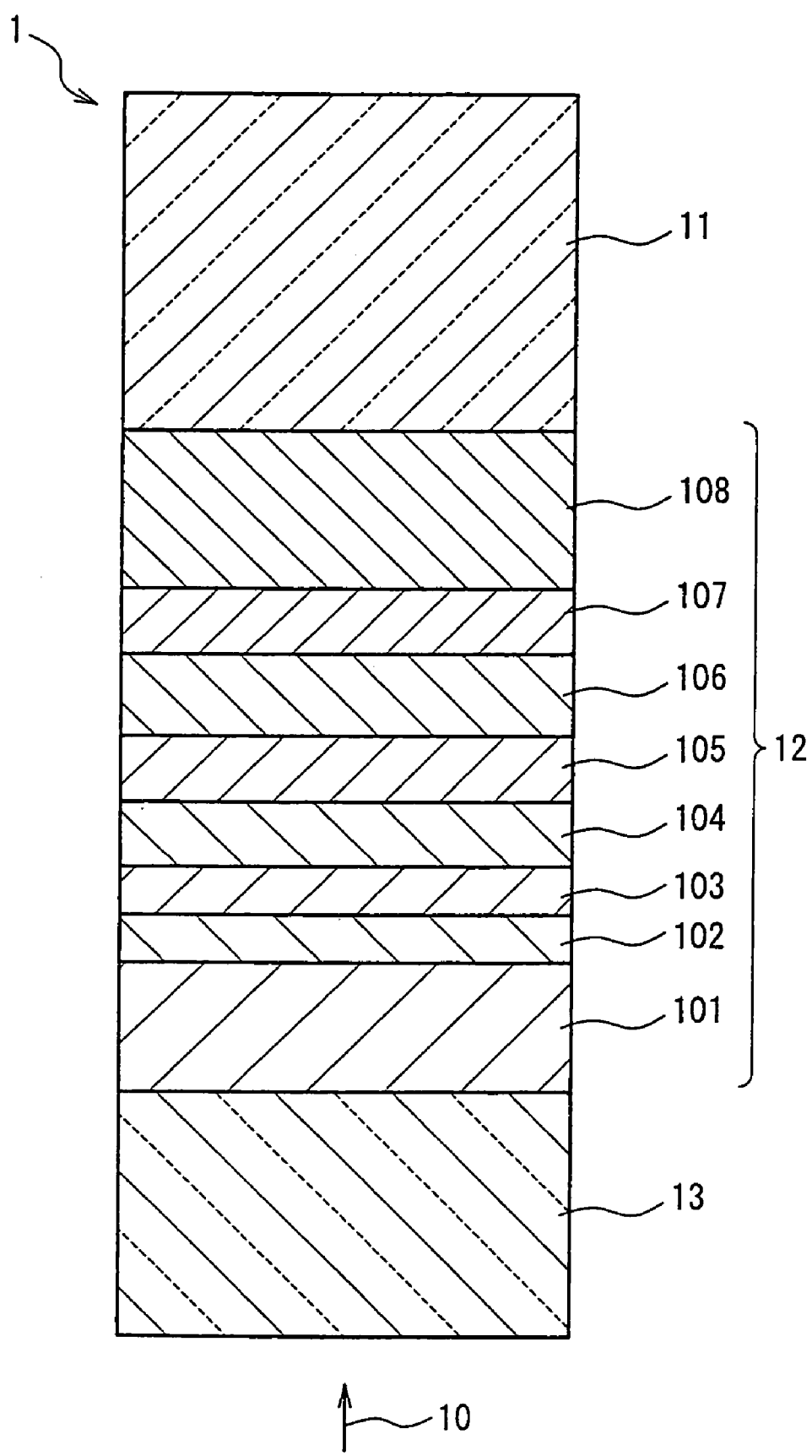
FIG. 1 is a cross-sectional view showing an exemplary configuration of an information recording medium according to Embodiment 1 of the present invention.

An information recording medium of the present invention has a configuration in which a crystalline nucleation layer provided in contact with a recording layer contains at least one element selected from Bi and Te and at least one element (M1) selected from Sc, Y, La, Ce, Pr, Nd, Sm, Gd, Tb, Dy, Ho, Er, Yb, and Lu. Therefore, an excellent information erasing rate (a phase change to a crystalline phase) at a high transfer rate can be realized, and excellent archival overwrite characteristics also can be realized since the crystalline nucleation layer has a high melting point and excellent thermal stability. In addition, excellent archival characteristics at a low transfer rate can be obtained, and an excellent repeated rewriting capability also can be achieved at the same time.

In the information recording medium of the present invention, the crystalline nucleation layer may contain at least one selected from Bi(M1) and Te(M1). Therefore, it is possible to obtain an information recording medium 1 in which the crystalline nucleation layer has a high melting point and excellent thermal stability, and which has an excellent capability of rewriting information that has been stored for a long term.

In the information recording medium of the present invention, the crystalline nucleation layer may contain at least one selected from $BiTe(M1)_2$, $Bi_2Te(M1)$, and $BiTe_2(M1)$. Therefore, it is possible to obtain an information recording medium 1 in which the crystalline nucleation layer has a high melting point and excellent thermal stability, and which has an excellent capability of rewriting information that has been stored for a long term.

In the information recording medium of the present invention, the crystalline nucleation layer may contain at least one element selected from N and O. Therefore, thermal stability of the crystalline nucleation layer is enhanced. Further, in particular, when N is added to the crystalline nucleation layer, crystal grains tend to be more uniform and smaller in size. Thus, recording noise generated in a low-frequency region in recording can be reduced.

In the information recording medium of the present invention, the recording layer may be formed of a material that contains at least one element (M2) selected from Sb and Bi, Ge, and Te. Where the element M2, Ge, and Te are represented by a composition formula $Ge_a(M2)_bTe_{3+a}$, $2 \leq a \leq 50$, and $2 \leq b \leq 4$ are satisfied. Therefore, even when a thin layer having a thickness of about not more than 14 nm is used as the recording layer, an excellent recording/reproduction capability can be obtained. Further, when the element M2 contains Bi, the crystallization ability is increased, and an excellent rewriting capability can be obtained even at a high transfer rate.

In the information recording medium of the present invention, the recording layer may be formed of a material represented by a composition formula $(Ge-(M3))_a(M2)_b Te_{3+a}$ in which at least one element (M3) selected from Sn and Pb is substituted for a part of Ge in $Ge_a(M2)_b Te_{3+a}$. Therefore, Sn or Pb substituted for Ge in a tertiary composition of Ge-M2-Te improves the crystallization ability. Thus, even when an extremely thin layer having a thickness of about not more than 7 nm is used as the recording layer, a sufficient rewriting capability can be obtained.

In the information recording medium of the present invention, the recording layer may be formed of a material in which the element M2 is Sb and Bi is substituted for at least a part of Sb, i.e., a material represented by a composition formula $Ge_a(Sb—Bi)_b Te_{3+a}$. In such a case, preferably, a content ratio of Sn atoms is more than O atom % and less than 20 atom %, and a content ratio of Bi atoms is more than 0 atom % and less than 10 atom %.

In the information recording medium of the present invention, the recording layer may be formed of a material that contains at least one element (M2) selected from Sb and Bi, at least one element (M4) selected from Si, Ti, V, Cr, Mn, Fe, Co, Ni, Cu, Se, Zr, Nb, Mo, Ru, Rh, Pd, Ag, In, Sn, Ta, W, Os, Ir, Pt, and Au, Ge, and Te. Where the elements M2 and M4, Ge, and Te are represented by a composition formula $(Ge_a(M2)_b Te_{3+a})_{100-c}(M4)_c$, $2 \leq a \leq 50$, $2 \leq b \leq 4$, and $0 \leq c \leq 20$ are satisfied. Therefore, the element M4 added to the tertiary composition of Ge—M2-Te increases a melting point and a crystallization temperature of the recording layer, and thus the thermal stability of the recording layer can be improved.

In the information recording medium of the present invention, the recording film may be formed of a material that contains Sb, Te, and at least one element (M5) selected from Ag, In, Ge, Sn, Se, Bi, Au, and Mn. Where Sb, Te, and the element M5 are represented by a composition formula $(Sb_d Te_{100-d})_{100-e}(M5)_e$, $50 \leq d \leq 95$, and $0 < e \leq 20$ are satisfied. Therefore, the recording layer has a low melting point, and thus even with energy that is relatively low, an excellent recording property can be obtained.

In the information recording medium of the present invention, preferably, the crystalline nucleation layer has a thickness not less than 0.2 nm and not more than 3 nm. In particular, in the case of an information recording medium on which recording/reproduction is performed using a so-called blue-violet laser, more preferably, the crystalline nucleation layer has a thickness not less than 0.3 nm. This is because it is possible to obtain an information recording medium that has an excellent erasing capability and capability of rewriting information that has been stored for a long term even at a high transfer rate.

In the information recording medium of the present invention, preferably, the recording layer has a thickness not less than 3 nm and not more than 14 nm. In particular, in the case of an information recording medium on which recording/reproduction is performed using a so-called red laser, more preferably, the recording layer has a thickness of 6 nm to 12 nm. Therefore, an information recording medium that has an excellent erasing capability and a large signal amplitude can be obtained.

In the case where the information recording medium of the present invention has a multi-layer structure in which a first to an N-th information layers (N represents a natural number not smaller than 2) are laminated, at least one of the first to N-th information layers may have the configuration of the present information layer. Therefore, in addition to an excellent information erasing rate (a phase change to a crystalline phase) and excellent archival overwrite characteristics at a high transfer rate, as well as excellent archival characteristics at a low transfer rate and an excellent repeated rewriting capability, large capacity also can be achieved.

In the information recording medium of the present invention, the recording layer is changed in phase reversibly between a crystalline phase and an amorphous phase by irradiation of a laser beam, and the information layer further may include a dielectric layer provided on both sides of a laminated body formed of the recording layer and the crystalline nucleation layer, and a reflective layer arranged on a side opposite to an incident side of the laser beam with respect to the laminated body. Further, the information layer further may include a light absorption correction layer arranged between the laminated body and the reflective layer.

In the information recording medium of the present invention, the recording layer is changed in phase reversibly between a crystalline phase and an amorphous phase by irradiation of a laser beam, and the information layer may include at least a first dielectric layer, a second dielectric layer, the crystalline nucleation layer, the recording layer, a third dielectric layer, and a reflective layer in this order from an incident side of the laser beam. Further, the information layer may include at least a first dielectric layer, a second dielectric layer, the recording layer, the crystalline nucleation layer, a third dielectric layer, and a reflective layer in this order from an incident side of the laser beam. Further, the information layer may include at least a first dielectric layer, a second dielectric layer, the crystalline nucleation layer, the recording layer, the crystalline nucleation layer, a third dielectric layer, and a reflective layer in this order from an incident side of the laser beam. Further, the information layer further may include a fourth dielectric layer provided between the third dielectric layer and the reflective layer. At this time, the fourth dielectric layer may contain $(ZnS)_{80}(SiO_2)_{20}$. Further, the information layer further may include an interface layer that is provided between the third dielectric layer and the reflective layer and has a thermal conductivity lower than that of the reflective layer.

In the case where the information recording medium of the present invention has a multi-layer structure in which a first to an N-th information layers (N represents a natural number not smaller than 2) on which information is recorded by irradiation of a laser beam are laminated in this order from an incident side of the laser beam, preferably, at least the first information layer is the present information layer, the recording layer included in the first information layer is changed in phase reversibly between a crystalline phase and an amorphous phase by irradiation of the laser beam, and the first information layer includes at least a first dielectric layer, a second dielectric layer, the crystalline nucleation layer, the recording layer, a third dielectric layer, a reflective layer, and a transmittance adjusting layer in this order from the incident side of the laser beam. Therefore, the transmittance of the first information layer can be increased, and thus an excellent recording property also can be obtained in the second to N-th information layers.

In the case where the information recording medium of the present invention has a multi-layer structure in which a first to an N-th information layers (N represents a natural number not smaller than 2) on which information is recorded by irradiation of a laser beam are laminated in this order from an incident side of the laser beam, the information recording medium may be configured such that at least the first information layer is the present information layer, the recording layer included in the first information layer is changed in phase reversibly between a crystalline phase and an amorphous phase by irradiation of the laser beam, and the first information layer includes at least a first dielectric layer, a second dielectric layer, the recording layer, the crystalline nucleation layer, a third dielectric layer, a reflective layer, and a transmittance adjusting layer in this order from the incident side of the laser beam. Therefore, the transmittance of the first information layer can be increased, and thus an excellent recording property also can be obtained in the second to N-th information layers. Further, an information recording medium having an excellent erasing capability and rewriting capability can be realized.

In the case where the information recording medium of the present invention has a multi-layer structure in which a first to an N-th information layers (N represents a natural number not smaller than 2) on which information is recorded by irradiation of a laser beam are laminated in this order from an incident side of the laser beam, the information recording medium may be configured such that at least the first information layer is the present information layer, the recording layer included in the first information layer is changed in phase reversibly between a crystalline phase and an amorphous phase by irradiation of the laser beam, and the first information layer includes at least a first dielectric layer, a second dielectric layer, the crystalline nucleation layer, the recording layer, the crystalline nucleation layer, a third dielectric layer, a reflective layer, and a transmittance adjusting layer in this order from the incident side of the laser beam. Therefore, the transmittance of the first information layer can be increased, and thus an excellent recording property also can be obtained in the second to N-th information layers. Further, an information recording medium having an excellent erasing capability and rewriting capability can be realized.

In the case where the information recording medium of the present invention includes a transmittance adjusting layer in the information layer, preferably, the transmittance adjusting layer contains at least one selected from $TiO_2$, $ZrO_2$, ZnO, $Nb_2O_5$, $Ta_2O_5$, $SiO_2$, $Al_2O_3$, $Bi_2O_3$, $Cr_2O_3$, Sr—O, Ti—N, Zr—N, Nb—N, Ta—N, Si—N, Ge—N, Cr—N, Al—N, Ge—Si—N, Ge—Cr—N, and ZnS. Therefore, the transmittance of the information layer can be increased.

In the case where the information recording medium of the present invention includes a third dielectric layer in the information layer, the third dielectric layer may be formed of an oxide-fluoride-based material containing at least one selected from $HfO_2$ and $ZrO_2$, $SiO_2$, $Cr_2O_3$, and a fluoride. As the fluoride, at least one selected from $CeF_3$, $ErF_3$, $GdF_3$, $LaF_3$, $TbF_3$, $DyF_3$, $NdF_3$, $YF_3$, and $YbF_3$ can be used.

Where the oxide-fluoride-based material is represented by a composition formula $(HfO_2)_{A1}(SiO_2)_{B1}(Cr_2O_3)_{C1}$(fluoride)$_{100-A1-B1-C1}$ or $(ZrO_2)_{A1}(SiO_2)_{B1}(Cr_2O_3)_{C1}$(fluoride)$_{100-A1-B1-C1}$, A1, B1, C1, and A1+B1+C1 preferably satisfy: $10 \leq A1 \leq 50$; $10 \leq B1 \leq 50$; $10 \leq C1 \leq 50$; and $50 \leq A1+B1+C1 \leq 90$, respectively.

In the case where the information recording medium of the present invention includes a second dielectric layer and a third dielectric layer in the information layer, at least one of the second dielectric layer and the third dielectric layer may be formed of an oxide-based material containing at least one selected from $HfO_2$ and $ZrO_2$, $SiO_2$, and $Cr_2O_3$.

Where the oxide-based material is represented by a composition formula $(HfO_2)_{A2}(SiO_2)_{B2}(Cr_2O_3)_{100-A2-B2}$ or $(ZrO_2)_{A2}(SiO_2)_{B2}(Cr_2O_3)_{100-A2-B2}$, A2, B2, and A2+B2 preferably satisfy: $10 \leq A2 \leq 50$; $10 \leq B2 \leq 50$; and $20 \leq A2+B2 \leq 80$, respectively.

Next, the description is directed to a method for manufacturing the information recording medium of the present invention.

According to a method for manufacturing an information recording medium of the present invention, a crystalline nucleation layer that contains at least one element selected from Bi and Te and at least one element (M1) selected from Sc, Y, La, Ce, Pr, Nd, Sm, Gd, Tb, Dy, Ho, Er, Yb, and Lu can be formed in contact with a recording layer. Therefore, it is possible to provide an information recording medium that has an excellent information erasing rate (a phase change to a crystalline phase) and excellent archival overwrite characteristics at a high transfer rate, as well as excellent archival characteristics at a low transfer rate, and further an excellent repeated rewriting capability.

In the method for manufacturing an information recording medium of the present invention, a sputtering target used in a step of forming a crystalline nucleation layer may contain at least one selected from Bi(M1) and Te(M1).

In the method for manufacturing an information recording medium of the present invention, the sputtering target used in the step of forming the crystalline nucleation layer may contain at least one selected from $BiTe(M1)_2$, $Bi_2Te(M1)$, and $BiTe_2(M1)$.

In the method for manufacturing an information recording medium of the present invention, in the step of forming the crystalline nucleation layer, at least one selected from Ar gas, Kr gas, a mixture of Ar gas and a reactive gas, and a mixture of Kr gas and a reactive gas may be used in performing sputtering, the reactive gas being at least one selected from $N_2$ gas and $O_2$ gas.

Hereinafter, embodiments of the present invention will be described with reference to the drawings. Each of the following embodiments is to be regarded as an example, and the present invention is not limited thereto. Further, in the following embodiments, the same components are denoted with the same reference numerals, and repeated descriptions thereof may be omitted.

Embodiment 1

The description is directed to one embodiment of an information recording medium of the present invention. An information recording medium of this embodiment is a medium suitable for use in information recording/reproduction using a so-called blue-violet laser having a wavelength of 390 to 420 nm. FIG. 1 is a partial cross-sectional view of an information recording medium 1 of this embodiment. The information recording medium 1 is an optical information recording medium that allows information recording/reproduction by irradiation of a laser beam 10.

In the information recording medium 1, one information layer 12 is provided on a substrate 11, and a transparent layer 13 further is provided on the information layer 12. The information layer 12 includes a first dielectric layer 101, a second dielectric layer 102, a crystalline nucleation layer 103, a recording layer 104, a third dielectric layer 105, a fourth dielectric layer 106, an interface layer 107, and a reflective layer 108 that are laminated in order from an incident side of the laser beam 10.

Preferably, a material of the transparent layer 13 is a resin such as a photocurable resin (particularly, an ultraviolet curable resin) and a delayed-action-type thermosetting resin, a dielectric material, or the like, and has a low light absorptance with respect to the laser beam 10 to be used. Further, preferably, the material optically has a low birefringence at a wavelength in a short wavelength region. Further, a transparent disk-shaped layer made of a resin such as polycarbonate, amorphous polyolefin, and PMMA (polymethyl methacrylate), glass, or the like, for example, may be used as the transparent layer 13. In such a case, the transparent layer 13 is allowed to be laminated to the first dielectric layer 101 with, for example, a resin such as a photocurable resin (particularly, an ultraviolet curable resin) and a delayed-action-type thermosetting resin.

When focusing the laser beam 10, a beam spot thus obtained has a diameter determined by a wavelength λ of the laser beam 10 (a shorter wavelength λ allows the beam spot to be reduced in diameter more). Thus, preferably, in high-density recording, the laser beam 10 particularly has a wavelength λ of not more than 450 nm. However, when the wavelength λ has a value less than 350 nm, light absorption by the transparent layer 13 or the like is increased. On this account, more preferably, the laser beam 10 has a wavelength λ in a range of 350 nm to 450 nm.

The substrate 11 is, for example, a transparent disk-shaped substrate, and can be made of, for example, a resin such as polycarbonate, amorphous polyolefin, and PMMA, glass, or the like.

When necessary, guide grooves for guiding the laser beam 10 may be formed on a surface of the substrate 11 on a side of the information layer 12 (side of the reflective layer 108). Preferably, a surface of the substrate 11 on a side opposite to the side of the reflective layer 108 is made smooth. As a material of the substrate 11, polycarbonate is particularly useful since it exhibits an excellent transfer property and suitability for mass production, and achieves a cost reduction. Preferably, the substrate 11 has a thickness in a range of 500 μm to 1200 μm so as to have sufficient strength and allow the information recording medium 1 to have a thickness of about 1200 μm. When the transparent layer 13 has a thickness of about 600 μm (where NA=0.6, this thickness allows excellent recording/reproduction to be performed), preferably, the substrate 11 has a thickness in a range of 550 μm to 650 μm. Further, when the transparent layer 13 has a thickness of about 100 μm (where NA=0.85, this thickness allows excellent recording/reproduction to be performed), preferably, the substrate 11 has a thickness in a range of 1050 μm to 1150 μm.

The first dielectric layer 101 is formed of a dielectric. The first dielectric layer 101 has a function of preventing oxidation, corrosion, deformation, and the like of the recording layer 104, a function of increasing the light absorption efficiency of the recording layer 104 by adjusting an optical distance, and a function of increasing the signal amplitude by increasing a change in an amount of reflected light between before and after recording. The first dielectric layer 101 can be made of, for example, an oxide such as $TiO_2$, $ZrO_2$, $ZnO$, $Nb_2O_5$, $Ta_2O_5$, $SiO_2$, $Al_2O_3$, $Bi_2O_3$, and $Cr_2O_3$. Further, a nitride such as C—N, Ti—N, Zr—N, Nb—N, Ta—N, Si—N, Ge—N, Cr—N, Al—N, Ge—Si—N, and Ge—Cr—N also can be used. Further, a sulfide such as ZnS, a carbide such as SiC, and a fluoride such as $LaF_3$ also can be used. Further, a mixture of the above-mentioned materials also can be used. For example, a mixture of ZnS and $SiO_2$, i.e., ZnS—$SiO_2$ is a particularly excellent material to be used for the first dielectric layer 101, since ZnS—$SiO_2$ is an amorphous material that has a high refractive index and a high film-forming speed, and is excellent in mechanical properties and moisture resistance.

By calculation based on a matrix method (see, for example, "Wave Optics" by Hiroshi Kubota, published by Iwanami Shoten, 1971, Chapter 3), the film thickness of the first dielectric layer 101 can be determined exactly so as to satisfy the condition that a change in an amount of reflected light between when the recording layer 104 is in a crystalline phase and when the recording layer 104 is in an amorphous phase can be increased and light absorption in the recording layer 104 can be increased.

The second dielectric layer 102 has a function of preventing mass transfer from being caused between the first dielectric layer 101 and the crystalline nucleation layer 103 and between the first dielectric layer 101 and the recording layer 104 by repeated recording. As described later, the crystalline nucleation layer 103 is formed so as to be extremely thin, having a thickness of 0.3 nm to 3 nm, and thus is likely to have an island shape. In view of this, the second dielectric layer 102 may be partially in contact with the recording layer 104. Therefore, preferably, the second dielectric layer 102 is formed of a material that has a low light absorptance as well as such a high melting point as not to allow the second dielectric layer 102 to melt in recording and exhibits excellent adhesion to the crystalline nucleation layer 103 and the recording layer 104. In order to prevent a part of the second dielectric layer 102 from melting so as to be mixed into the crystalline nucleation layer 103 and the recording layer 104 upon irradiation of a high-power laser beam 10, the material of the second dielectric layer 102 is required to have this property of having such a high melting point as not to allow the second dielectric layer 102 to melt in recording. This is because when the material of the second dielectric layer 102 is mixed, the compositions of the crystalline nucleation layer 103 and the recording layer 104 are changed, thereby substantially deteriorating the rewriting capability. Further, in order to secure reliability, the material of the second dielectric layer 102 is required to have this property of exhibiting excellent adhesion to the crystalline nucleation layer 103 and the recording layer 104.

The second dielectric layer 102 can be made of a material in the same system as that of the material of the first dielectric layer 101. Preferably, above all, a material containing Cr, Zr, and O is used, and further, a mixture of $Cr_2O_3$ and $ZrO_2$ is used, in which $Cr_2O_3$ is formed from Cr and O and $ZrO_2$ is formed from Zr and O. $Cr_2O_3$ is a material exhibiting excellent adhesion to the recording layer 104. Further, $ZrO_2$ is a transparent material having a melting point as high as 2700° C. and a thermal conductivity that is low compared with other oxides, thereby contributing to an improvement in repeated rewriting capability. The second dielectric layer 102 is formed of a material as the mixture of these two types of oxides, thereby realizing an optical information recording medium 15 having an excellent repeated rewriting capability as well as high reliability, in which the second dielectric layer 102 is partially in contact with the recording layer 104. Preferably, in order to secure adhesion to the recording layer 104, in $Cr_2O_3$—$ZrO_2$, $Cr_2O_3$ is contained in an amount of not less than 10 mol %. Further, preferably, in order to maintain a low level of light absorption in the second dielectric layer 102, $Cr_2O_3$ is contained in an amount of not more than 60 mol % (when $Cr_2O_3$ is contained in an increased amount, light absorption tends to increase). Thus, more preferably, in $Cr_2O_3$—$ZrO_2$, $Cr_2O_3$ is contained in an amount of not less than 20 mol % and not more than 50 mol %.

The second dielectric layer 102 also may be made of a material further containing Si in addition to Cr, Zr, and O. Preferably, above all, a mixture of $SiO_2$, $Cr_2O_3$, and $ZrO_2$ is used, in which $Cr_2O_3$ is formed from Cr and O, $ZrO_2$ is formed from Zr and O, and $SiO_2$ is formed from Si and O. This is because when $SiO_2$ is contained, the effect of accelerating crystallization of the recording layer 104 is enhanced, thereby allowing an optical information recording medium 1 having an excellent rewriting capability to be realized. Preferably, in $SiO_2$—$Cr_2O_3$—$ZrO_2$, $SiO_2$ is contained in an amount of not less than 5 mol %, and preferably, in order to secure adhesion to the recording layer 104, $SiO_2$ is contained in an amount of not more than 40 mol %. More preferably, in $SiO_2$—$Cr_2O_3$—

$ZrO_2$, $SiO_2$ is contained in an amount of not less than 10 mol % and not more than 35 mol %. Further, preferably, in order to secure an excellent recording/rewriting capability, $SiO_2$ and $Cr_2O_3$ are contained in a total amount of not more than 95 mol %.

In order to prevent a change in an amount of reflected light between before and after recording on the information recording medium 1 from being decreased by light absorption in the second dielectric layer 102, the second dielectric layer 102 has a thickness, desirably, in a range of 1 nm to 10 nm, and more preferably, in a range of 2 nm to 7 nm.

The third dielectric layer 105 has a function of increasing the light absorption efficiency of the recording layer 104 by adjusting an optical distance and a function of increasing the signal amplitude by increasing a change in an amount of reflected light between before and after recording. The third dielectric layer 105 can be made of a material in the same system as that of the material of the first dielectric layer 101. Preferably, as in the case of the second dielectric layer 102, a material containing Cr, Zr, and O is used. Preferably, above all, a mixture of $Cr_2O_3$ and $ZrO_2$ is used, in which $Cr_2O_3$ is formed from Cr and O and $ZrO_2$ is formed from Zr and O. The third dielectric layer 105 tends to show poorer adhesion to the recording layer 104 than the second dielectric layer 102. Therefore, preferably, in $Cr_2O_3$—$ZrO_2$, $Cr_2O_3$ is contained in an amount of not less than 20 mol % and not more than 80 mol %, which is larger than an amount of $Cr_2O_3$ contained in the second dielectric layer 102, and more preferably, in an amount of not less than 30 mol % and not more than 70 mol %.

As the second dielectric layer 102, the third dielectric layer 105 may be made of a material further containing Si in addition to Cr, Zr, and O. Preferably, above all, a mixture of $SiO_2$, $Cr_2O_3$, and $ZrO_2$ is used, in which $Cr_2O_3$ is formed from Cr and O, $ZrO_2$ is formed from Zr and O, and $SiO_2$ is formed from Si and O. In order to secure adhesion to the recording layer 104, in $SiO_2$—$Cr_2O_3$—$ZrO_2$, $SiO_2$ is contained, preferably, in an amount of not more than 35 mol %, which is smaller than an amount of $SiO_2$ contained in the second dielectric layer 102, and more preferably, in an amount of not less than 5 mol % and not more than 30 mol %. Further, preferably, in order to secure an excellent recording/rewriting capability, $SiO_2$ and $Cr_2O_3$ are contained in a total amount of not more than 95 mol %.

The third dielectric layer 105 has a thickness, preferably, in a range of 2 nm to 75 nm, and more preferably, in a range of 2 nm to 40 nm. The third dielectric layer 105 is formed so as to have a thickness in this range, and thus heat generated in the recording layer 104 can be diffused effectively to the side of the reflective layer 108.

The fourth dielectric layer 106 is arranged on a surface of the third dielectric layer 105 on a side opposite to the incident side of the laser beam. In this case, the fourth dielectric layer 106 can be made of a material in the same system as that of the material of the first dielectric layer 101. The mixture of ZnS and $SiO_2$, i.e., ZnS—$SiO_2$ also can be used as an excellent material for the fourth dielectric layer 106. In this embodiment, the fourth dielectric layer 106 is provided. However, a configuration without the fourth dielectric layer 106 also is possible.

The fourth dielectric layer 106 has a thickness, preferably, in a range of 2 nm to 75 nm, and more preferably, in a range of 2 nm to 40 nm. The fourth dielectric layer 106 is formed so as to have a thickness in this range, and thus heat generated in the recording layer 104 can be diffused effectively to the side of the reflective layer 108.

The crystalline nucleation layer 103 of the present invention is a layer for generating crystalline nuclei, thereby allowing the crystallization ability of the recording layer 104 to be increased. The crystalline nucleation layer 103 can be formed of a material containing at least one element selected from Bi and Te, and M1 (M1 is at least one element selected from Sc, Y, La, Ce, Pr, Nd, Sm, Gd, Tb, Dy, Ho, Er, Yb, and Lu). Herein, preferably, the crystalline nucleation layer 103 contains at least one of Bi(M1) in which Bi and M1 are mixed at a ratio of approximately 50:50 and Te(M1) in which Te and M1 are mixed at a ratio of approximately 50:50. This is because Bi(M1) has a melting point at least as high as 1500° C., and Te(M1) has a melting point at least as high as 1300° C. Particularly, a binary phase diagram shows that BiGd, BiTh, BiDy, and BiY have a melting point at least as high as 2000° C. Therefore, the use of such a material realizes an information recording medium 1 having an excellent capability of rewriting information that has been stored for a long term, in which the crystalline nucleation layer 103 has a high melting point and excellent thermal stability. Further, Bi(M1) and Te(M1) have a rock-salt-type crystal structure. Therefore, in the case where the recording layer 104 is made of, for example, a GeTe—$Sb_2Te_3$ compound group or the like having a rock-salt-type structure, the crystalline nucleation layer 103 has the same crystal structure as that of the recording layer 104. Thus, crystalline nuclei are generated easily at an interface between the crystalline nucleation layer 103 and the recording layer 104, thereby allowing crystal growth in the recording layer 104 to be accelerated. As a result, an information recording medium 1 having excellent archival overwrite characteristics can be obtained.

Further, the crystalline nucleation layer 103 may contain at least one selected from $BiTe(M1)_2$, $Bi_2Te(M1)$, and $BiTe_2$(M1). The use of such a material realizes an information recording medium 1 having excellent archival overwrite characteristics, in which the crystalline nucleation layer 103 has a high melting point and excellent thermal stability and crystalline nuclei are generated easily at the interface between the crystalline nucleation layer 103 and the recording layer 104, thereby allowing crystal growth in the recording layer 104 to be accelerated.

The crystalline nucleation layer 103 has a thickness, preferably, in a range of 0.3 nm to 3 nm, and more preferably, in a range of 0.5 nm to 2 nm, so as to have an excellent erasing capability (crystallization ability) and capability of rewriting information that has been stored for a long term even at a high transfer rate. Further, even when the crystalline nucleation layer 103 has an island shape or a thin-film shape, the above-mentioned effects of the crystalline nucleation layer 103 can be obtained.

The recording layer 104 is formed of a material that allows a reversible phase change between a crystalline phase and an amorphous phase to be caused by irradiation of the laser beam 10. The recording layer 104 can be formed of a material containing, for example, three elements of Ge, M2, and Te (M2 is at least one element selected from Sb and Bi). Specifically, the recording layer 104 can be formed of a material represented by a formula $Ge_a(M2)_bTe_{3+a}$. Herein, desirably, a relationship $2 \leq a \leq 50$ is satisfied, and more preferably, a relationship $4 \leq a \leq 23$ is satisfied, in which the stability in an amorphous phase and a large signal amplitude are achieved and an increase in melting point and a decrease in crystallization speed are suppressed. Further, preferably, a relationship $2 \leq b \leq 4$ is satisfied, and more preferably, a relationship $2 \leq b \leq 3$ is satisfied, in which the stability in an amorphous phase and a large signal amplitude are achieved and a decrease in crystallization speed is suppressed.

Further, the recording layer 104 may be formed of a material represented by a composition formula $(Ge\text{-}(M3))_a(M2)_b Te_{3+a}$ (M3 is at least one element selected from Sn and Pd). When such a material is used, the element M3 substituted for Ge increases the crystallization ability, and thus a sufficient erasing rate can be attained even when the recording layer 104 has a thin film thickness. As the element M3, Sn is used more preferably since Sn possesses no toxicity. When using this material, preferably, $2 \leq a \leq 50$ (more preferably, $4 \leq a \leq 23$) and $2 \leq b \leq 4$ (more preferably, $2 \leq b \leq 3$) also are satisfied.

Furthermore, the recording layer 104 also may be formed of a material represented by a composition formula $(Ge_a(M2)_b Te_{3+a})_{100-c}(M4)_c$ (M4 is at least one element selected from Si, Ti, V, Cr, Mn, Fe, Co, Ni, Cu, Se, Zr, Nb, Mo, Ru, Rh, Pd, Ag, In, Sn, Ta, W, Os, Ir, Pt, and Au). In such a case, the added element M4 increases the melting point and crystallization temperature of the recording layer 104, and thus the thermal stability of the recording layer 104 is enhanced. In such a material, preferably, $0 < c \leq 20$ is satisfied, and more preferably, $2 \leq c \leq 10$ is satisfied. Furthermore, preferably, $2 \leq a \leq 50$ (more preferably, $4 \leq a \leq 23$) and $2 \leq b \leq 4$ (more preferably, $2 \leq b \leq 3$) are satisfied.

Furthermore, the recording layer 104 also may be formed of a material represented by a composition formula $(Sb_d Te_{100-d})_{100-e}(M5)_e$ (M5 is at least one element selected from Ag, In, Ge, Sn, Se, Bi, Au, and Mn). When d and e satisfy $50 \leq d \leq 95$ and $0 \leq e \leq 20$, respectively, it is possible to increase a difference in reflectance of the information recording medium 1 between when the recording layer 104 is in a crystalline phase and when the recording layer 104 is in an amorphous phase, and thus an excellent recording/reproduction property can be obtained. When $65 \leq d$ is satisfied, the crystallization speed can be increased particularly, thereby allowing the erasing rate to be improved particularly. Furthermore, when $d \leq 85$ is satisfied, it becomes easy to cause a phase change to an amorphous phase. Thus, more preferably, $65 \leq d \leq 85$ is satisfied. Furthermore, in order to obtain an excellent recording/reproduction capability, preferably, the element M5 used for adjusting the crystallization speed is added. More preferably, e satisfies $1 \leq e \leq 10$. When $e \leq 10$ is satisfied, the emergence of a plurality of phases can be suppressed, and thus a deterioration in properties due to repeated recording can be suppressed.

Preferably, in order to increase the recording sensitivity of the information recording medium 1, the recording layer 104 has a thickness in a range of 6 nm to 14 nm. Even when this range is satisfied, in the case where a thick layer is used as the recording layer 104, heat diffusion in an in-plane direction causes neighboring regions to be affected thermally to a greater degree. Further, in the case where a thin layer is used as the recording layer 104, the reflectance of the information recording medium 1 is decreased. On this account, more preferably, the recording layer 104 has a thickness in a range of 8 nm to 12 nm.

The reflective layer 108 has an optical function of increasing an amount of light to be absorbed by the recording layer 104. Further, the reflective layer 108 also has a thermal function of allowing heat generated in the recording layer 104 to be diffused smoothly, thereby allowing the recording layer 104 to be changed in phase to an amorphous phase easily. Furthermore, the reflective layer 108 also has a function of protecting a multi-layer film from an environment of use.

As a material of the reflective layer 108, a single metal having a high thermal conductivity such as Ag, Au, Cu, and Al can be used. Further, an alloy such as Al—Cr, Al—Ti, Au—Pd, Au—Cr, Ag—Pd, Ag—Pd—Cu, Ag—Pd—Ti, Ag—Ru—Au, Ag—Cu—Ni, Ag—Zn—Al, and Cu—Si also can be used. Particularly, an Ag alloy has a high thermal conductivity, and thus is used preferably as a material of the reflective layer 108. Preferably, the reflective layer 108 has a thickness of not less than 30 nm, which is a thickness that allows a sufficient heat diffusing function to be obtained. Even when this range is satisfied, in the case where the reflective layer 108 has a thickness larger than 200 nm, the heat diffusing function is enhanced excessively, thereby decreasing the recording sensitivity of the information recording medium 1. On this account, more preferably, the reflective layer 108 has a thickness in a range of 30 nm to 200 nm.

The interface layer 107 is provided at an interface of the reflective layer 108 on the incident side of the laser beam. In this case, the interface layer 107 can be made of a material having a thermal conductivity lower than that of the material described with regard to the reflective layer 108. Preferably, when an Ag alloy is used for the reflective layer 108, Al or an Al alloy is used for the interface layer 107. Also, the interface layer 107 can be made of a material containing an element such as Cr, Ni, Si, and C, or an oxide such as $TiO_2$, $ZrO_2$, ZnO, $Nb_2O_5$, $Ta_2O_5$, $SiO_2$, $Al_2O_3$, $Bi_2O_3$, and $Cr_2O_3$. Further, a nitride such as C—N, Ti—N, Zr—N, Nb—N, Ta—N, Si—N, Ge—N, Cr—N, Al—N, Ge—Si—N, and Ge—Cr—N also can be used. Further, a sulfide such as ZnS, a carbide such as SiC, or a fluoride such as $LaF_3$ also can be used. Further, a mixture of the above-mentioned materials also can be used. Preferably, the interface layer 107 has a film thickness in a range of 3 nm to 100 nm (more preferably, in a range of 10 nm to 50 nm).

Figure 2:
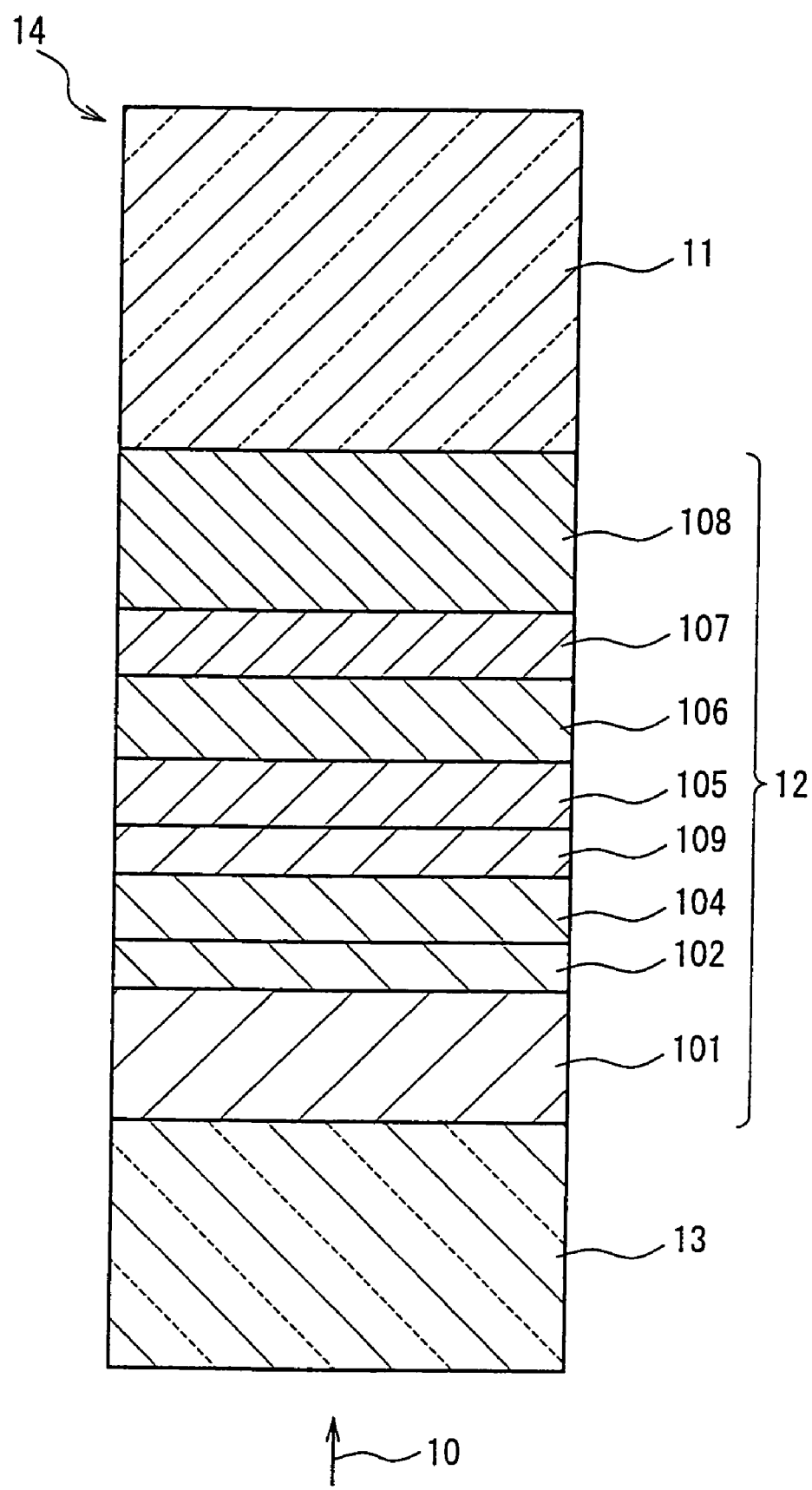
FIG. 2 is a cross-sectional view showing another exemplary configuration of an information recording medium according to Embodiment 1 of the present invention.
Figure 3:
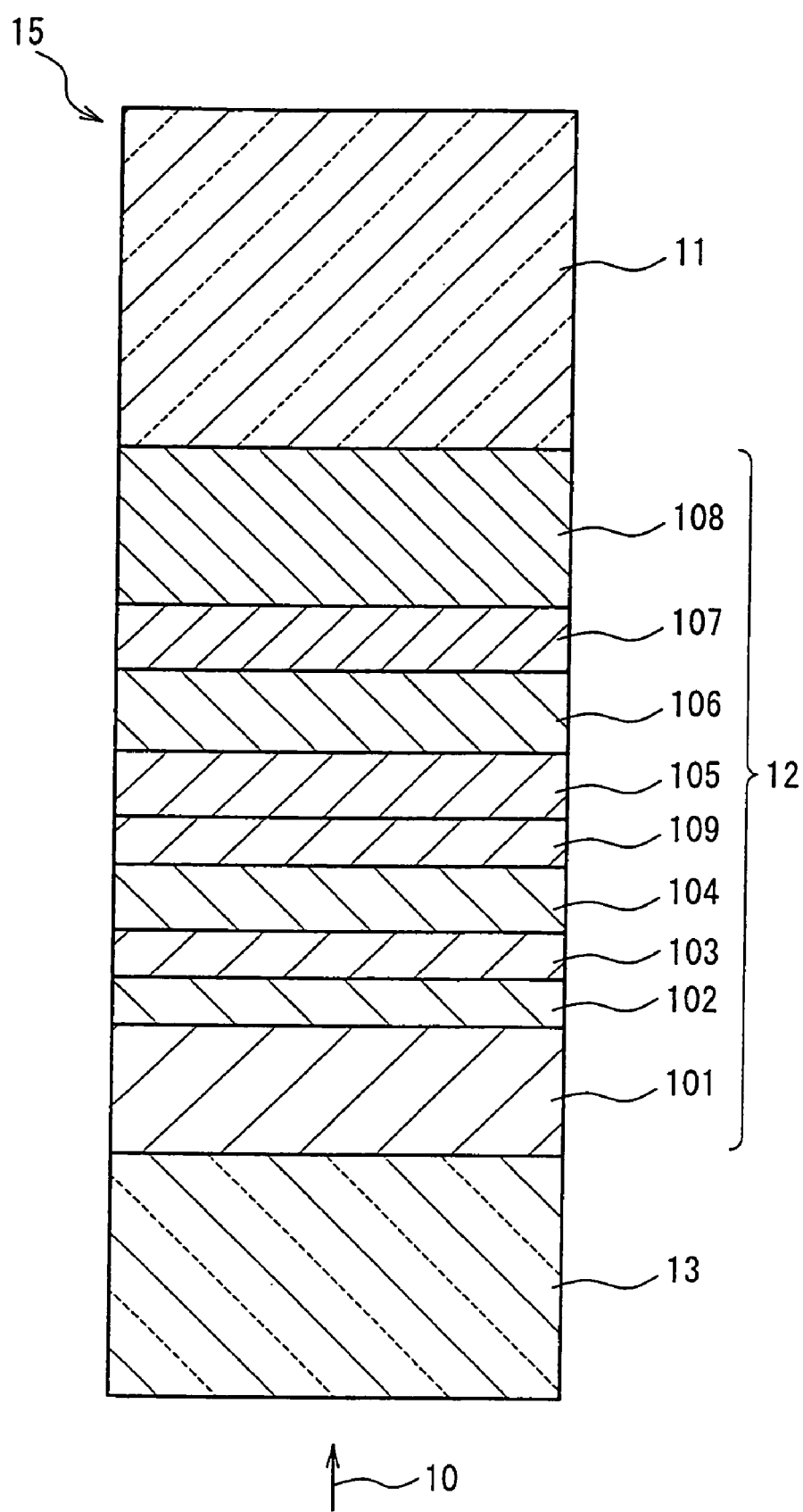
FIG. 3 is a cross-sectional view showing still another exemplary configuration of an information recording medium according to Embodiment 1 of the present invention.

The crystalline nucleation layer may be arranged between the recording layer 104 and the third dielectric layer 105. In such a case, as an information recording medium 14 as shown in FIG. 2, the information layer 12 and the transparent layer 13 are provided on the substrate 11. The information layer 12 is formed of the first dielectric layer 101, the second dielectric layer 102, the recording layer 104, a crystalline nucleation layer 109, the third dielectric layer 105, the fourth dielectric layer 106, the interface layer 107, and the reflective layer 10 that are laminated in order from the incident side of the laser beam. Further, the crystalline nucleation layers may be arranged between the recording layer 104 and the second dielectric layer 102 and between the recording layer 104 and the third dielectric layer 105, respectively. In such a case, as an information recording medium 15 as shown in FIG. 3, the information layer 12 and the transparent layer 13 are provided on the substrate 11. The information layer 12 is formed of the first dielectric layer 101, the second dielectric layer 102, the crystalline nucleation layer 103, the recording layer 104, the crystalline nucleation layer 109, the third dielectric layer 105, the fourth dielectric layer 106, the interface layer 107, and the reflective layer 108 that are laminated in order from the incident side of the laser beam. The crystalline nucleation layer 109 can be made of a material in the same system as that of the material of the crystalline nucleation layer 103, and also has the same configuration and function as those of the crystalline nucleation layer 103.

Next, the description is directed to a method for manufacturing each of the information recording media 1, 14, and 15 as shown in FIGS. 1, 2, and 3, respectively.

Initially, the substrate 11 (having a thickness of, for example, 1100 μm) is prepared and placed in a film forming device.

Then, the reflective layer 108 is formed on the substrate 11. When guide grooves for guiding the laser beam 10 are formed on the substrate 11, the reflective layer 108 is formed on a surface on which these guide grooves are formed. The reflective layer 108 can be formed by performing sputtering with respect to a sputtering target formed of a metal or an alloy constituting the reflective layer 108 in Ar gas atmosphere or an atmosphere of a mixture of Ar gas and a reactive gas (at least one gas selected from oxygen gas and nitrogen gas).

Then, the interface layer 107 is formed on the reflective layer 108 as required. The interface layer 107 can be formed by performing sputtering with respect to a sputtering target formed of elements constituting the interface layer 107 in Ar gas atmosphere or an atmosphere of a mixture of Ar gas and a reactive gas.

Then, the fourth dielectric layer 106 is formed on the interface layer 107 (in a configuration without the interface layer 107, on the reflective layer 108) as required. The fourth dielectric layer 106 can be formed by performing sputtering with respect to a sputtering target formed of a compound constituting the fourth dielectric layer 106 in Ar gas atmosphere or an atmosphere of a mixture of Ar gas and a reactive gas. Further, the fourth dielectric layer 106 also can be formed by performing reactive sputtering with respect to a sputtering target formed of a metal containing elements constituting the fourth dielectric layer 106 in an atmosphere of a mixture of Ar gas and a reactive gas.

Then, the third dielectric layer 105 is formed on the fourth dielectric layer 106 (in a configuration without the fourth dielectric layer 106, on the interface layer 107 or the reflective layer 108). The third dielectric layer 105 can be formed in the same manner as the fourth dielectric layer 106.

Then, the crystalline nucleation layer 109 is formed on the third dielectric layer 105 as required (in the case of manufacturing the information recording medium 14 or 15 as shown in FIG. 2 or 3, respectively). The crystalline nucleation layer 109 can be formed by performing sputtering, using one power source, with respect to a sputtering target containing at least one element selected from Bi and Te, and M1, a sputtering target containing at least one selected from Bi(M1) and Te(M1), or a sputtering target containing at least one selected from $BiTe(M1)_2$, $Bi_2Te(M1)$, and $BiTe_2(M1)$ according to the composition of the crystalline nucleation layer 109.

As a gas used in an atmosphere for sputtering in forming the crystalline nucleation layer 109, Ar gas, Kr gas, a mixture of Ar gas and a reactive gas, or a mixture of Kr gas and a reactive gas, for example, can be used. Further, the crystalline nucleation layer 109 also can be formed by simultaneously performing sputtering, using a plurality of power sources, with respect to respective sputtering targets of Bi, Te, and M1. Further, the crystalline nucleation layer 109 also can be formed by simultaneously performing sputtering, using a plurality of power sources, with respect to a binary sputtering target, a ternary sputtering target, or the like in which any of Bi, Te, and M1 are combined. In each of these cases where such sputtering targets are used, the crystalline nucleation layer 109 also can be formed by performing sputtering in an atmosphere of Ar gas, Kr gas, a mixture of Ar gas and a reactive gas, or a mixture of Kr gas and a reactive gas.

Then, the recording layer 104 is formed on the crystalline nucleation layer 109 (in a configuration without the crystalline nucleation layer 109, on the third dielectric layer 105). The recording layer 104 can be formed by performing sputtering, using one power source, with respect to a sputtering target formed of a Ge-M2-Te alloy, a sputtering target formed of a Ge-M2-Te-M3 alloy, a sputtering target formed of a Ge-M2-Te-M4 alloy, or a sputtering target formed of an Sb—Te-M5 alloy according to the composition of the recording layer 104.

As a gas used in an atmosphere for sputtering in forming the recording layer 104, Ar gas, Kr gas, a mixture of Ar gas and a reactive gas, or a mixture of Kr gas and a reactive gas can be used. Further, the recording layer 104 also can be formed by simultaneously performing sputtering, using a plurality of power sources, with respect to sputtering targets containing a required element selected from Ge, M2, Te, M3, M4, and M5. Further, the recording layer 104 also can be formed by simultaneously performing sputtering, using a plurality of power sources, with respect to binary sputtering targets, ternary sputtering targets, or the like in which required elements selected from Ge, M2, Te, M3, M4, and M5 are combined. In each of these cases where such sputtering targets are used, the recording layer 104 also can be formed by performeing sputtering in an atmosphere of Ar gas, Kr gas, a mixture of Ar gas and a reactive gas, or a mixture of Kr gas and a reactive gas.

Then, the crystalline nucleation layer 103 is formed on the recording layer 104 as required (in the case of manufacturing the information recording medium 1 or 15 as shown in FIG. 1 or 3, respectively).

Then, the second dielectric layer 102 is formed on the crystalline nucleation layer 103 (in a configuration without the crystalline nucleation layer 103, on the recording layer 104). The second dielectric layer 102 can be formed by performing sputtering with respect to a sputtering target formed of a compound constituting the second dielectric layer 102 in Ar gas atmosphere or an atmosphere of a mixture of Ar gas and a reactive gas. Further, the second dielectric layer 102 also can be formed by performing reactive sputtering with respect to a sputtering target formed of a metal constituting the second dielectric layer 103 in an atmosphere of a mixture of Ar gas and a reactive gas.

Then, the first dielectric layer 101 is formed on the second dielectric layer 102. The first dielectric layer 101 can be formed by performing sputtering with respect to a sputtering target formed of a compound constituting the first dielectric layer 101 in Ar gas atmosphere or an atmosphere of a mixture of Ar gas and a reactive gas. Further, the first dielectric layer 101 also can be formed by performing reactive sputtering with respect to a sputtering target containing elements constituting the first dielectric layer 101 in an atmosphere of a mixture of Ar gas and a reactive gas.

Finally, the transparent layer 13 is formed on the first dielectric layer 101. The transparent layer 13 can be formed in the following manner. That is, a photocurable resin (particularly, an ultraviolet curable resin) or a delayed action type thermosetting resin is applied on the first dielectric layer 101, and then an entire laminate thus obtained is rotated so that the resin is spread uniformly (spin-coated), after which the resin is allowed to cure. Further, for the transparent layer 13, a transparent disk-shaped substrate made of a resin such as polycarbonate, amorphous polyolefin, and PMMA, or glass also may be used. In the case of using such a substrate, the transparent layer 13 can be formed by performing spin coating in which a resin such as a photocurable resin (particularly, an ultraviolet curable resin) and a delayed action type thermosetting resin is applied on the first dielectric layer 101 and then the substrate is bonded onto the first dielectric layer 101, after which the resin is allowed to cure. Further, it also is possible to bond a substrate, on which an adhesive resin is applied uniformly in advance, to the first dielectric layer 101.

After forming the first dielectric layer 101, or after forming the transparent layer 13, an initializing process in which an entire surface of the recording layer 104 is crystallized may be performed as required. The recording layer 104 can be crystallized by irradiation of laser beams.

Each of the information recording media 1, 14, and 15 according to this embodiment can be manufactured in the above-mentioned manner.

In this embodiment, a sputtering method was used as a method for forming each film. However, there is no limitation on the method to be used, and it also is possible to use a vacuum deposition method, an ion plating method, a CVD (Chemical Vapor Deposition) method, MBE (Molecular Beam Epitaxy), or the like.

Embodiment 2

Figure 4:
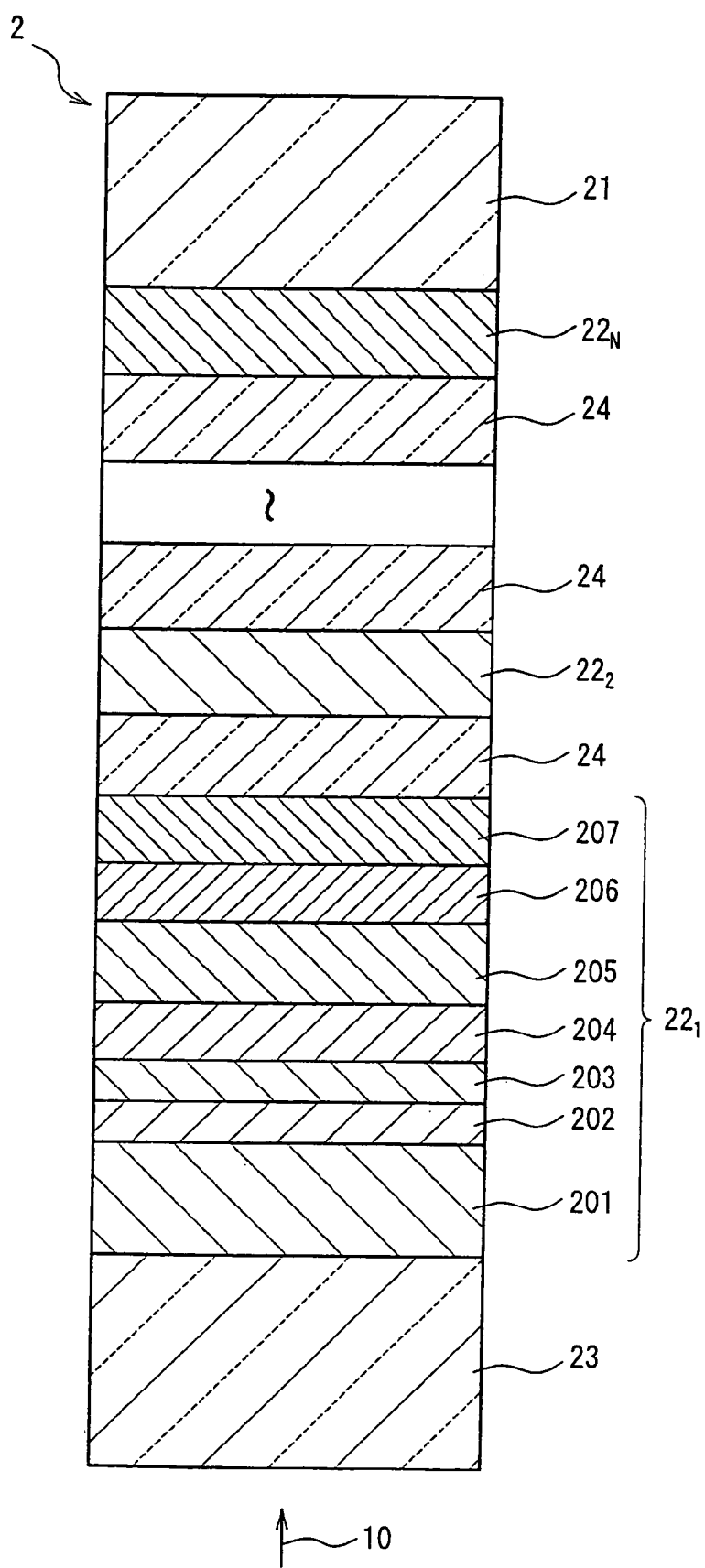
FIG. 4 is a cross-sectional view showing an exemplary configuration of an information recording medium according to Embodiment 2 of the present invention.

The description is directed to another embodiment of the information recording medium of the present invention. An information recording medium of this embodiment is a medium suitable for use in information recording/reproduction using a so-called blue-violet laser having a wavelength of 390 to 420 nm. FIG. 4 shows a partial cross-sectional configuration of an information recording medium 2 of this embodiment. The information recording medium 2 is an optical information recording medium with a multi-layer structure that includes a plurality of information layers and allows information recording/reproduction to be performed with respect to each of the information layers by irradiation of a laser beam 10 from one side.

In the information recording medium 2, N(N represents a natural number satisfying N≧2) layers of first to N-th information layers $22_1$ to $22_N$ are laminated on a substrate 21, and a transparent layer 23 further is provided on the information layers. In this specification, the first information layer and the N-th information layer when counted from an incident side of the laser beam 10 are referred to as the first information layer $22_1$ and the N-th information layer $22_N$, respectively. Each adjacent pair of the information layers are laminated through an optical separation layer 24. In the information recording medium 2, each of the first to (N−1)-th information layers $22_1$ to $22_{N-1}$ is provided with a light transmission property. This is because it is necessary to allow the laser beam 10 to reach the N-th information layer $22_N$.

The substrate 21 and the transparent layer 23 can be made of the same materials as those of the substrate 11 and the transparent layer 13 described with regard to Embodiment 1, respectively. Further, these substrate and layer also have the same configurations and functions as those of the substrate 11 and the transparent layer 13 described with regard to Embodiment 1, respectively.

Preferably, the optical separation layer 24 is made of a resin such as a photocurable resin (particularly, an ultraviolet curable resin) and a delayed action type thermosetting resin, or a dielectric, and has a low light absorptance with respect to the laser beam 10 to be used. Further, preferably, the optical separation layer 24 optically has a low birefringence at a wavelength in a short wavelength region.

The optical separation layer 24 provided between each pair of the information layers is used to separate respective focusing positions of the first information layer $22_1$, the second information layer $22_2$, and . . . to the N-th information layer $22_N$ from one another. It is required that the optical separation layer 24 have a thickness of not less than a focal depth $\Delta Z$ determined by a numerical aperture (NA) of an objective lens and a wavelength $\lambda$ of the laser beam 10. Assuming that a reference light intensity of a focal point corresponds to 80% of that obtained when there is no aberration, the focal depth $\Delta Z$ can be approximated by a formula $\Delta Z = \lambda/\{2(NA)^2\}$. Where $\lambda=400$ nm and NA=0.6, $\Delta Z=0.556$ μm and thus ±0.6 μm defines a range of the focal depth. Thus, in this case, it is required that the optical separation layer 24 have a thickness of not less than 1.2 μm. Further, desirably, a distance between each pair of the information layers is set so as to be in a range that allows the laser beam 10 to be focused using an objective lens. Thus, preferably, the optical separation layer 24 has a thickness that falls within a range of tolerances defined by an objective lens (for example, not more than 50 μm).

In the optical separation layer 24, guide grooves for guiding the laser beam 10 may be formed as required on a surface on the incident side of the laser beam 10.

In such a case, by irradiation of the laser beam 10 from one side alone, recording/reproduction can be performed with respect to a K-th information layer $22_K$ (K represents a natural number satisfying 1<K≦N) using the laser beam 10 that has been transmitted through the first information layer $22_1$ to a (K−1)-th information layer $22_{K-1}$.

Hereinafter, a configuration of the first information layer $22_1$ will be described in detail.

The first information layer $22_1$ includes a first dielectric layer 201, a second dielectric layer 202, a crystalline nucleation layer 203, a recording layer 204, a third dielectric layer 205, a reflective layer 206, and a transmittance adjusting layer 207 that are arranged in order from the incident side of the laser beam 10.

The first dielectric layer 201 can be made of the same material as that of the first dielectric layer 101 described with regard to Embodiment 1. Further, this layer also has the same function as that of the first dielectric layer 101 in Embodiment 1.

By calculation based on the matrix method, the film thickness of the first dielectric layer 201 can be determined so as to satisfy the condition that a change in an amount of reflected light between when the recording layer 204 is in a crystalline phase and when the recording layer 204 is in an amorphous phase can be increased and light absorption in the recording layer 204 can be increased.

The second dielectric layer 202 can be made of the same material as that of the second dielectric layer 102 described with regard to Embodiment 1. Further, this layer also has the same function and configuration as those of the second dielectric layer 102 in Embodiment 1.

The third dielectric layer 205 can be made of the same material as that of the third dielectric layer 105 described with regard to Embodiment 1. Further, this layer also has the same function and configuration as those of the third dielectric layer 105 in Embodiment 1.

The crystalline nucleation layer 203 can be made of the same material as that of the crystalline nucleation layer 103 in Embodiment 1. Further, this layer also has the same function as that of the crystalline nucleation layer 103 in Embodiment 1.

The crystalline nucleation layer 203 has a thickness preferably in a range of 0.3 nm to 1.5 nm, and more preferably in a range of 0.5 nm to 1 nm, so as to have an excellent erasing capability and capability of rewriting information that has been stored for a long term even at a high transfer rate, and to obtain the highest possible transmittance of the first information layer $22_1$.

The recording layer 204 can be made of the same material as that of the recording layer 104 described with regard to Embodiment 1. Preferably, the recording layer 204 has a thickness as thin as possible for the following reason. That is, in order to allow laser beams in an amount required in recording/reproduction to reach an information layer (an information layer arranged farther from the incident side of the laser beam 10 than the first information layer $22_1$) with respect to which information recording/reproduction is to be performed using a laser beam that has been transmitted through the first information layer $22_1$, it is required that the first information layer $22_1$ have a higher transmittance. For example, when the recording layer 204 is made of any of a material represented by a composition formula $Ge_a(M2)_bTe_{3+a}$, a material represented by a composition formula $((Ge-(M3))_aSb_bTe_{3+a})$ in which (M3) is substituted for a part of Ge in $Ge_a(M2)_bTe_{3+a}$, and a material represented by a composition formula $(Ge_a(M2)_bTe_{3+a})_{100-c}(M4)_c$, the recording layer 204 has a thickness preferably in a range of 4 nm to 9 nm, and more preferably in a range of 5 nm to 8 nm. Further, when the recording layer 204 is formed of a material represented by a composition formula $(Sb_dTe_{100-d})_{100-e}(M5)_e$, the recording layer 204 has a thickness preferably in a range of 3 nm to 8 nm, and more preferably in a range of 4 nm to 6 nm.

The reflective layer 206 can be made of the same material as that of the reflective layer 108 described with regard to Embodiment 1. Further, this layer also has the same function as that of the reflective layer 108 in Embodiment 1. In order to obtain the highest possible transmittance of the first information layer $22_1$, the reflective layer 206 has a thickness preferably in a range of 3 nm to 15 nm, and more preferably in a range of 8 nm to 12 nm. The reflective layer 206 has a thickness in this range, and thus a sufficient heat diffusing function for the reflective layer 206 can be obtained, and a sufficient reflectance in the first information layer $22_1$ can be secured. Further, a sufficient transmittance of the first information layer $22_1$ also can be attained.

The transmittance adjusting layer 207 is formed of a dielectric and has a function of adjusting the transmittance of the first information layer $22_1$. By this transmittance adjusting layer 207, both a transmittance $T_c$ (%) in the first information layer $22_1$ obtained when the recording layer 204 is in a crystalline phase and a transmittance $T_a$ (%) in the first information layer $22_1$ obtained when the recording layer 204 is in an amorphous phase can be increased. Specifically, the first information layer $22_1$ including the transmittance adjusting layer 207 has values of the transmittances $T_c$ and $T_a$ increased by about 2% to 10% compared with the first information layer $22_1$ without the transmittance adjusting layer 207. Further, the transmittance adjusting layer 207 also has a function of allowing heat generated in the recording layer 204 to be diffused effectively.

In order to obtain a further enhanced action of increasing the transmittances $T_c$ and $T_a$ of the first information layer $22_1$, the transmittance adjusting layer 207 has a refractive index n and an extinction coefficient k that preferably satisfy $2.0 \leq n$ and $k \leq 0.1$, and more preferably satisfy $2.0 \leq n \leq 3.0$ and $k \leq 0.05$, respectively.

The transmittance adjusting layer 207 has a film thickness $d_1$ preferably in a range represented by $(1/32) \lambda/n \leq d_1 \leq (3/16) \lambda/n$ or $(17/32) \lambda/n \leq d_1 \leq (11/16) \lambda/n$, and more preferably in a range represented by $(1/16) \lambda/n \leq d_1 \leq (5/32) \lambda/n$ or $(9/16) \lambda/n \leq d_1 \leq (21/32) \lambda/n$. For example, where the wavelength λ of the laser beam 10 and the refractive index n of the transmittance adjusting layer 207 satisfy $350 \text{ nm} \leq \lambda \leq 450 \text{ nm}$ and $2.0 \leq n \leq 3.0$, respectively, the film thickness $d_1$ is preferably in a range represented by $3 \text{ nm} \leq d_1 \leq 40 \text{ nm}$ or $60 \text{ nm} \leq d_1 \leq 130 \text{ nm}$, and more preferably in a range represented by $7 \text{ nm} \leq d_1 \leq 30 \text{ nm}$ or $65 \text{ nm} \leq d_1 \leq 120 \text{ nm}$. The film thickness $d_1$ has a value selected from values in this range, and thus both the transmittances $T_c$ and $T_a$ of the first information layer $22_1$ can be increased.

The transmittance adjusting layer 207 can be made of, for example, an oxide such as $TiO_2$, $ZrO_2$, $ZnO$, $Nb_2O_5$, $Ta_2O_5$, $SiO_2$, $Al_2O_3$, $Bi_2O_3$, $Cr_2O_3$, and Sr—O. Further, a nitride such as Ti—N, Zr—N, Nb—N, Ta—N, Si—N, Ge—N, Cr—N, Al—N, Ge—Si—N, and Ge—Cr—N also can be used. Further, a sulfide such as ZnS also can be used. Further, a mixture of the above-mentioned materials also can be used. Preferably, above all, particularly, $TiO_2$ or a material containing $TiO_2$ is used. Such materials have a high refractive index (n=2.5 to 2.8) and a low extinction coefficient (k=0.0 to 0.05), and thus the action of increasing the transmittance of the first information layer $22_1$ can be enhanced.

In order to allow laser beams in an amount required for recording/reproduction to reach the second to N-th information layers $22_2$ to $22_N$, the transmittances $T_c$ and $T_a$ of the first information layer $22_1$ preferably satisfy $40 < T_c$ and $40 < T_a$, and more preferably satisfy $46 < T_c$ and $46 < T_a$, respectively. The transmittances $T_c$ and $T_a$ of the first information layer $22_1$ preferably satisfy $-5 \leq (T_c - T_a) \leq 5$, and more preferably satisfy $-3 \leq (T_c - T_a) \leq 3$. If the transmittances $T_c$ and $T_a$ satisfy these conditions, when information recording/reproduction is performed with respect to the second to n-th information layers $22_2$ to $22_n$, less influence is caused by a change in transmittance depending on a state of the recording layer 204 in the first information layer $22_1$, thereby allowing an excellent recording/reproduction property to be obtained.

Preferably, a reflectance $R_{cl}$ of the first information layer $22_1$ when the recording layer 204 is in a crystalline phase and a reflectance $R_{al}$ of the first information layer $22_1$ when the recording layer 204 is in an amorphous phase satisfy $R_{al} < R_{cl}$. This allows the reflectance to be higher in an initial state where information has not been recorded yet than in the state where the information has been recorded, thereby allowing a stable recording/reproducing operation to be performed. Further, in order to obtain an excellent recording/reproduction property by increasing a difference in reflectance ($R_{cl} - R_{al}$), $R_{cl}$ and $R_{al}$ preferably satisfy $0.1 \leq R_{al} \leq 5$ and $4 \leq R_{cl} \leq 15$, and more preferably satisfy $0.1 \leq R_{al} \leq 3$ and $4 \leq R_{cl} \leq 10$.

Figure 5:
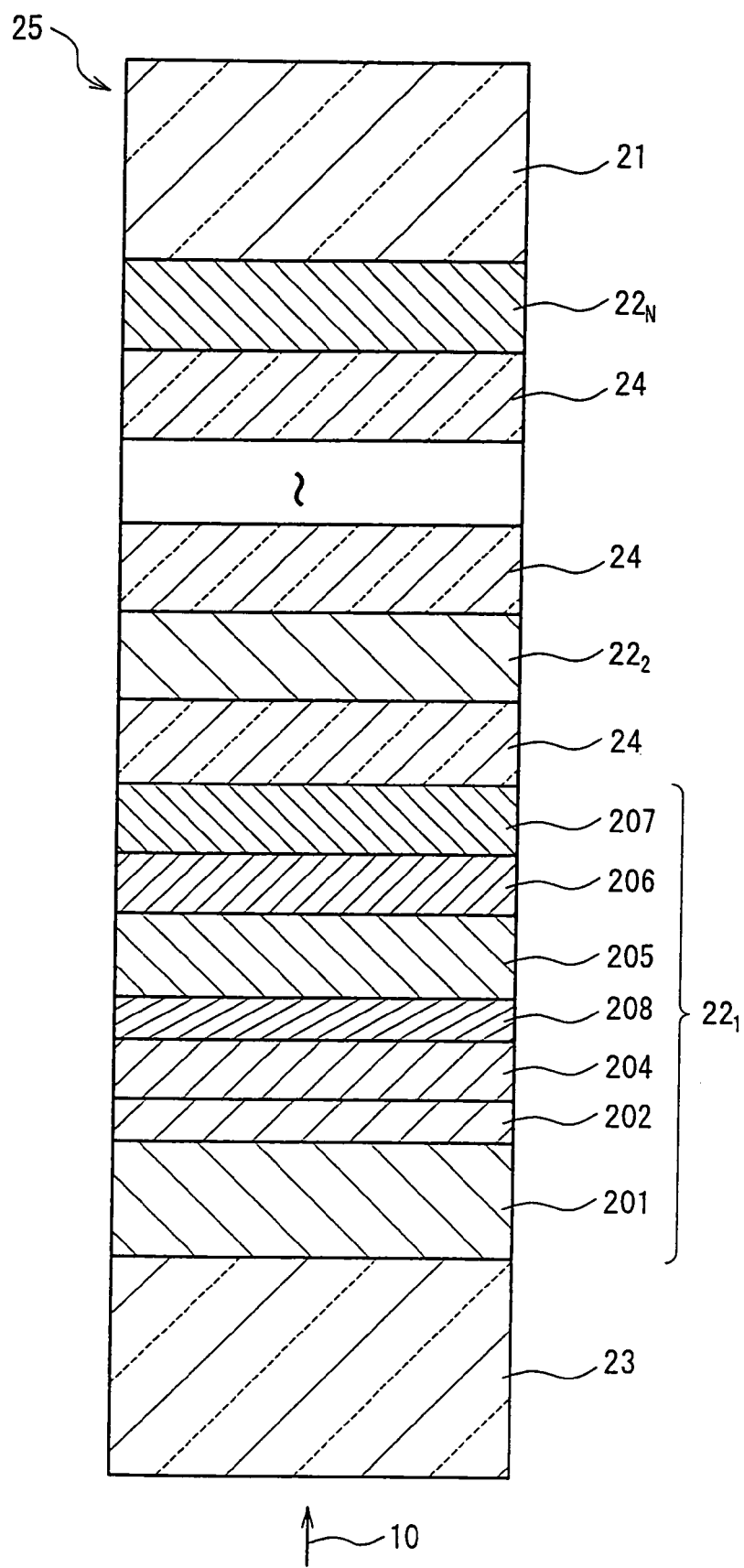
FIG. 5 is a cross-sectional view showing another exemplary configuration of an information recording medium according to Embodiment 2 of the present invention.
Figure 6:
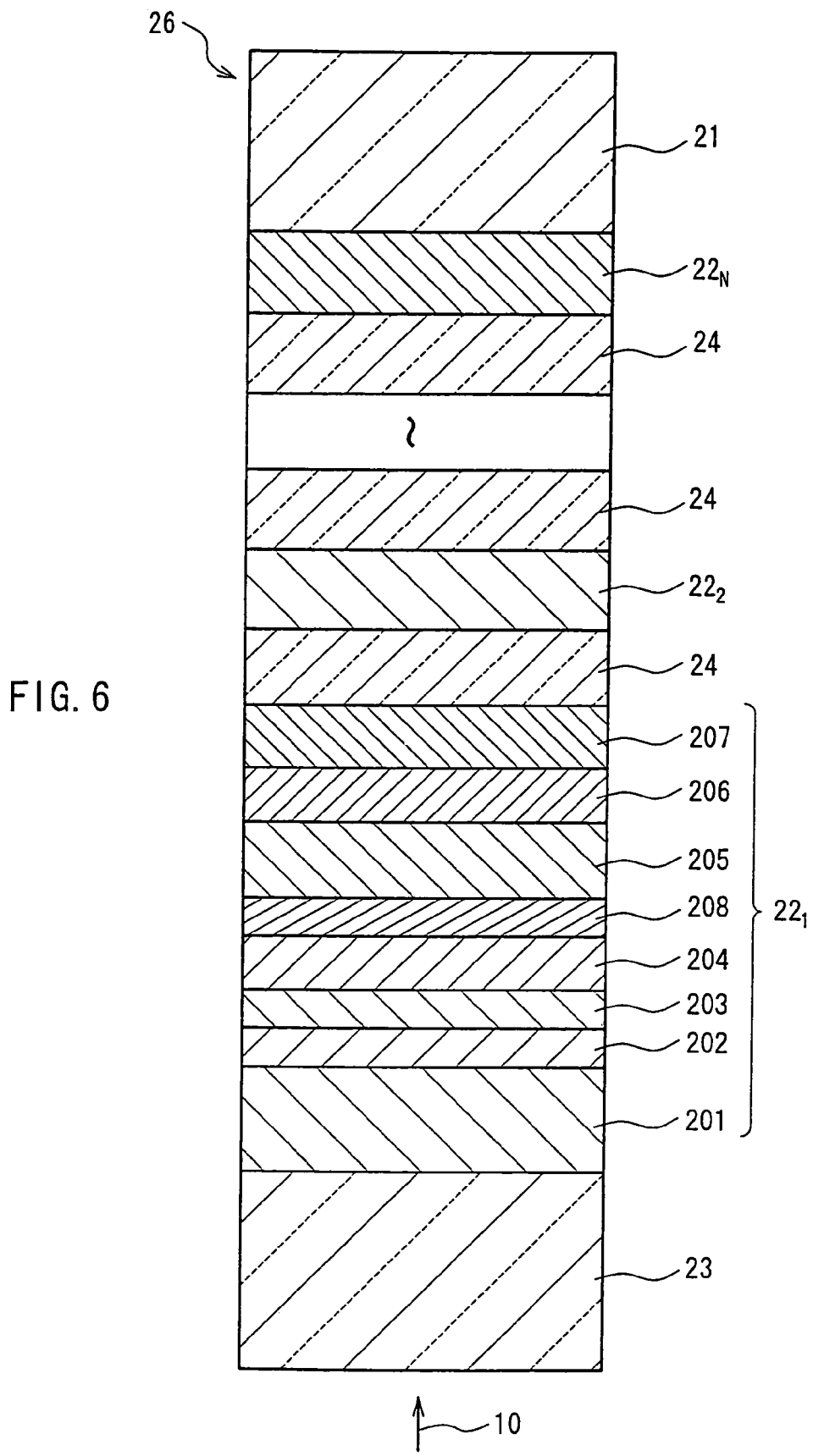
FIG. 6 is a cross-sectional view showing still another exemplary configuration of an information recording medium according to Embodiment 2 of the present invention.

In the first information layer $22_1$, the crystalline nucleation layer may be arranged between the recording layer 204 and the third dielectric layer 205. In such a case, as an information recording medium 25 as shown in FIG. 5, the first to N-th information layers $22_1$ to $22_N$ and the transparent layer 23 are provided on the substrate 21. The first information layer $22_1$ is formed of the first dielectric layer 201, the second dielectric layer 202, the recording layer 204, a crystalline nucleation layer 208, the third dielectric layer 205, the reflective layer 206, and the transmittance adjusting layer 207 that are laminated in order from the incident side of the laser beam. Further, in the first information layer $22_1$, the crystalline nucleation layers may be arranged between the recording layer 204 and the second dielectric layer 202 and between the recording layer 204 and the third dielectric layer 205, respectively. In such a case, as an information recording medium 26 as shown in FIG. 6, the first to N-th information layers $22_1$ to $22_N$ and the transparent layer 23 are provided on the substrate 21. The first information layer $22_1$ is formed of the first dielectric layer 201, the second dielectric layer 202, the crystalline nucleation layer 203, the recording layer 204, the crystalline nucleation layer 208, the third dielectric layer 205, the reflective layer 206, and the transmittance adjusting layer 207 that are laminated in order from the incident side of the laser beam. The crystalline nucleation layer 208 can be made of a material in the same system as that of the material of the crystalline nucleation layer 203, and also has the same configuration and function as those of the crystalline nucleation layer 203.

The information layers other than the first information layer $22_1$ that are included in each of the optical information recording media 2, 25, and 26 according to this embodiment may have the same film structure as that of the first information layer $22_1$, and further, may have another structure. Further, at least one of a plurality of the information layers may have the same film structure as that of the first information layer $22_1$ described with regard to this embodiment, and the other information layers may have a different structure. In such a case, preferably, the first information layer $22_1$ arranged at a position closest to a surface on the incident side of the laser beam has the film structure described with regard to this embodiment. Further, any one of the information layers other than the first information layer $22_1$ may be configured as a ROM (Read Only Memory) type information layer or as a WO (Write Once) type information layer that allows writing to be performed only once.

Next, the description is directed to a method for manufacturing each of the information recording media 2, 25, and 26 according to this embodiment.

Initially, on the substrate 21 (having a thickness of, for example, 1100 µm), (N−1) layers of the N-th to second information layers $22_N$ to $22_2$ are laminated in order through the optical separation layers 24. Each of the information layers is formed of a single-layer film or a multi-layer film, and the films can be formed by sequentially performing sputtering with respect to sputtering targets used as materials, respectively, in a film forming device. Further, the optical separation layer 24 can be formed in the following manner. That is, a photocurable resin (particularly, an ultraviolet curable resin) or a delayed action type thermosetting resin is applied on the information layer, and the resin is allowed to be spread uniformly by performing spin coating, after which the resin is allowed to cure. When guide grooves for the laser beam 10 are formed on the optical separation layer 24, a transfer substrate (mold) with a surface on which grooves having a predetermined shape are formed is bonded to the resin before being cured. Then, the substrate 21 and the transfer substrate are rotated so that spin coating is performed, and after that, the resin is allowed to cure. Subsequently, the transfer substrate is peeled off from the cured resin, thereby allowing the optical separation layer 24 with a surface on which predetermined guide grooves are formed to be formed.

As described above, (N−1) layers of the information layers are laminated in order on the substrate 21 through the optical separation layers 24, and the optical separation layer 24 further is formed on the information layers.

Then, the first information layer $22_1$ is formed on the optical separation layer 24 formed on the (N−1) layers of the information layers. To be specific, initially, the substrate 21 on which the (N−1) layers of the information layers and the optical separation layers 24 are formed is placed in the film forming device, where the transmittance adjusting layer 207 is formed on the optical separation layer 24. The transmittance adjusting layer 207 can be formed by performing sputtering with respect to a sputtering target formed of a compound constituting the transmittance adjusting layer 207 in Ar gas atmosphere or an atmosphere of a mixture of Ar gas and a reactive gas. Further, the transmittance adjusting layer 207 also can be formed by performing reactive sputtering in an atmosphere of a mixture of Ar gas and a reactive gas using a metal formed of elements constituting the transmittance adjusting layer 207 as a sputtering target.

Then, the reflective layer 206 is formed on the transmittance adjusting layer 207. The reflective layer 206 can be formed in the same manner as in the case of forming the reflective layer 108 described with regard to Embodiment 1.

Then, the third dielectric layer 205 is formed on the reflective layer 206. The third dielectric layer 205 can be formed in the same manner as in the case of forming the third dielectric layer 105 described with regard to Embodiment 1.

Then, the crystalline nucleation layer 208 is formed on the third dielectric layer 205 as required (in the case of manufacturing the information recording medium 25 or 26 as shown in FIG. 5 or 6, respectively). The crystalline nucleation layer 208 can be formed in the same manner as in the case of forming the crystalline nucleation layer 109 described with regard to Embodiment 1. In the case where the crystalline nucleation layer 208 is not formed on the third dielectric layer 205 (in the case of the information recording medium 2 as shown in FIG. 4), the crystalline nucleation layer 203 is formed on the recording layer 204 described later.

Then, the recording layer 204 is formed on the crystalline nucleation layer 208 (in a configuration without the crystalline nucleation layer 209, on the third dielectric layer 205). The recording layer 204 can be formed in the same manner as in the case of forming the recording layer 104 described with regard to Embodiment 1.

Then, the crystalline nucleation layer 203 is formed on the recording layer 204 as required (in the case of manufacturing the information recording medium 2 or 26 as shown in FIG. 4 or 6, respectively).

Then, the second dielectric layer 202 is formed on the crystalline nucleation layer 203 (when the crystalline nucleation layer 203 is not provided, on the recording layer 204). The second dielectric layer 202 can be formed in the same manner as in the case of forming the second dielectric layer 102 described with regard to Embodiment 1.

Then, the first dielectric layer 201 is formed on the second dielectric layer 202. The first dielectric layer 201 can be formed in the same manner as in the case of forming the first dielectric layer 101 described with regard to Embodiment 1.

Finally, the transparent layer 23 is formed on the first dielectric layer 201. The transparent layer 23 can be formed in the same manner as in the case of forming the transparent layer 13 described with regard to Embodiment 1.

After forming the first dielectric layer 201, or after forming the transparent layer 23, an initializing process in which an entire surface of the recording layer 204 is crystallized may be performed as required. The recording layer 204 can be crystallized by irradiation of laser beams.

The information recording media 2, 25, and 26 according to this embodiment can be manufactured in the above-mentioned manner. In this embodiment, a sputtering method was used as a method for forming each film. However, there is no limitation on the method to be used, and it also is possible to use a vacuum deposition method, an ion plating method, a CVD method, MBE, or the like.

Embodiment 3

Figure 7:
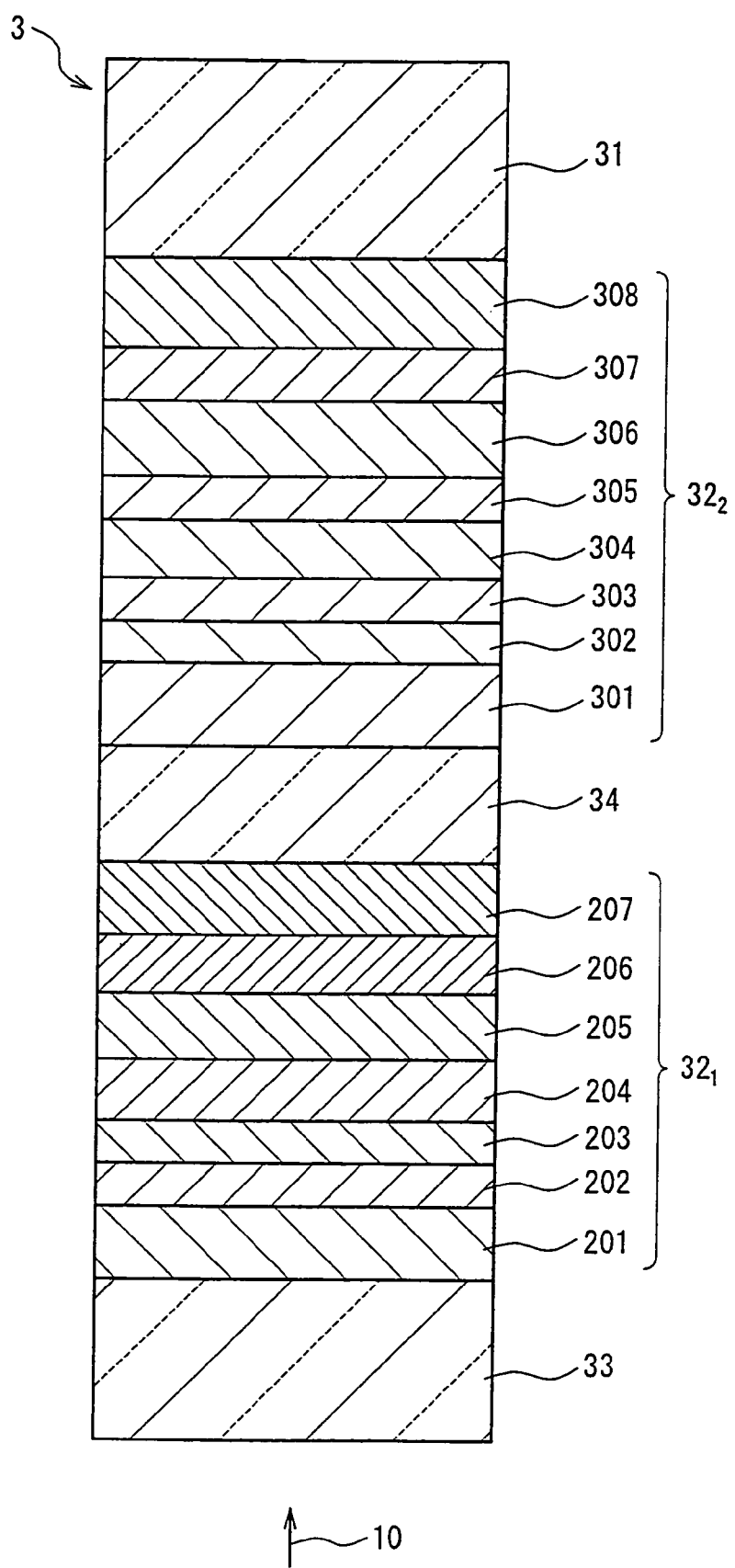
FIG. 7 is a cross-sectional view showing an exemplary configuration of an information recording medium according to Embodiment 3 of the present invention.

The description is directed to still another embodiment of the information recording medium of the present invention. An information recording medium of this embodiment is a medium suitable for use in information recording/reproduction using a so-called blue-violet laser having a wavelength of 390 to 420 nm. FIG. 7 shows a partial cross-sectional configuration of an information recording medium 3 of this embodiment. The information recording medium 3 is an optical information recording medium with a two-layer structure that includes two information layers and allows information recording/reproduction to be performed with respect to each information layer by irradiation of a laser beam 10 from one side.

The information recording medium 3 is composed of a second information layer $32_2$, an optical separation layer 34, a first information layer $32_1$, and a transparent layer 33 that are laminated in order on a substrate 31. The laser beam 10 is allowed to be incident from a side of the transparent layer 33. The substrate 31, the optical separation layer 34, the first information layer $32_1$, and the transparent layer 33 can be made of the same materials as those of the substrate 11 or 21, the optical separation layer 24, the first information layer $22_1$, and the transparent layer 13 or 23 described with regard to Embodiment 1 or 2, respectively, and also have the same configurations and functions as those of these substrate and layers.

Hereinafter, a configuration of the second information layer $32_2$ will be described in detail.

The second information layer $32_2$ includes a first dielectric layer 301, a second dielectric layer 302, a crystalline nucleation layer 303, a recording layer 304, a third dielectric layer 305, a fourth dielectric layer 306, an interface layer 307, and a reflective layer 308 that are arranged in order from an incident side of the laser beam 10. Recording/reproduction is performed with respect to the second information layer $32_2$ using the laser beam 10 that has been transmitted through the transparent layer 33, the first information layer $32_1$, and the optical separation layer 34.

The first dielectric layer 301 can be made of the same material as that of the first dielectric layer 101 described with regard to Embodiment 1. Further, this layer also has the same function as that of the first dielectric layer 101 in Embodiment 1.

By calculation based on the matrix method, the film thickness of the first dielectric layer 301 can be determined so as to satisfy the condition that a change in an amount of reflected light between when the recording layer 304 is in a crystalline phase and when the recording layer 304 is in an amorphous phase can be increased and light absorption in the recording layer 304 can be increased.

The second dielectric layer 302 can be made of the same material as that of the second dielectric layer 102 described with regard to Embodiment 1. Further, this layer also has the same function and configuration as those of the second dielectric layer 102 in Embodiment 1.

The third dielectric layer 305 can be made of the same material as that of the third dielectric layer 105 described with regard to Embodiment 1. Further, this layer also has the same function and configuration as those of the third dielectric layer 105 in Embodiment 1.

The crystalline nucleation layer 303 can be made of the same material as that of the crystalline nucleation layer 103 described with regard to Embodiment 1. Further, this layer also has the same film thickness as that of the crystalline nucleation layer 103 in Embodiment 1.

The recording layer 304 can be made of the same material as that of the recording layer 104 in Embodiment 1. Further, this layer also has the same film thickness as that of the recording layer 104 in Embodiment 1.

The fourth dielectric layer 306 can be made of the same material as that of the fourth dielectric layer 106 described with regard to Embodiment 1. Further, this layer also has the same function and configuration as those of the fourth dielectric layer 106 in Embodiment 1. A configuration without the fourth dielectric layer 306 also is possible.

The reflective layer 308 can be made of the same material as that of the reflective layer 108 described with regard to Embodiment 1. Further, this layer also has the same function and configuration as those of the reflective layer 108 in Embodiment 1.

The interface layer 307 can be made of the same material as that of the interface layer 107 described with regard to Embodiment 1. Further, this layer also has the same function and configuration as those of the interface layer 107 in Embodiment 1. A configuration without the interface layer 307 also is possible.

Figure 8:
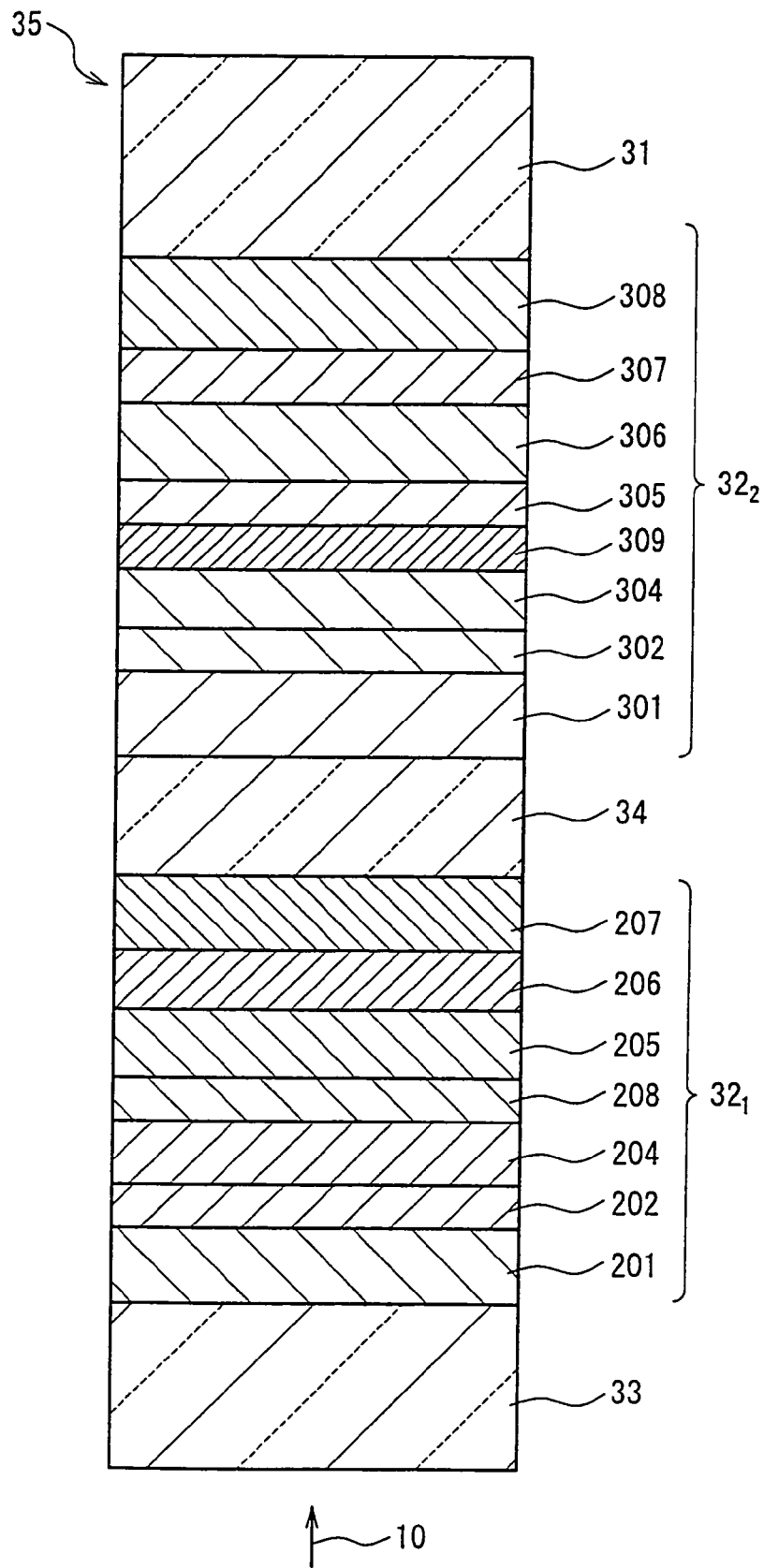
FIG. 8 is a cross-sectional view showing another exemplary configuration of an information recording medium according to Embodiment 3 of the present invention.
Figure 9:
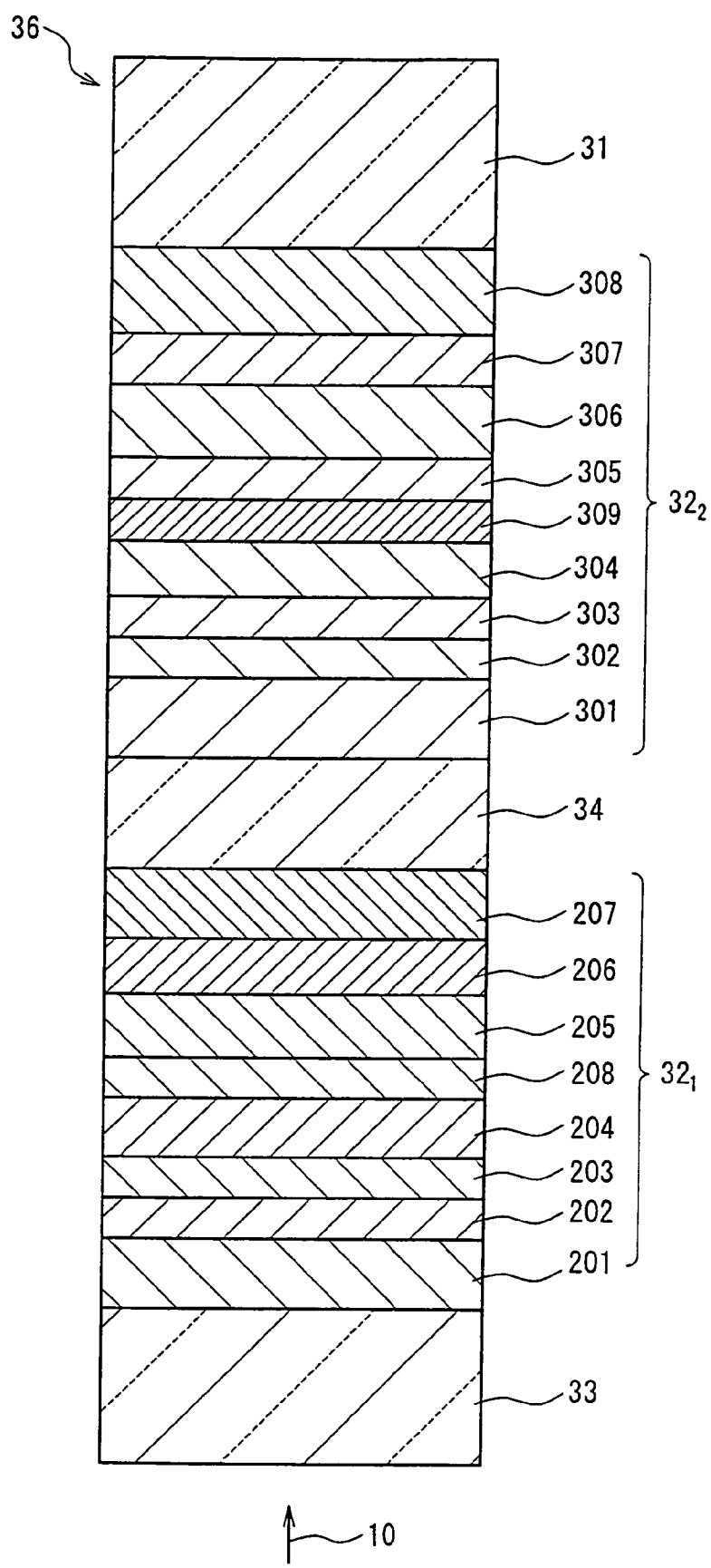
FIG. 9. is a cross-sectional view showing still another exemplary configuration of an information recording medium according to Embodiment 3 of the present invention.

Further, in the second information layer $32_2$, the crystalline nucleation layer may be arranged between the recording layer 304 and the third dielectric layer 305. In such a case, as an information recording medium 35 as shown in FIG. 8, the second information layer $32_2$ is formed of the first dielectric layer 301, the second dielectric layer 302, the recording layer 304, a crystalline nucleation layer 309, the third dielectric layer 305, the fourth dielectric layer 306, the interface layer 307, and the reflective layer 308 that are laminated in order from the incident side of the laser beam. Further, in the second information layer $32_1$, the crystalline nucleation layers may be arranged between the recording layer 304 and the second dielectric layer 302 and between the recording layer 304 and the third dielectric layer 305, respectively. In such a case, as an information recording medium 36 as shown in FIG. 9, the second information layer $32_2$ is formed of the first dielectric layer 301, the second dielectric layer 302, the crystalline nucleation layer 303, the recording layer 304, the crystalline nucleation layer 309, the third dielectric layer 305, the fourth dielectric layer 306, the interface layer 307, and the reflective layer 308 that are laminated in order from the incident side of the laser beam. The crystalline nucleation layer 309 can be made of a material in the same system as that of the material of the crystalline nucleation layer 303, and also has the same configuration and function as those of the crystalline nucleation layer 303.

Next, the description is directed to a method for manufacturing each of the information recording media 3, 35, and 36 according to this embodiment.

Initially, the second information layer $32_2$ is formed on the substrate 31. To be specific, initially, the substrate 31 (having a thickness of, for example, 1100 µm) is prepared and placed in a film forming device.

Then, the reflective layer 308 is formed on the substrate 31. When guide grooves for guiding the laser beam 10 are formed on the substrate 31, the reflective layer 308 is formed on a surface on which the guide grooves are formed. The reflective layer 308 can be formed in the same manner as in the case of forming the reflective layer 108 described with regard to Embodiment 1.

Then, the interface layer 307 is formed on the reflective layer 308 as required. The interface layer 307 can be formed in the same manner as in the case of forming the interface layer 107 described with regard to Embodiment 1.

Then, the fourth dielectric layer 306 is formed on the interface layer 307 (when the interface layer 307 is not provided, on the reflective layer 308) as required. The fourth dielectric layer 306 can be formed in the same manner as in the case of forming the fourth dielectric layer 106 described with regard to Embodiment 1.

Then, the third dielectric layer 305 is formed on the fourth dielectric layer 306 (when the fourth dielectric layer 306 is not provided, on the interface layer 307 or the reflective layer 308). The third dielectric layer 305 can be formed in the same manner as in the case of forming the third dielectric layer 105 in Embodiment 1.

Then, the crystalline nucleation layer 309 is formed on the third dielectric layer 305 as required (in the case of the information recording medium 35 or 36 as shown in FIG. 8 or 9, respectively). The crystalline nucleation layer 309 can be formed in the same manner as in the case of forming the crystalline nucleation layer 109 described with regard to Embodiment 1. In the case where the crystalline nucleation layer 309 is not formed on the third dielectric layer 305, the crystalline nucleation layer 303 is formed on the recording layer 304 described later.

Then, the recording layer 304 is formed on the crystalline nucleation layer 309 (when the crystalline nucleation layer 309 is not provided, on the third dielectric layer 305). The recording layer 304 can be formed in the same manner as in the case of forming the recording layer 104 described with regard to Embodiment 1.

Then, the crystalline nucleation layer 303 is formed on the recording layer 304 as required (in the case of the information recording medium 3 or 36 as shown in FIG. 7 or 9, respectively).

Then, the second dielectric layer 302 is formed on the crystalline nucleation layer 304 (when the crystalline nucleation layer 304 is not provided, on the recording layer 304). The second dielectric layer 302 can be formed in the same manner as in the case of forming the second dielectric layer 103 in Embodiment 1.

Then, the first dielectric layer 301 is formed on the second dielectric layer 302. The first dielectric layer 301 can be formed in the same manner as in the case of forming the first dielectric layer 101 in Embodiment 1.

The second information layer $32_2$ is formed in the above-mentioned manner.

Then, the optical separation layer 34 is formed on the first dielectric layer 301 of the second information layer $32_2$. The optical separation layer 34 can be formed by performing spin coating in which a photocurable resin (particularly, an ultraviolet curable resin) or a delayed action type thermosetting resin is applied on the first dielectric layer 301, after which the resin is allowed to cure. When the optical separation layer 34 is to include guide grooves for the laser beam 10, a transfer substrate (mold) on which grooves are formed is bonded to the resin before being cured. Then, the resin is allowed to cure, and after that, the transfer substrate (mold) is peeled off from the resin, thereby allowing guide grooves to be formed.

After forming the first dielectric layer 301, or after forming the optical separation layer 34, an initializing process in which an entire surface of the recording layer 304 is crystallized may be performed as required. The recording layer 304 can be crystallized by irradiation of laser beams.

Then, the first information layer $32_1$ is formed on the optical separation layer 34. To be specific, initially, the transmittance adjusting layer 207, the reflective layer 206, the third dielectric layer 205, the crystalline nucleation layer 208, the recording layer 204, the second dielectric layer 202, and the first dielectric layer 201 are formed in this order on the optical separation layer 34. Alternatively, the transmittance adjusting layer 207, the reflective layer 206, the third dielectric layer 205, the recording layer 204, the crystalline nucleation layer 203, the second dielectric layer 202, and the first dielectric layer 201 are formed in this order on the optical separation layer 34. Alternatively, the transmittance adjusting layer 207, the reflective layer 206, the third dielectric layer 205, the crystalline nucleation layer 208, the recording layer 204, the crystalline nucleation layer 203, the second dielectric layer 202, and the first dielectric layer 201 are formed in this order on the optical separation layer 34. Each of these layers can be formed in the same manner as that described with regard to Embodiment 2.

Finally, the transparent layer 33 is formed on the first dielectric layer 201. The transparent layer 33 can be formed in the same manner as in the case of forming the transparent layer 13 described with regard to Embodiment 1.

After forming the first dielectric layer 201, or after forming the transparent layer 33, an initializing process in which an entire surface of the recording layer 204 is crystallized may be performed as required. The recording layer 204 can be crystallized by irradiation of laser beams.

Further, after forming the first dielectric layer 201, or after forming the transparent layer 33, an initializing process in which an entire surface of each of the recording layer 304 of the second information layer $32_2$ and the recording layer 204 of the first information layer $32_1$ is crystallized may be performed as required. In such a case, if the recording layer 204 of the first information layer $32_1$ is crystallized first, a laser power required to crystallize the recording layer 304 of the second information layer $32_2$ tends to be increased. On this account, preferably, the recording layer 304 of the second information layer $32_2$ is crystallized before the recording layer 204 of the first information layer $32_1$ is crystallized.

Each of the information recording media 3, 35, and 36 according to this embodiment can be manufactured in the above-mentioned manner. In this embodiment, a sputtering method was used as a method for forming each film. However, there is no limitation on the method to be used, and it also is possible to use a vacuum deposition method, an ion plating method, a CVD method, MBE, or the like.

Embodiment 4

Figure 10:
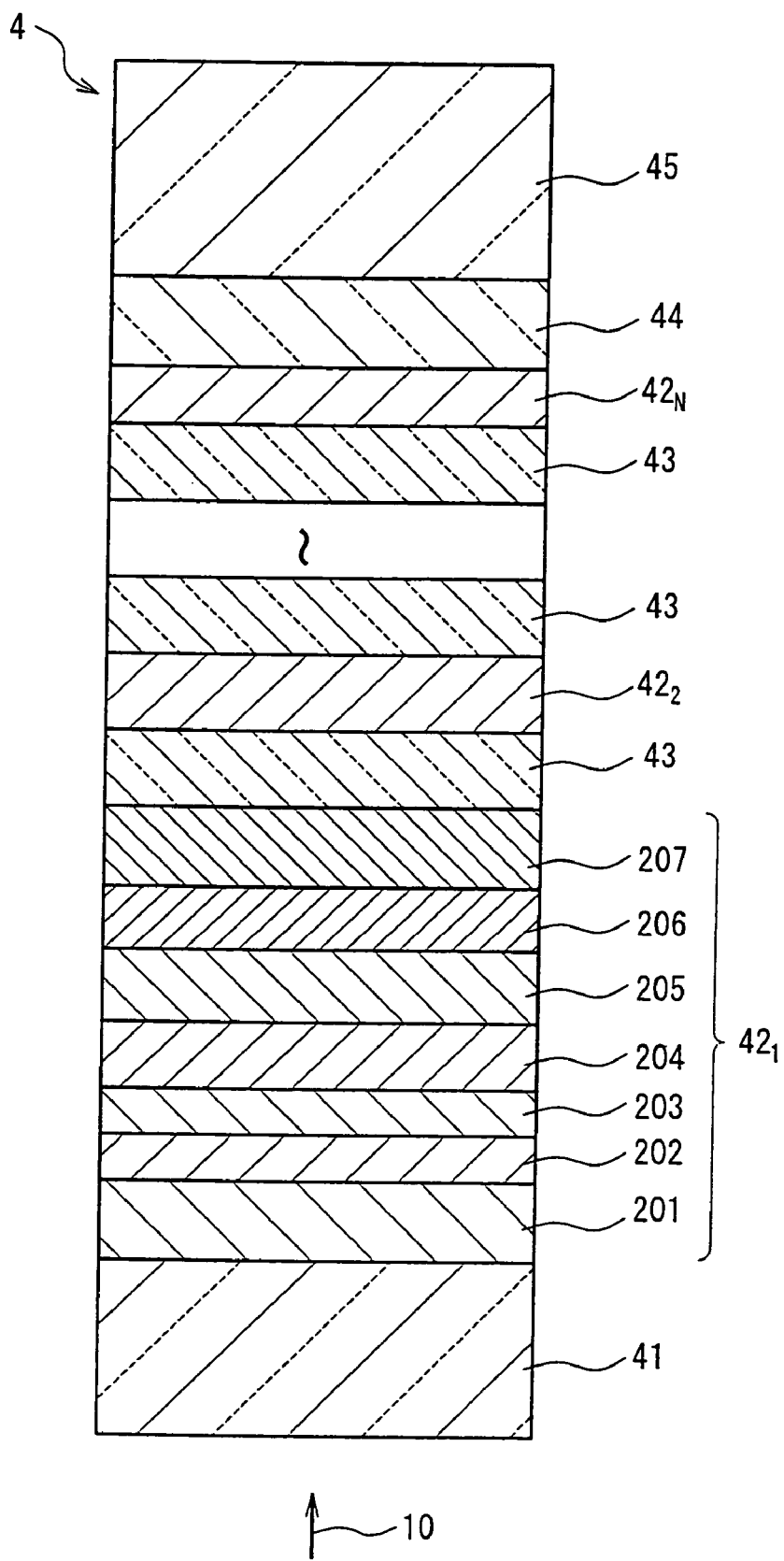
FIG. 10. is a cross-sectional view showing an exemplary configuration of an information recording medium according to Embodiment 4 of the present invention.

The description is directed to still another embodiment of the information recording medium of the present invention. An information recording medium of this embodiment is a medium suitable for use in information recording/reproduction using a so-called blue-violet laser having a wavelength of 390 to 420 nm. FIG. 10 is a cross-sectional view of an information recording medium 4 of this embodiment. The information recording medium 4 is an optical information recording medium with a multi-layer structure that includes a plurality of information layers and allows recording/reproduction to be performed with respect to each information layer by irradiation of a laser beam 10 from one side.

In the information recording medium 4, unlike the information recording media described with regard to Embodiments 1 to 3, a substrate 41 is arranged on an incident side of the laser beam 10. N layers of first to N-th information layers $42_1$ to $42_N$ are laminated on the substrate 41, and a dummy substrate 45 further is arranged on the information layers through an adhesive layer 44. The N layers of the information layers $42_1$ to $42_N$ are laminated one over the other through optical separation layers 43.

As the substrate 11 described with regard to Embodiment 1, each of the substrate 41 and the dummy substrate 45 is a transparent disk-shaped substrate. Each of the substrate 41 and the dummy substrate 45 can be made of, for example, a resin such as polycarbonate, amorphous polyolefin, and PMMA, or glass.

Guide grooves for guiding the laser beam 10 may be formed on a surface of the substrate 41 on a side of the first information layer $42_1$ as required. Preferably, a surface of the substrate 41 on a side opposite to the side of the first information layer $42_1$ is made smooth. Particularly preferably, as a material of each of the substrate 41 and the dummy substrate 45, polycarbonate is used since it exhibits an excellent transfer property and suitability for mass production and achieves a cost reduction. Preferably, the substrate 41 has a thickness in a range of 500 µm to 1200 µm so as to have sufficient strength and allow the information recording medium 4 as a whole to have a thickness of about 1200 µm.

Preferably, the adhesive layer 44 is made of a resin such as a photocurable resin (particularly, an ultraviolet curable resin) and a delayed action type thermosetting resin, and has a low light absorptance with respect to the laser beam 10 to be used. Further, preferably, the adhesive layer 44 optically has a low birefringence at a wavelength in a short wavelength region.

Other layers denoted by the same reference numerals as those for the information recording media according to Embodiment 2 are made of the same materials and have the same configurations and functions as those in the case of Embodiment 2, and the descriptions thereof will be omitted here.

Figure 11:
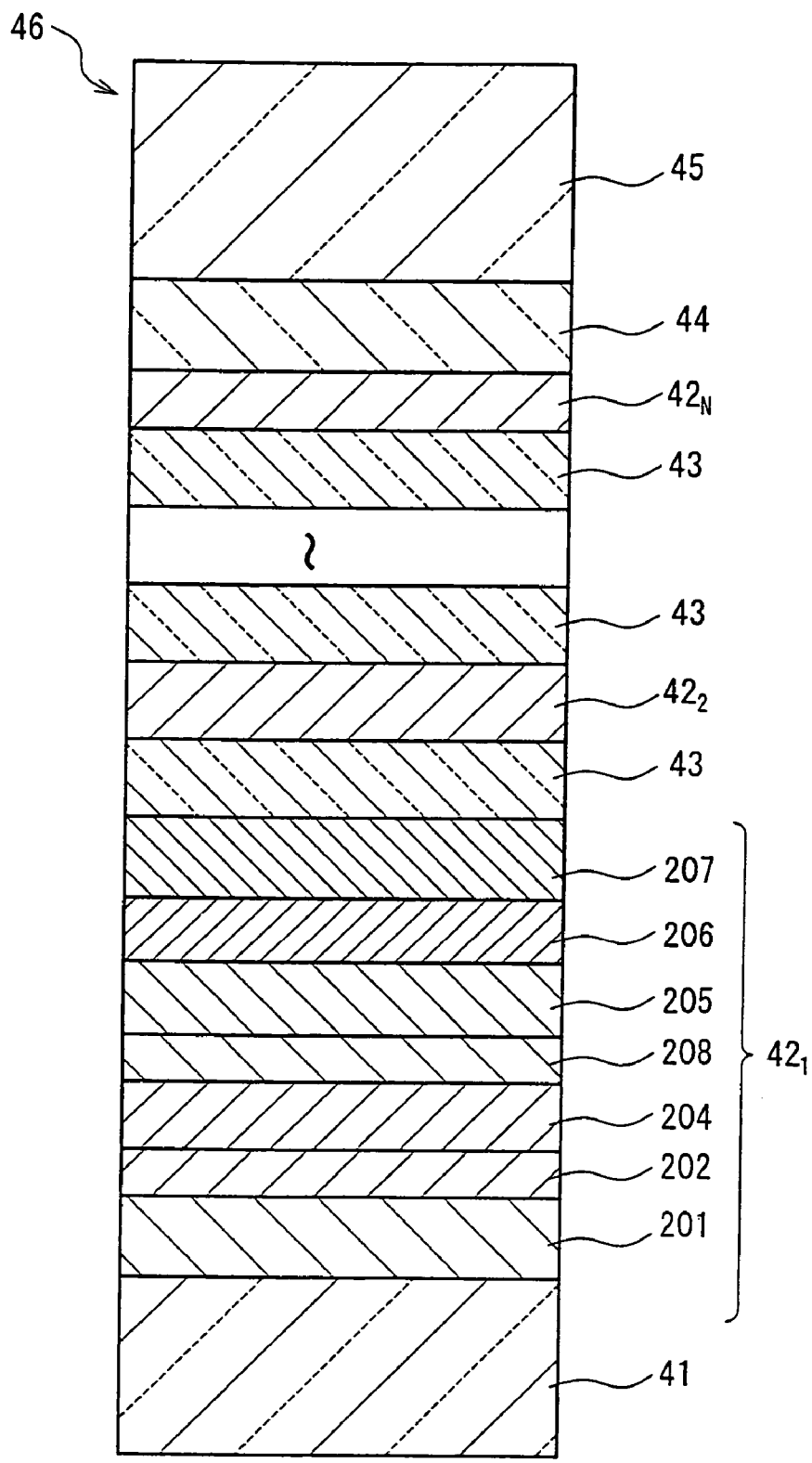
FIG. 11 is a cross-sectional view showing another exemplary configuration of an information recording medium according to Embodiment 4 of the present invention.
Figure 12:
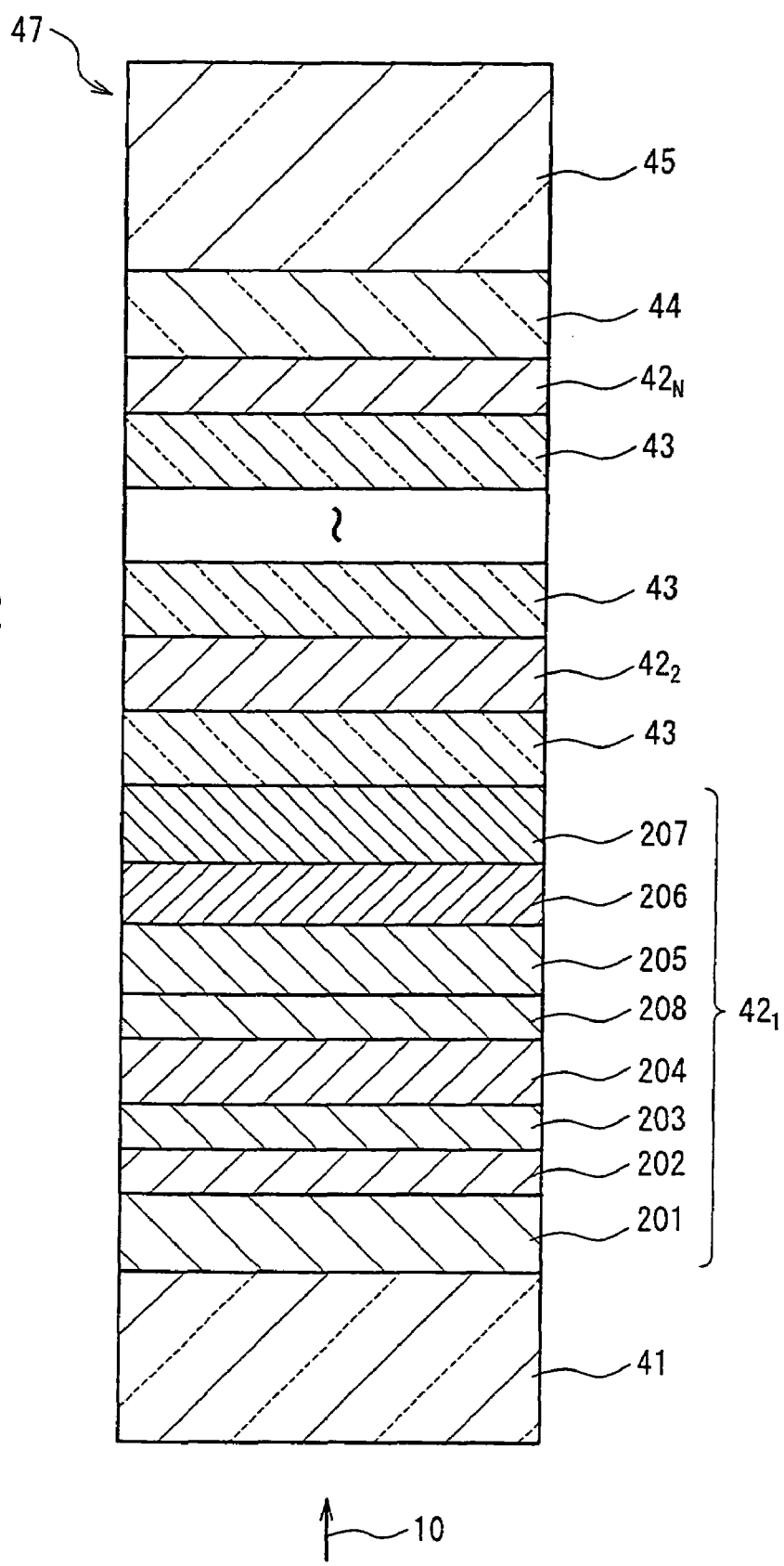
FIG. 12. is a cross-sectional view showing still another exemplary configuration of an information recording medium according to Embodiment 4 of the present invention.

In the first information layer $42_1$, the crystalline nucleation layer may be arranged at an interface of the recording layer 204 on a side opposite to the incident side of the laser beam. In such a case, as an information recording medium 46 as shown in FIG. 11, the first information layer $42_1$ is composed of the first dielectric layer 201, the second dielectric layer 202, the recording layer 204, the crystalline nucleation layer 208, the third dielectric layer 205, the reflective layer 206, and the transmittance adjusting layer 207 that are arranged in order from the incident side of the laser beam. Further, in the first information layer $42_1$, the crystalline nucleation layers may be arranged between the recording layer 204 and the second dielectric layer 202 and between the recording layer 204 and the third dielectric layer 205, respectively. In such a case, as an information recording medium 47 as shown in FIG. 12, the first information layer $42_1$ is formed of the first dielectric layer 201, the second dielectric layer 202, the crystalline nucleation layer 203, the recording layer 204, the crystalline nucleation layer 208, the third dielectric layer 205, the reflective layer 206, and the transmittance adjusting layer 207 that are laminated in order from the incident side of the laser beam. The crystalline nucleation layer 208 can be made of a material in the same system as that of the material of the crystalline nucleation layer 203, and also has the same configuration and function as those of the crystalline nucleation layer 203.

Next, the description is directed to a method for manufacturing each of the information recording media 4, 46, and 47 according to this embodiment.

Initially, the first information layer $42_1$ is formed on the substrate 41 (having a thickness of, for example, 600 μm). When guide grooves for guiding the laser beam 10 are formed on the substrate 41, the first information layer $42_1$ is formed on a surface on which the guide grooves are formed. Specifically, the substrate 41 is placed in a film forming device, where the first dielectric layer 201, the second dielectric layer 202, the crystalline nucleation layer 203, the recording layer 204, the third dielectric layer 205, the reflective layer 206, and the transmittance adjusting layer 207 are laminated in order, i.e., these layers are laminated in the reverse order to the order in the case of the first information layer $22_1$ described with regard to Embodiment 2. Alternatively, the first dielectric layer 201, the second dielectric layer 202, the recording layer 204, the crystalline nucleation layer 208, the third dielectric layer 205, the reflective layer 206, and the transmittance adjusting layer 207 are laminated in order on the substrate 41. Alternatively, the first dielectric layer 201, the second dielectric layer 202, the crystalline nucleation layer 203, the recording layer 204, the crystalline nucleation layer 208, the third dielectric layer 205, the reflective layer 206, and the transmittance adjusting layer 207 are laminated in order on the substrate 41. Each of the layers is formed in the manner described with regard to Embodiment 2.

After that, (N−1) layers of the second to N-th information layers $52_2$ to $52_N$ are laminated in order through the optical separation layers 43. Each of the information layers is formed of a single-layer film or a multi-layer film, and the films can be formed, as in the respective manners described with regard to Embodiment 2, by sequentially performing sputtering with respect to sputtering targets used as materials, respectively, in the film forming device.

Finally, the N-th information layer $42_N$ and the dummy substrate 45 are laminated to each other with the adhesive layer 44. Specifically, this process should be performed in the following manner. That is, a resin such as a photocurable resin (particularly, an ultraviolet curable resin) and a delayed action type thermosetting resin is applied on the N-th information layer $42_N$. The dummy substrate 45 is bonded onto the N-th information layer $42_N$ through this resin, and the laminate thus obtained is subjected to spin coating, after which the resin is allowed to cure. Further, it also is possible to bond the dummy substrate 45, on which an adhesive resin is applied uniformly in advance, to the N-th information layer $42_N$.

After the dummy substrate 45 is bonded, an initializing process in which an entire surface of the recording layer 204 of the first information layer $42_1$ is crystallized may be performed as required. The recording layer 204 can be crystallized by irradiation of laser beams.

Each of the information recording media 4, 46, and 47 according to this embodiment can be manufactured in the above-mentioned manner. In this embodiment, a sputtering method was used as a method for forming each film. However, there is no limitation on the method to be used, and it also is possible to use a vacuum deposition method, an ion plating method, a CVD method, MBE, or the like. The information layers other than the first information layer $42_1$ that are included in each of the optical information recording media 4, 46, and 47 according to this embodiment may have the same film structure as that of the first information layer $42_1$, and further, may have another film structure. Further, at least one of a plurality of the information layers may have the same film structure as that of the first information layer $42_1$ described with regard to this embodiment, and the other information layers may have a different structure. In such a case, preferably, the first information layer $42_1$ arranged at a position closest to a surface on the incident side of the laser beam has the film structure described with regard to this embodiment. Further, any one of the information layers other than the first information layer $42_1$ may be configured as a ROM (Read Only Memory) type information layer or as a WO (Write Once) type information layer that allows writing to be performed only once.

Embodiment 5

The description is directed to a method for performing information recording/reproduction on each of the information recording media described with regard to Embodiments 1 to 4.

Figure 13:
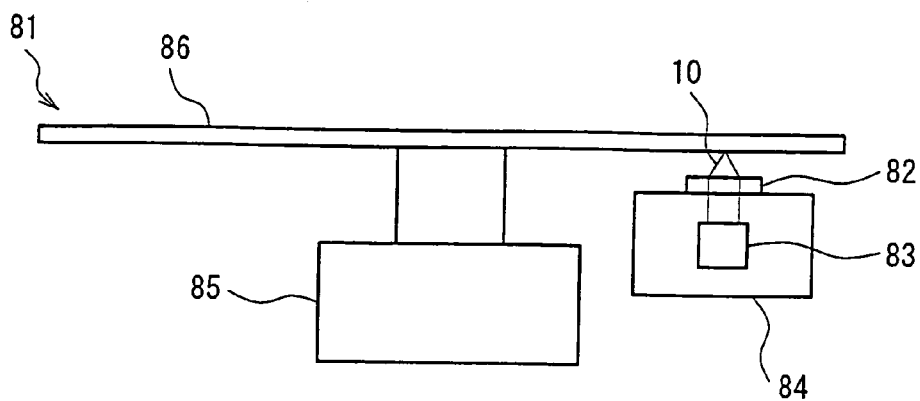
FIG. 13 is an explanatory view schematically showing a partial configuration of a recording/reproducing apparatus for performing information recording/reproduction on an information recording medium of the present invention.

FIG. 13 schematically shows a partial configuration of a recording/reproducing device 81 to be used in the recording/reproducing method according to this embodiment. The recording/reproducing device 81 includes a spindle motor 85 for rotating an information recording medium 86, an optical head 84 provided with a semiconductor laser 83, and an objective lens 82 for focusing a laser beam 10 emitted from the semiconductor laser 83. The information recording medium 86 is any one of the information recording media described with regard to Embodiments 1 to 4, and includes one information layer or a plurality of information layers (for example, the first information layer $32_1$ and the second information layer $32_2$ in the information recording medium 3). The objective lens 82 focuses the laser beam 10 on each information layer of the information recording medium 86.

On the information recording medium 86, information recording, erasing, and overwrite recording are performed by modulating the power level of the laser beam 10 into a high power, i.e., a peak power ($P_p$(mW)) and a low power, i.e., a bias power ($P_b$(mW)). By irradiation of the laser beam 10 at the peak power level, an amorphous phase is formed locally in a portion of the recording layer included in the information layer, and the amorphous phase forms into a recording mark. Each area between the recording marks is irradiated with the laser beam 10 at the bias power level, so that a crystalline phase (erased portion) is formed therein. When irradiating the laser beam 10 at the peak power level, generally, the laser beam is irradiated in the form of a train of pulses, i.e., a multi-pulse. The multi-pulse may be a result of modulation using only the peak power level and the bias power level, or may be a result of modulation using power levels in a range of 0 mW to the peak power level.

Further, a reproduction power ($P_r$(mW)) is defined as a power that has a power level lower than both of the peak power level and the bias power level, at which irradiation of the laser beam 10 exerts no influence on an optical state of a recording mark and a sufficient amount of reflected light to reproduce the recording mark can be obtained from the information recording medium 86. A signal from the information recording medium 86 that can be obtained by irradiation of the laser beam at the reproduction power level is read out by a detector, thereby allowing reproduction of an information signal to be performed.

In order to adjust a spot diameter of the laser beam 10 to a value in a range of 0.4 μm to 0.7 μm, the objective lens 82 has a numerical aperture (NA) that falls preferably within a range of 0.5 to 1.1 (more preferably within a range of 0.6 to 1.0). The laser beam 10 has a wavelength preferably of not more than 450 nm (more preferably in a range of 350 nm to 450 nm). When recording information, the information recording medium 86 has a linear velocity preferably in a range of 1 m/sec. to 20 m/sec. (more preferably in a range of 2 m/sec. to 15 m/sec.), which prevents crystallization from being caused by a laser beam used for reproduction and allows a sufficient erasing rate to be attained.

For example, in the case where the information recording medium 86 is the information recording medium 3 (see FIG. 7) including the two information layers, when recording is performed with respect to the first information layer 32₁, the laser beam 10 is adjusted to form a focal point in the recording layer 204, and information is recorded on the recording layer 204 using the laser beam 10 that has been transmitted through the transparent layer 33. The information is reproduced by using the laser beam 10 that is reflected by the recording layer 204 to be transmitted through the transparent layer 33. Meanwhile, when recording is performed with respect to the second information layer 32₂, the laser beam 10 is adjusted to form a focal point in the recording layer 304, and information is recorded using the laser beam 10 that has been transmitted through the transparent layer 33, the first information layer 32₁, and the optical separation layer 34. The information is reproduced by using the laser beam 10 that is reflected by the recording layer 304 to be transmitted through the optical separation layer 34, the first information layer 32₁, and the transparent layer 33.

When guide grooves for guiding the laser beam 10 are formed on a surface of each of the substrate 31 and the optical separation layer 34 of the information recording medium 3, information may be recorded on a surface of the grooves (grooves) on a near side from the incident side of the laser beam 10 or on a surface of the grooves (lands) on a far side from the incident side of the laser beam 10. Further, information may be recorded on both the grooves and the lands.

Embodiment 6

Figure 14:
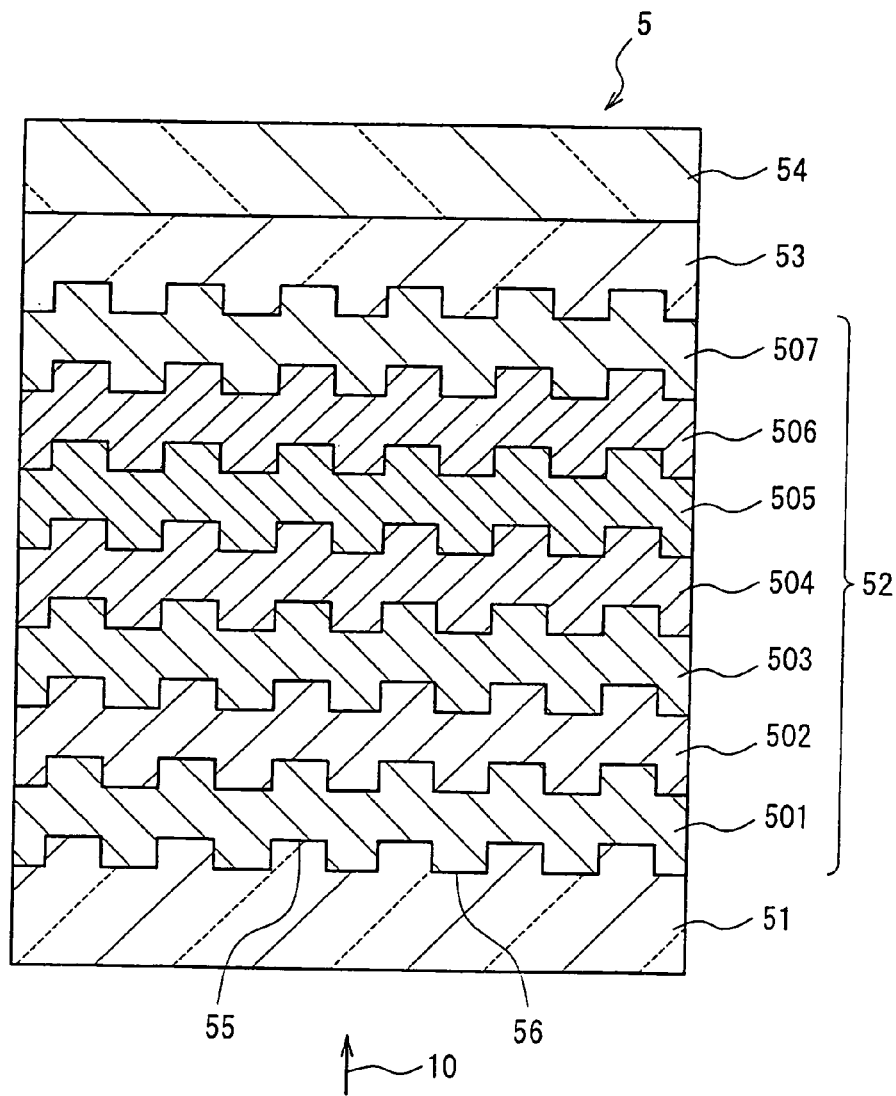
FIG. 14 is a cross-sectional view showing an exemplary configuration of an information recording medium according to Embodiment 6 of the present invention.

The description is directed to still another embodiment of the information recording medium according to the present invention. FIG. 14 is a cross-sectional view of an information recording medium 5 according to this embodiment. The information recording medium 5 of this embodiment is a medium suitable for use in information recording/reproduction using a so-called red laser having a wavelength of 600 to 700 nm.

In the information recording medium 5 of this embodiment, one information layer 52 is provided on a substrate 51, and a dummy substrate 54 is laminated to the information layer 52 with an adhesive layer 53. The information layer 52 is formed of a first dielectric layer 501, a second dielectric layer 502, a crystalline nucleation layer 503, a recording layer 504, a third dielectric layer 505, a light absorption correction layer 506, and a reflective layer 507 that are laminated in order from an incident side of a laser beam 10.

The substrate 51 is made of, preferably, a material that allows easy forming, and can be made of the same material as that of the substrate 11 described with regard to Embodiment 1. Further, the substrate 51 is a disk-shaped substrate on which guide grooves having a track pitch of, for example, 0.615 μm are provided for tracking of a light beam. As shown in FIG. 14, the guide grooves are composed of land portions 55 and groove portions 56, in both of which information can be recorded. Preferably, the substrate 51 has a thickness in a range of 0.5 mm to 0.7 mm.

Hereinafter, the description is directed to each of the layers constituting the information layer 52 and its manufacturing method.

Initially, the first dielectric layer 501 is formed on the substrate 51. The first dielectric layer 501 can be formed by performing reactive sputtering with respect to a sputtering target used as a material in Ar gas atmosphere or an atmosphere of a mixture of Ar gas and a reactive gas.

The first dielectric layer 501 has a function of preventing oxidation, corrosion, deformation, and the like of the recording layer 504, a function of increasing the light absorption efficiency of the recording layer 504 by adjusting an optical distance, and a function of increasing the signal amplitude by increasing a change in an amount of reflected light between before and after recording. Further, the first dielectric layer 501 also has a function of adjusting a phase difference of light between an amorphous phase and a crystalline phase of the recording layer 504. The first dielectric layer 501 in this embodiment can be formed of a dielectric made of, for example, an oxide of Y, Ce, Ti, Zr, Nb, Ta, Co, Zn, Al, Si, Ge, Sn, Pb, Cr, Sb, Bi, Te, or the like, a nitride of Ti, Zr, Nb, Ta, Cr, Mo, W, B, Al, Ga, In, Si, Ge, Sn, Pb, or the like, a carbide of Ti, Zr, Nb, Ta, Cr, Mo, W, Si, or the like, a sulfide, a selenide, or a telluride of Zn, Cd, or the like, a fluoride of La, Mg, Ca, Ce, Er, Gd, Tb, Dy, Nd, Y, Yb, or the like, a simple substance of C, Si, Ge, or the like, or a mixture of the above-mentioned materials.

Above all, $(ZnS)_{80}(SiO_2)_{20}$ (mol %) is an excellent dielectric material as an amorphous material that has a high refractive index and a high film-forming speed and is excellent in mechanical properties and moisture resistance, and thus is suitable for the first dielectric layer 501.

Then, the second dielectric layer 502 is formed on the first dielectric layer 501. The second dielectric layer 502 can be formed by performing sputtering with respect to a sputtering target containing elements constituting the second dielectric layer 502 in Ar gas atmosphere.

The second dielectric layer 502 has a function of preventing mass transfer from being caused between the first dielectric layer 501 and the crystalline nucleation layer 503. For example, when the first dielectric layer 501 is made of $(ZnS)_{80}(SiO_2)_{20}$ (mol %), it is possible to prevent S from being mixed into the crystalline nucleation layer 503. As a result, the repeated rewriting capability is improved.

As a material of the second dielectric layer 502, an oxide-based material containing at least one selected from $HfO_2$ and $ZrO_2$, $SiO_2$, and $Cr_2O_3$, for example, can be used.

The materials $ZrO_2$ and $HfO_2$ have a high melting point of not less than 2700° C. so that they do not melt to be mixed into the recording layer 504 in recording. Thus, by using $ZrO_2$ or $HfO_2$, an excellent repeated rewriting capability can be obtained.

$SiO_2$ is an amorphous material that has a function of increasing transparency and a function of suppressing crystallization of a dielectric material. $Cr_2O_3$ exhibits excellent adhesion to the crystalline nucleation layer 503 and excellent weather resistance to an environment of use. An evaluation of the adhesion was performed in the following manner. That is, after being stored in a high-temperature environment of a temperature of 90° C. and a humidity of 80% for 100 hours, the second dielectric layer 502 and the crystalline nucleation layer 503 were checked visually for whether peeling was caused therebetween.

The oxide-based material used for the second dielectric layer 502 is represented by, for example, $(HfO_2)_{A2}(SiO_2)_{B2}(Cr_2O_3)_{100-A2-B2}$ (mol %) or $(ZrO_2)_{A2}(SiO_2)_{B2}(Cr_2O_3)_{100-A2-B2}$ (mol %). Herein, preferably, $10 \leq A2 \leq 50$, $10 \leq B2 \leq 50$, and $20 \leq A2+B2 \leq 80$ are satisfied. The reason for this is that by this composition, it is possible to form the second dielectric layer 502 that exhibits excellent adhesion to the crystalline nucleation layer 503, and to obtain an excellent repeated rewriting capability.

More specifically, a concentration (A2) of $ZrO_2$ or $HfO_2$ of not less than 10 mol % allows an excellent repeated rewriting capability to be obtained, and a concentration of not more than 50 mol % allows improved adhesion between the crystalline nucleation layer 503 and the second dielectric layer 502 to be achieved.

Further, a concentration (B2) of $SiO_2$ of not less than 10 mol % allows an excellent repeated rewriting capability to be obtained, and a concentration of not more than 50 mol % allows improved adhesion between the crystalline nucleation layer 503 and the second dielectric layer 502 to be achieved.

Further, a concentration (100-A2-B2) of $Cr_2O_3$ of not less than 20 mol % allows improved adhesion between the crystalline nucleation layer 503 and the second dielectric layer 502 to be achieved, and a concentration of not more than 80 mol % allows an excellent repeated rewriting capability to be obtained.

Then, the crystalline nucleation layer 503 is formed on the second dielectric layer 502. The crystalline nucleation layer 503 can be formed by performing sputtering with respect to a sputtering target containing elements constituting the crystalline nucleation layer 503 in, for example, Ar gas atmosphere or an atmosphere of a mixture of Ar gas and $N_2$ gas.

In a process of forming the crystalline nucleation layer 503, by using a sputtering target formed of a material containing Bi and the element M1 or a material containing Te and the element M1, the crystalline nucleation layer 503 having a melting point higher than that of the recording layer 504 can be formed. The element M1 is at least one element selected from Sc, Y, La, Ce, Pr, Nd, Sm, Gd, Tb, Dy, Ho, Er, Yb, and Lu.

Further, in the process of forming the crystalline nucleation layer 503, by using a sputtering target formed of a material containing a compound $Bi_2Te(M1)$, $BiTe_2(M1)$, or $BiTe(M1)_2$ that contains Bi, Te, and the element M1, the crystalline nucleation layer 503 having a melting point higher than that of the recording layer 504 also can be formed.

The crystalline nucleation layer 503 thus formed allows an excellent recording property to be realized even with respect to different linear velocities.

In the case of a high linear velocity, the laser beam 10 is irradiated onto the information recording medium 5 for a short time, which means the recording layer 504 has to be crystallized in a short time. In other words, the information recording medium 5 having a higher linear velocity requires the crystallization speed of the recording layer 504 to be increased.

To this end, the crystalline nucleation layer 503 is provided as in the information recording medium 5 of this embodiment, so that the crystallization speed of the recording layer 504 can be increased when the information recording medium 5 has a high linear velocity. Also, when the information recording medium 5 has a low linear velocity, an excellent recording property can be obtained without decreasing the stability in an amorphous phase.

On the other hand, when the crystallization speed is increased by adding Sn, Bi, or the like to the recording layer 504 without the use of the crystalline nucleation layer 503, the stability in an amorphous phase is decreased when the information recording medium 5 has a low linear velocity.

As described above, it is difficult to obtain both an increased crystallization speed and the stability in an amorphous phase in the case of a low linear velocity only by changing a material of the recording layer 504. However, by using the crystalline nucleation layer 503 as in this embodiment, both an increased crystallization speed and the stability in an amorphous phase can be realized.

Preferably, the crystalline nucleation layer 503 is formed of a material that has a sufficiently high melting point so as not to allow constituents thereof to melt to be mixed into the recording layer 504 in an initializing process or in recording an information signal on the recording layer 504. For example, a combination of Bi and the element M1 or a combination of Te and the element M1 has a melting point at least as high as 1300° C., and thus the material of the crystalline nucleation layer 503 is less likely to be mixed into the recording layer 504 even after repeated rewriting of information signals. Particularly, above all, the use of Nd, Gd, or Th as the element M1 contributes to obtaining a still higher melting point, e.g., 2025° C., 2015° C., or 2000° C. by the use of TeNd, BiGd, or BiTb, respectively.

For example, the crystalline nucleation layer 503 formed of a material containing Bi and the element M1 has a melting point higher than that of the crystalline nucleation layer 503 formed of SnTe, and thus it is possible to prevent the material of the crystalline nucleation layer 503 from being mixed into the recording layer 504 in recording. Therefore, even after repeated rewriting of information signals, it is unlikely that an impurity is mixed into the recording layer 504, resulting in an excellent repeated rewriting capability.

On the other hand, in the case of the crystalline nucleation layer 503 formed of SnTe, it is likely that a part of SnTe is mixed into the recording layer 504 in recording since SnTe has a low melting point. Thus, as rewriting of an information signal is performed repeatedly, a difference in the effect of accelerating crystallization is caused, and jitter is increased (the repeated rewriting capability is deteriorated) particularly at a high linear velocity.

Preferably, the crystalline nucleation layer 503 is crystallized at least partially when it is formed. However, the crystalline nucleation layer 503 also can be crystallized in an initializing process later. Further, preferably, the crystalline nucleation layer 503 has the same crystal structure as that of the recording layer 504 so as to achieve a high effect of accelerating crystallization of the recording layer 504.

When the recording layer 504 is made of, for example, a material having a pseudobinary composition represented by a point on a line of GeTe—$Sb_2Te_3$, the recording layer 504 has an NaCl-type crystal structure. Thus, particularly preferably, the crystalline nucleation layer 503 is formed of Bi(M1) or Te(M1) containing Bi and the element M1 or Te and the element M1, respectively, at a ratio of 1:1. This is because such a compound has an NaCl-type crystal structure.

Further, $Bi_2Te(M1)$, $BiTe_2(M1)$, and $BiTe(M1)_2$, each of which is a combination of Bi, Te, and the element M1, also have a high melting point. Thus, in the crystalline nucleation layer 503 made of such a material, the material of the crystalline nucleation layer 503 is less likely to melt so as to be mixed into the recording layer 504 even after repeated rewriting of information signals, and crystallization of the recording layer 504 can be accelerated.

Furthermore, when N is added to the crystalline nucleation layer 503, crystal grains tend to be more uniform and smaller in size. In such a case, recording noise generated in a low-frequency region can be reduced in recording. For this reason, N also may be added to the crystalline nucleation layer 503.

When the crystalline nucleation layer 503 has a small film thickness, the number of atoms is low, and accordingly crystallization is less likely to be caused after the crystalline nucleation layer 503 is formed. On this account, preferably, the crystalline nucleation layer 503 has a film thickness of not less than 0.2 nm. When the crystalline nucleation layer 503 has a large film thickness, the effect of accelerating crystallization of the recording layer 504 is increased. However, the following problems occur: the stability in an amorphous phase is reduced, more light is absorbed by the crystalline nucleation layer 503 so that light to reach the recording layer 504 is decreased, and the like. On this account, preferably, the crystalline nucleation layer 503 has a film thickness of not more than 3 nm.

Then, the recording layer 504 is formed on the crystalline nucleation layer 503. The recording layer 504 can be formed by performing sputtering with respect to a sputtering target containing elements constituting the recording layer 504 in, for example, Ar gas atmosphere or an atmosphere of a mixture of Ar gas and $N_2$ gas.

In a process of forming the recording layer 504, by using a sputtering target formed of $Ge_aSb_2Te_{a+3}$ (in this embodiment, $2 \leq a \leq 22$ is satisfied), the recording layer 504 can be formed of a thin film having excellent stability. Preferably, the recording layer 504 of this embodiment is made of a material that allows a reversible change between a crystalline phase and an amorphous phase to be caused by irradiation of the laser beam 10 and allows optical constants (refractive index and extinction coefficient) to be changed between the crystalline phase and the amorphous phase at a predetermined laser wavelength. Further, preferably, the recording layer 504 is made of a material having an excellent repeated rewriting capability. Furthermore, preferably, a material that realizes a high crystallization speed is used.

Ge—Sb—Te is an excellent material that allows the optical constants to be changed between a crystalline phase and an amorphous phase, has an excellent repeated rewriting capability, and realizes a high crystallization speed. Practically, in $Ge_aSb_2Te_{a+3}$, where a is smaller than 2, a difference in refractive index and a difference in extinction coefficient between a crystalline phase and an amorphous phase are reduced. On this account, preferably, a is not less than 2. Further, where a is larger than 22, the crystallization speed is decreased, so that crystallization is less likely to be caused, and the melting point is increased, so that the recording sensitivity is deteriorated. Furthermore, a change in volume between the crystalline phase and the amorphous phase is increased, so that the repeated rewriting capability is deteriorated. On this account, preferably, a is not more than 22.

When Sn is substituted for a part of Ge contained in the recording layer 504, the crystallization speed can be increased further. Such a material can be represented by a formula $(Ge—Sn)_aSb_2Te_{a+3}$, wherein preferably, a satisfies $2 \leq a \leq 22$. In this case, a higher ratio of Sn atoms (atom %) contained in the recording layer 504 allows crystallization to be accelerated more, but at the same time causes a decrease in crystallization temperature and stability in an amorphous phase. Further, a higher content ratio of Sn atoms decreases a change in optical constants between a crystalline phase and an amorphous phase. On this account, preferably, the content ratio of Sn atoms is less than 20 atom %.

Further, when Bi is substituted for a part of Sb contained in the recording layer 504, the crystallization speed also can be increased further. Such a material can be represented by a formula $Ge_a(Sb—Bi)_2Te_{a+3}$, wherein preferably, a satisfies $2 \leq a \leq 22$. In this case, when the ratio of Bi atoms contained in the recording layer 504 is increased, the crystallization speed can be increased without decreasing a change in optical constants between a crystalline phase and an amorphous phase. However, at the same time, the crystallization temperature and the stability in the amorphous phase are decreased. On this account, preferably, the content ratio of Bi atoms is less than 10 atom %.

Furthermore, when Sn and Bi are substituted for a part of Ge and a part of Sb contained in the recording layer 504, respectively, the crystallization speed also can be increased further. Such a material can be represented by a formula $(Ge—Sn)_a(Sb—Bi)_2Te_{a+3}$, wherein preferably a satisfies $2 \leq a \leq 22$. Further, when N is added to the recording layer 504, the repeated rewriting capability is increased. For this reason, N also may be added.

The recording layer 504 having a too small film thickness is less likely to be crystallized. Thus, preferably the recording layer 504 has a film thickness of not less than 6 nm. Further, the recording layer 504 having a too large film thickness causes a deterioration in the capability of repeatedly rewriting information signals. Thus, preferably the recording layer 104 has a film thickness of not more than 12 nm.

Then, the third dielectric layer 505 is formed on the recording layer 504. The third dielectric layer 505 can be formed by performing sputtering with respect to a sputtering target containing elements constituting the third dielectric layer 503 in Ar gas atmosphere. The third dielectric layer 505 has a function of increasing the light absorption efficiency of the recording layer 504 by adjusting an optical distance, and a function of increasing the signal amplitude by increasing a difference in reflectance between before and after recording. Further, the third dielectric layer 505 also has a function of adjusting a phase difference of light between an amorphous phase and a crystalline phase, and a function of protecting the recording layer 504 from an environment of use. Preferably, the third dielectric layer 505 has a melting point higher than that of the recording layer 504.

As a material of the third dielectric layer 505, an oxide-fluoride-based material containing at least one selected from $HfO_2$ and $ZrO_2$, $SiO_2$, $Cr_2O_3$, and a fluoride can be used.

The materials $ZrO_2$ and $HfO_2$ have a high melting point of not less than 2700° C. so that when using such an oxide for the third dielectric layer 505, the third dielectric layer 505 is less likely to melt to be mixed into the recording layer 504 in recording. Thus, by using $ZrO_2$ or $HfO_2$ for the third dielectric layer 505, an excellent repeated rewriting capability can be obtained.

$SiO_2$ is an amorphous material that has a function of increasing transparency and a function of suppressing crystallization of a dielectric material (i.e., a function of suppressing crystallization of the third dielectric layer itself when using $SiO_2$ for the third dielectric layer). Further, $SiO_2$ has a function of increasing the effect of accelerating crystallization of the recording layer 504, thereby improving the rewriting capability.

A fluoride mixed with an oxide has a function of decreasing the thermal conductivity of the dielectric layer by making the structures of the dielectric layer complicated. By decreasing the thermal conductivity of the dielectric layer, the recording layer 504 easily is cooled rapidly, resulting in an increase in recording sensitivity. Rare-earth metal fluorides ($CeF_3$, $ErF_3$, $GdF_3$, $LaF_3$, $TbF_3$, $DyF_3$, $NdF_3$, $YF_3$, and $YbF_3$) are insoluble in water and excellent in moisture resistance. Particularly, $LaF_3$ is most suitable for practical use as a fluoride-based material to be mixed in the dielectric layer, since it has a melting point of about 1500° C., which is the highest among the above-mentioned fluorides, and is inexpensive. By using an oxide-fluoride-based material in which at least one selected from $ZrO_2$ and $HfO_2$, $SiO_2$, $Cr_2O_3$, and a fluoride are mixed with one another, it is possible to form the third dielectric layer 505 that allows an excellent repeated rewriting capability and moisture resistance to be obtained even when the third dielectric layer 505 is laminated on the recording layer 504 directly.

The oxide-fluoride-based material used for the third dielectric layer 505 can be represented by a formula $(HfO_2)_{A1}(SiO_2)_{B1}(Cr_2O_3)_{C1}(\text{fluoride})_{100-A1-B1-C1}$ (mol %) or $(ZrO_2)_{A1}(SiO_2)_{B1}(Cr_2O_3)_{C1}(\text{fluoride})_{100-A1-B1-C1}$ (mol %). Herein, A1, B1, and C1 satisfy $10 \leq A1 \leq 50$, $10 \leq B1 \leq 50$, and $10 \leq C1 \leq 50$, respectively, and $50 \leq A1+B1+C1 \leq 90$, whereby the third dielectric layer 505 exhibiting excellent adhesion to the recording layer 504 can be formed, and an excellent repeated rewriting capability can be obtained.

More specifically, when at least one selected from $ZrO_2$ and $HfO_2$ has a concentration (A1) of not less than 10 mol %, an excellent repeated rewriting capability can be obtained, and when the concentration is not more than 50 mol %, improved adhesion between the third dielectric layer 505 and the recording layer 504 can be obtained.

Further, when $SiO_2$ has a concentration (B1) of not less than 10 mol %, an excellent repeated rewriting capability is impaired, and when the concentration is not more than 50 mol %, improved adhesion between the third dielectric layer 505 and the recording layer 504 can be obtained. When $Cr_2O_3$ has a concentration (C1) of not less than 10 mol %, improved adhesion between the third dielectric layer 505 and the recording layer 504 can be obtained, and when the concentration is not less than 50 mol %, an excellent repeated rewriting capability can be obtained. Preferably, a fluoride has a concentration (100-A1-B1-C1) in a range of 10 mol % to 50 mol %, thereby obtaining excellent recording sensitivity. Further, an oxide-fluoride-based material also can be used for the first dielectric layer 501.

Then, the light absorption correction layer 506 is formed on the third dielectric layer 505. The light absorption correction layer 506 is provided so as to prevent a recording mark from being deformed in rewriting by adjusting a ratio of light absorptance between when the recording layer 504 is in a crystalline phase and when the recording layer 504 is in an amorphous phase, to allow the signal amplitude to be increased by increasing a difference in reflectance between when the recording layer 504 is in the crystalline phase and when the recording layer 504 is in the amorphous phase, and the like. Preferably, the light absorption correction layer 506 is made of a material that has a high refractive index and absorbs light appropriately. For example, preferably, the material has a refractive index of not less than 3 and not more than 6, and an extinction coefficient of not less than 1 and not more than 4.

Generally, the ratio of light absorptance is adjusted so that the light absorptance (Ac) of the recording layer 504 in a crystalline phase is higher than the light apsorptance (Aa) of the recording layer 504 in an amorphous phase (Ac>Aa). For example, preferably, an amorphous Ge alloy such as Ge—Cr, Ge-M, Si—Cr, Si—Mo, and Si—W, an Si alloy, a telluride, a crystalline metal such as Ti, Zr, Nb, Ta, Cr, Mo, W, SnTe, and PbTe, a semimetal, or a semiconductor material is used.

Then, the reflective layer 507 is formed on the light absorption correction layer 506. The reflective layer 507 can be formed by a sputtering method, a deposition method, or the like.

The reflective layer 507 has an optical function of increasing an amount of light to be absorbed by the recording layer 504, a function of allowing heat generated in the recording layer 504 to be diffused smoothly, thereby allowing the recording layer 504 to be changed in phase to an amorphous phase easily, and further a function of protecting the information recording medium 5 from the environment of use.

The reflective layer 507 can be made of, for example, a single metal material having a high thermal conductivity such as Al, Au, Ag, and Cu, or an alloy material that contains one or a plurality of the above-mentioned elements as main components and contains another or a plurality of other elements that are added thereto for an improvement in moisture resistance, adjustment of the thermal conductivity, or the like, such as Al—Cr, Al—Ti, Ag—Pd, Ag—Pd—Cu, and Ag—Pd—Ti. Each of these materials is excellent in moisture resistance and satisfies rapid-cooling conditions.

After forming the first dielectric layer 501 to the reflective layer 507 on the substrate 51 as described above, the dummy substrate 54 is laminated on the reflective layer 507 with the adhesive layer 53. The adhesive layer 53 can be made of a material having high heat resistance and adhesiveness, e.g., an adhesive resin such as an ultraviolet curable resin. For example, a material that contains an acryl resin as the main component or a material that contains an epoxy resin as the main component can be used. It also is possible to use an adhesive resin such as an ultraviolet curable resin made of a material having properties that are the same as or different from those of the above-mentioned materials, a double-sided tape, a dielectric film, or the like.

Instead of the dummy substrate 54, another information recording medium also may be laminated, thereby forming an information recording medium having a double-sided structure.

Figure 15:
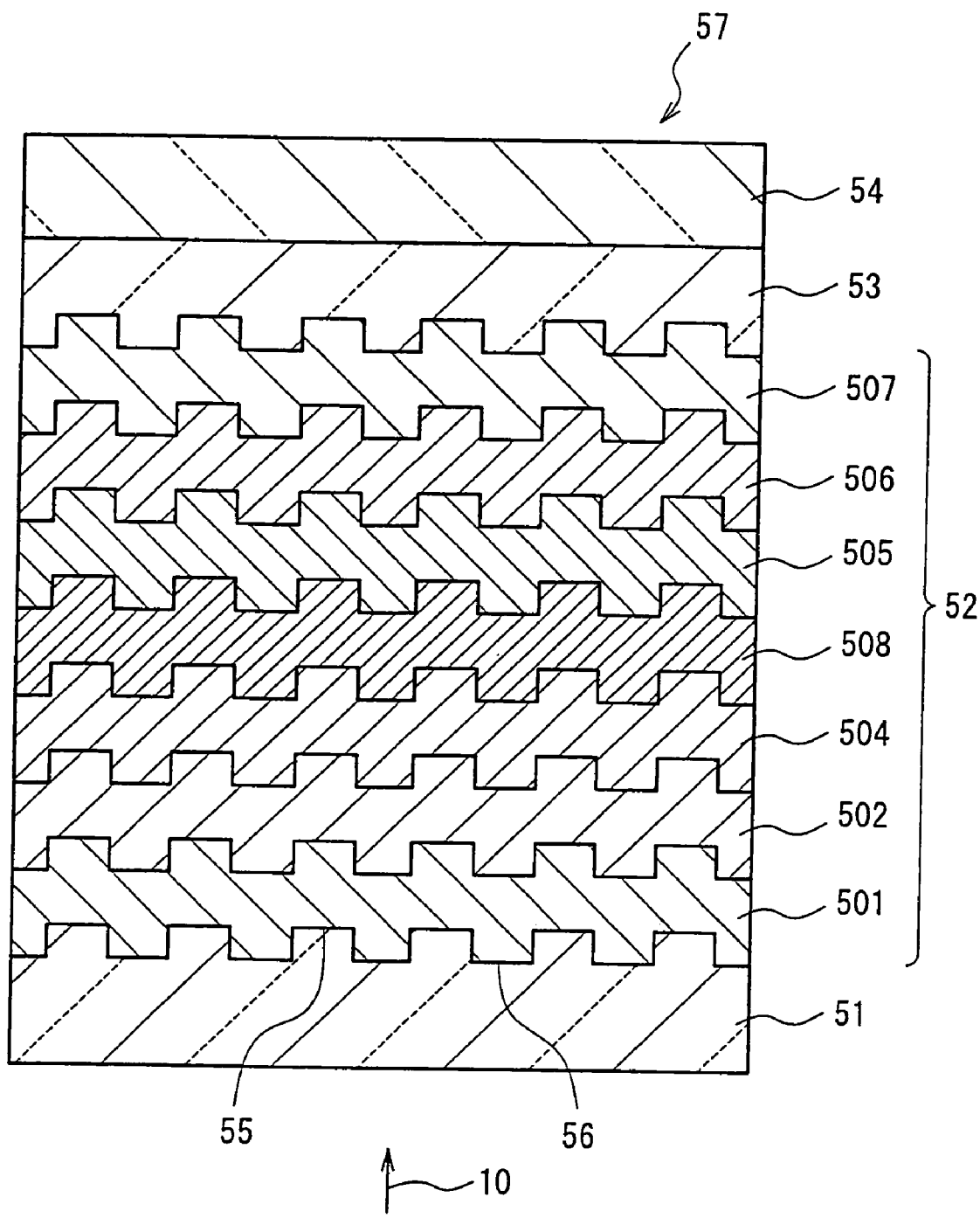
FIG. 15 is a cross-sectional view showing another exemplary configuration of an information recording medium according to Embodiment 6 of the present invention.

The crystalline nucleation layer may be arranged between the recording layer 54 and the third dielectric layer 505. In such a case, as an information recording medium 57 shown in FIG. 15, the information layer 52 is formed of the first dielectric layer 501, the second dielectric layer 502, the recording layer 504, a crystalline nucleation layer 508, the third dielectric layer 505, the light absorption correction layer 506, and the reflective layer 507 that are laminated in order from an incident side of the laser beam. Further, the crystalline nucleation layers may be arranged between the recording layer 504 and the second dielectric layer 502 and between the recording layer 504 and the third dielectric layer 505, respectively. In such a case, as an information recording medium 58 shown in FIG. 16, the information layer 52 is formed of the first dielectric layer 501, the second dielectric layer 502, the crystalline nucleation layer 503, the recording layer 504, the crystalline nucleation layer 508, the third dielectric layer 505, the light absorption correction layer 506, and the reflective layer 507 that are laminated in order from an incident side of the laser beam. In this configuration, the crystalline nucleation layers are provided on both sides of the recording layer 504. Thus, the crystalline nucleation layers 503 and 508 on the both sides allow crystallization of the recording layer 504 to be accelerated from the both sides, resulting in a further increase in crystallization speed. The crystalline nucleation layer 508 can be made of a material in the same system as that of the material of the crystalline nucleation layer 503, and also has the same configuration and function as those of the crystalline nucleation layer 103. Further, the crystalline nucleation layer 503 and the crystalline nucleation layer 508 may be formed of the same material or materials different (having different compositions) from each other.

Further, a fourth dielectric layer 509 may be provided between the third dielectric layer 505 and the light absorption correction layer 506. In such a case, as an information recording medium 509 shown in FIG. 17, the information layer 52 is formed of the first dielectric layer 501, the second dielectric layer 502, the crystalline nucleation layer 503, the recording layer 504, the third dielectric layer 505, the fourth dielectric layer 509, the light absorption correction layer 506, and the reflective layer 507 that are laminated in order from an incident side of the laser beam.

The fourth dielectric layer 509 has the same function as that of the first dielectric layer 501, and can be made of a material in the same system as that of the material of the first dielectric layer 501. For example, $(ZnS)_{80}(SiO_2)_{20}$ (mol %) can be used. $(ZnS)_{80}(SiO_2)_{20}$ (mol %) is an excellent material that has a high refractive index and film-forming speed and is excellent in mechanical properties and moisture resistance. However, when the fourth dielectric layer 509 made of this material is provided in contact with the recording layer 504, a part of S is mixed into the recording layer 504, resulting in a deterioration in signal quality. However, since the third dielectric layer 505 is provided between the fourth dielectric layer 509 and the recording layer 504, there occurs no problem if the fourth dielectric layer 509 contains S. In the information recording medium 59 shown in FIG. 17, the crystalline nucleation layer is provided only between the recording layer 504 and the second dielectric layer 503. However, the crystalline nucleation layer may be provided only between the recording layer 504 and the third dielectric layer 505, or the crystalline nucleation layers may be provided between the recording layer 504 and the second dielectric layer 503 and between the recording layer 504 and the third dielectric layer 505, respectively. Here, the description is directed to a method for performing recording/reproduction on each of the information recording media 5, 57, 58 and 59 of this embodiment. By irradiation of the laser beam 10 that is modulated in power level according to a signal, an amorphous phase and a crystalline phase are formed in the recording layer 504 so as to allow the signal to be recorded. Specifically, the amorphous phase of the recording layer 504 is irradiated with the laser beam 10 at a low power and cooled gradually, so that an irradiated portion of the amorphous phase can be crystallized. On the other hand, the crystalline phase of the recording layer 504 is irradiated with the laser beam 10 at a high power and cooled rapidly, so that an irradiated portion of the crystalline phase can be changed in phase to an amorphous phase.

A region in which the signal has been recorded in the above-mentioned manner is irradiated with the laser beam 10 at a power that does not cause the signal to be deteriorated, so that the signal is reproduced according to an amount of reflected light. According to the recording/reproducing method as described above, recording of an information signal can be performed reliably.

Embodiment 7

Figure 18:
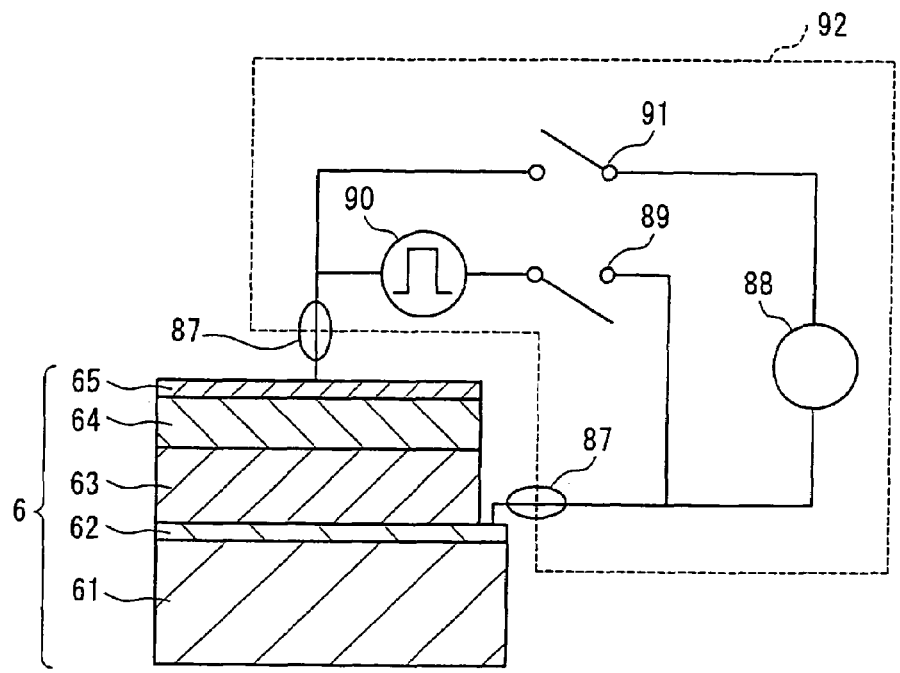
FIG. 18 is an explanatory view showing a partial cross section of an information recording medium and a schematic configuration of an electrical information recording/reproducing apparatus for performing information recording/reproduction on the information recording medium according to Embodiment 7 of the present invention.

The description is directed to still another embodiment of the information recording medium according to the present invention. FIG. 18 is an explanatory diagram showing a partial cross section of an information recording medium 6 and a schematic configuration of an electrical information recording/reproducing apparatus of this embodiment. The information recording medium 6 of this embodiment is an electrical information recording medium that allows information recording/reproduction to be performed by application of a current.

In the information recording medium 6 of this embodiment, a lower electrode 62, a recording layer 63, a crystalline nucleation layer 64, and an upper electrode 65 are laminated in this order on a substrate 61.

As the substrate 61, a resin substrate made of polycarbonate or the like, a glass substrate, a ceramic substrate made of $Al_2O_3$ or the like, an Si substrate, a substrate made of various kinds of metals such as Cu, or the like can be used. Here, the description will be given of the case where an Si substrate is used as the substrate 61.

The lower electrode 62 and the upper electrode 64 are provided so as to apply a current to the recording layer 62 and the crystalline nucleation layer 64.

The recording layer 63 is formed of a material that allows a reversible phase change between a crystalline phase and an amorphous phase to be caused by Joule heat generated by application of a current, so that a phenomenon in which the resistivity is changed between the crystalline phase and the amorphous phase is utilized for information recording. The recording layer 63 can be made of the same material as that of the recording layer 104 described with regard to Embodiment 1.

The crystalline nucleation layer 64 generates crystalline nuclei to improve the crystallization ability of the recording layer 63, thereby allowing high-speed information recording to be performed. The crystalline nucleation layer 63 can be made of the same material as that of the crystalline nucleation layer 103 described with regard to Embodiment 1.

The recording layer 63 and the crystalline nucleation layer 64 can be formed in the same manners as in the cases of forming the recording layer 104 and the crystalline nucleation layer 103 described with regard to Embodiment 1, respectively.

The lower electrode 62 and the upper electrode 65 can be made of a single metal material such as Al, Au, Ag, Cu, and Pt, or an alloy material that contains one or a plurality of the above-mentioned elements as main components and contains another or a plurality of other elements that are added thereto as appropriate for an improvement in moisture resistance, adjustment of the thermal conductivity, or the like. The lower electrode 62 and the upper electrode 65 can be formed by performing sputtering in Ar gas atmosphere using a metal matrix or an alloy matrix used as a material as a sputtering target.

The description is directed next to an electrical information recording/reproducing apparatus 92 for performing information recording/reproduction on the information recording medium 6. The electrical information recording/reproducing apparatus 92 of this embodiment is connected to the information recording medium 6 electrically via application parts 87. In order to allow the electrical information recording/reproducing apparatus 92 to apply a current pulse to the recording layer 63 and the crystalline nucleation layer 64 arranged between the lower electrode 62 and the upper electrode 65 of the information recording medium 6, a pulse power supply 90 is connected to the information recording medium 6 via a switch 89. Further, in order to detect a change in a resistance value caused by a phase change in the recording layer 63, a resistance measuring device 88 is connected between the lower electrode 62 and the upper electrode 65 via a switch 91. In order to change the recording layer 63 in an amorphous phase (a state of high resistance) to a crystalline phase (a state of low resistance), the switch 89 is closed (the switch 91 is opened) to allow a current pulse to be applied between the electrodes, so that a portion to which the current pulse is applied is kept at a temperature higher than the crystallization temperature and lower than the melting point of the material for the crystallization time. In the case of changing the recording layer 63 back to the amorphous phase from the crystalline phase again, a current pulse that is relatively higher than that used for crystallization is applied for a shorter time, so that the recording layer is kept at a temperature higher than the melting point so as to melt, and then the recording layer is cooled rapidly.

Here, where the resistance value when the recording layer 63 is in an amorphous phase is ra, and the resistance value when the recording layer 63 is in a crystalline phase is rc, ra>rc is satisfied. Thus, by measuring the resistance value between the electrodes with the resistance measuring device 88, two different states, i.e., information of one value can be detected.

Figure 19:
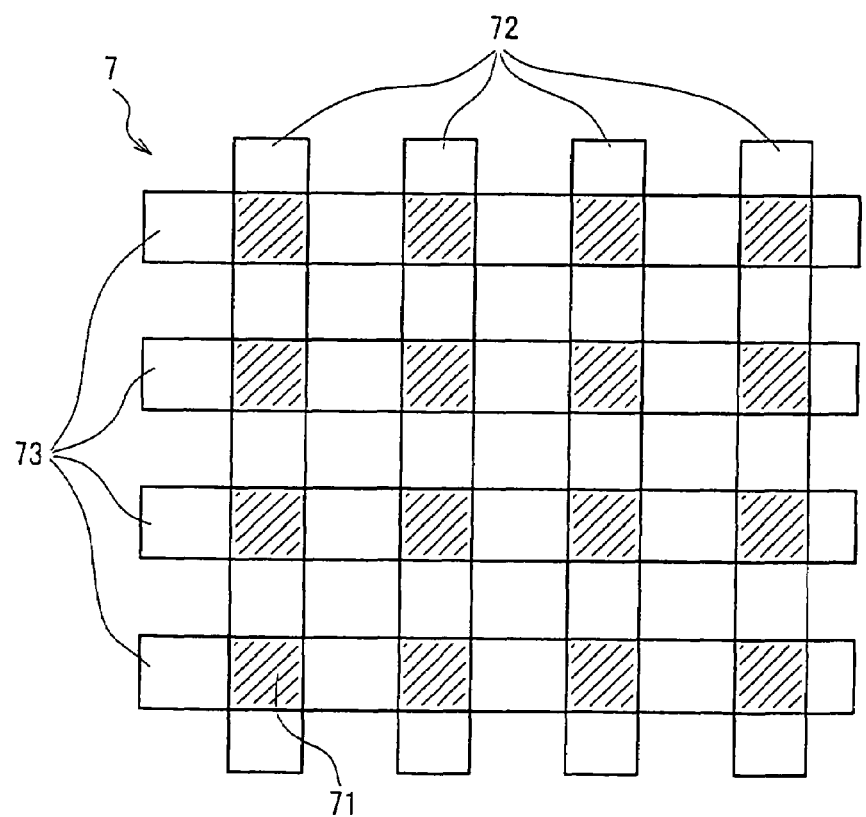
FIG. 19 is an explanatory view schematically showing a partial configuration of a large-capacity electrical information recording medium according to Embodiment 7 of the present invention.

By arranging a number of the information recording media 6 in a matrix form, an electrical information recording medium 7 with a large capacity as shown in FIG. 19 can be configured. Each memory cell 71 of the electrical information recording medium 7 has the same configuration as that of the information recording medium 6 in a minute region. Information recording/reproduction with respect to each memory cell 71 is performed by specifying a word line 72 and a bit line 73, respectively.

Figure 20:
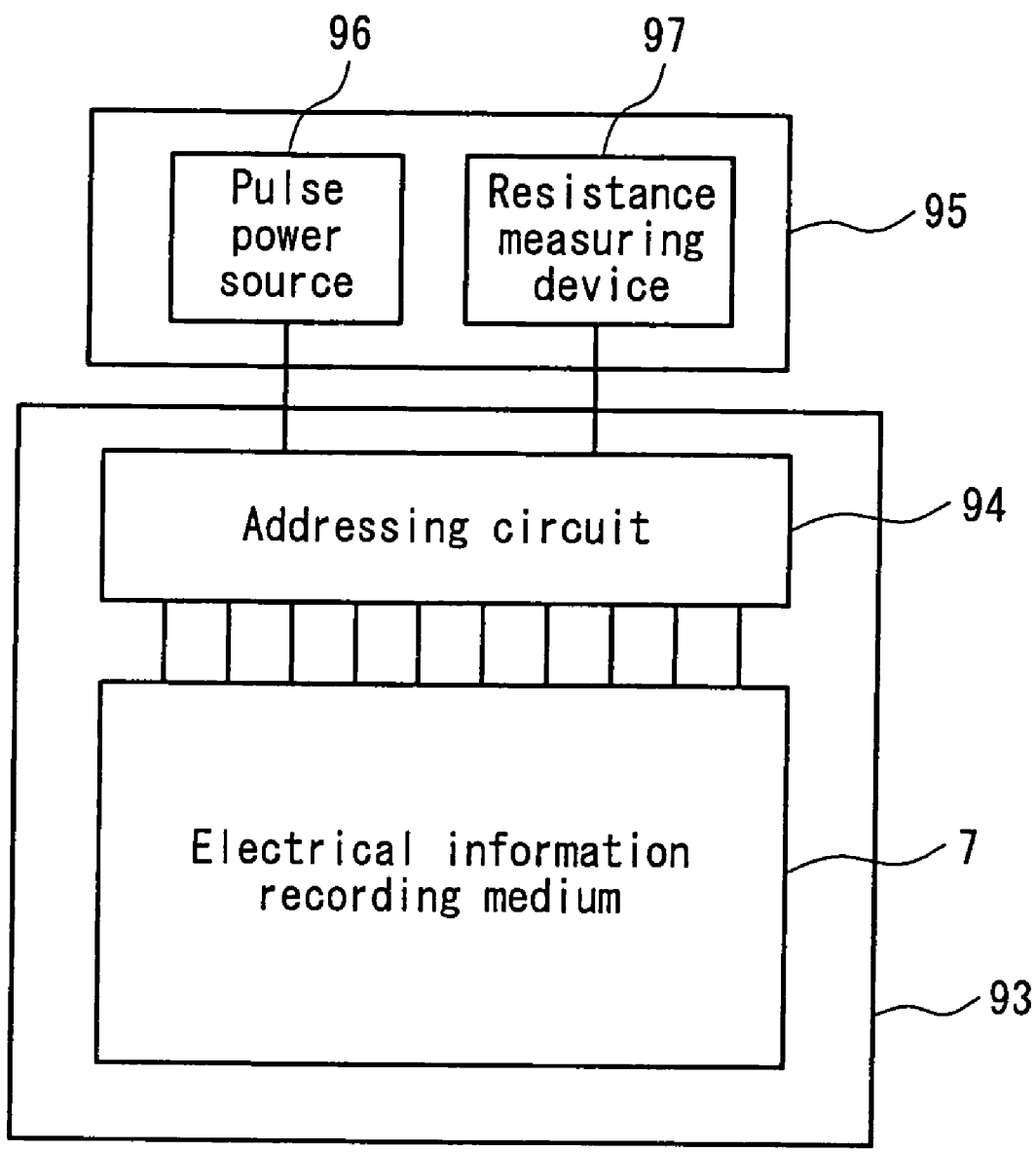
FIG. 20 is an explanatory view schematically showing a partial configuration of the electrical information recording medium and a recording/reproduction system therefor according to Embodiment 7 of the present invention.
Figure 21:
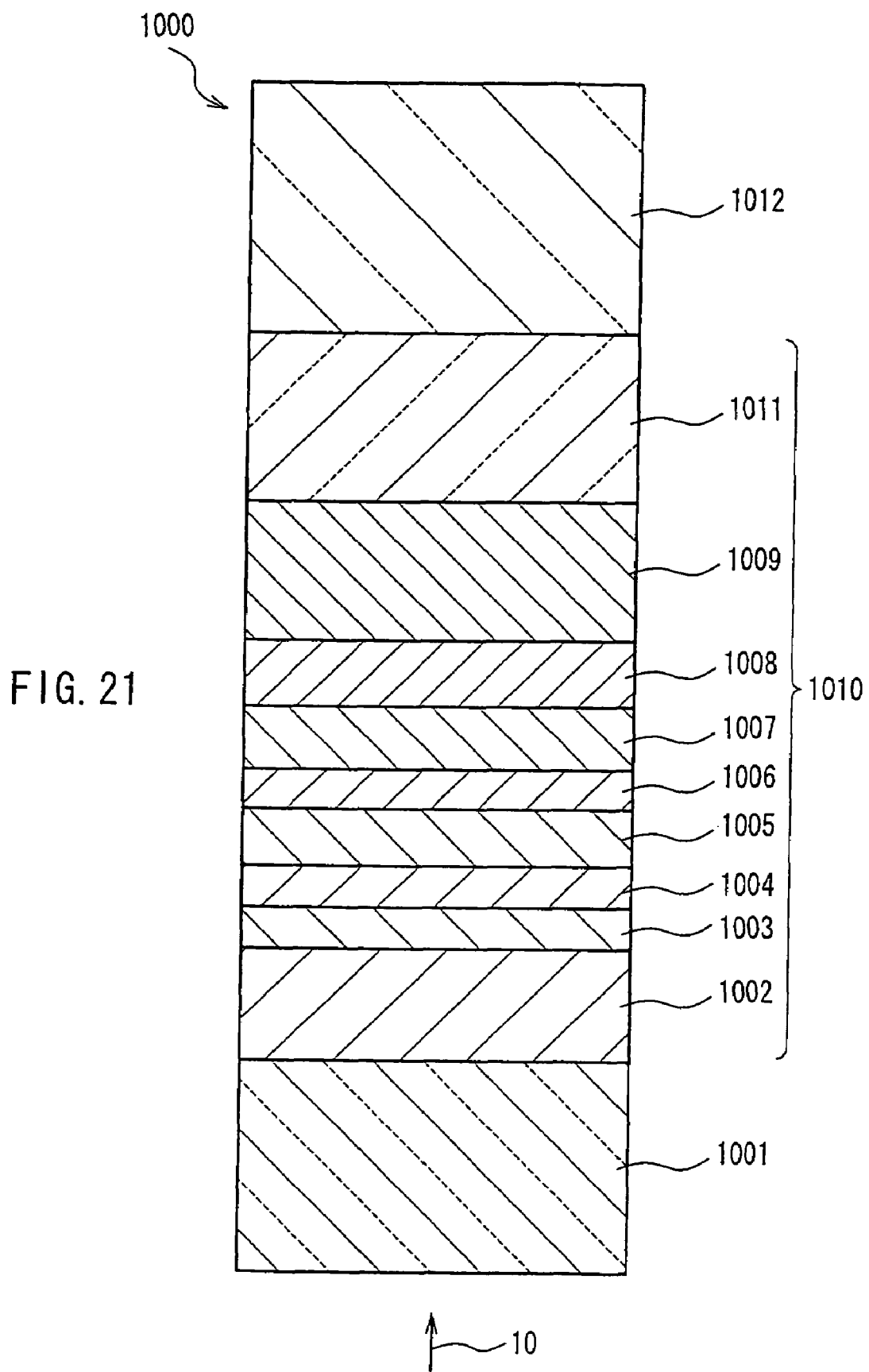
FIG. 21 is a cross-sectional view showing an exemplary configuration of a conventional information recording medium.

FIG. 20 shows an exemplary configuration of an information recording system using the electrical information recording medium 7. A storage device 93 includes the electrical information recording medium 7 and an addressing circuit 94. The addressing circuit 94 allows each of the word line 72 and the bit line 73 of the electrical information recording medium 7 to be specified, thereby allowing information recording/reproduction to be performed with respect to each memory cell 71. The storage device 93 is connected electrically to an external circuit 95 including at least a pulse power source 96 and a resistance measuring device 97, thereby allowing information recording/reproduction to be performed on the electrical information recording medium 7.

As described above, the electrical information recording medium of this embodiment also has the crystalline nucleation layer that is provided in contact with the recording layer, whereby the crystallization speed of the recording layer can be increased.

EXAMPLES

Hereinafter, the present invention will be described in further detail by way of examples.

Example 1

In Example 1, the information recording medium 1 in FIG. 1 was manufactured, and the relationship between a material of the crystalline nucleation layer 103 and an erasing rate, the number of times of recording/rewriting (repeated rewriting capability), archival characteristics, and archival overwrite characteristics of the information recording medium 1 was examined. Specifically, samples of the information recording medium 1 were manufactured using different materials for the crystalline nucleation layer 103. With respect to each of the manufactured samples, the erasing rate, the number of times of recording/rewriting, the archival characteristics, and the archival overwrite characteristics of the information recording medium 1 were determined.

Each of the samples was manufactured in the following manner. Initially, a polycarbonate substrate (having a diameter of 120 mm and a thickness of 1100 μm) on which guide grooves (having a depth of 20 nm and a track pitch of 0.32 μm) for guiding the laser beam 10 were formed was prepared as the substrate 11. Then, on the polycarbonate substrate, an Ag—Pd—Cu layer (thickness: 80 nm) as the reflective layer 108, an Al layer (thickness: 10 nm) as the interface layer 107, a ZnS—$SiO_2$ layer (thickness: about 20 nm, ZnS: 80 mol %, $SiO_2$: 20 mol %) as the fourth dielectric layer 106, an $SiO_2$—$Cr_2O_3$—$ZrO_2$ layer (thickness: 5 nm, $SiO_2$: 25 mol %, $Cr_2O_3$: 50 mol %, $ZrO_2$: 25 mol %) as the third dielectric layer 105, a $Ge_{22}Sb_2Te_{25}$ layer (thickness: 10 nm) as the recording layer 104, the crystalline nucleation layer 103 (thickness: 1 nm), an $SiO_2$—$Cr_2O_3$—$ZrO_2$ layer (thickness: 5 nm, $SiO_2$: 25 mol %, $Cr_2O_3$: 50 mol %, $ZrO_2$: 25 mol %) as the second dielectric layer 102, and a ZnS—$SiO_2$ layer (thickness: about 60 nm, $SiO_2$: 20 mol %) as the first dielectric layer 101 were laminated in order by a sputtering method. Finally, an ultraviolet curable resin was applied on the first dielectric layer 101, and a polycarbonate sheet (having a diameter of 120 mm and a thickness of 90 μm) was bonded to the first dielectric layer 101. The laminate thus obtained was rotated, so that a uniform resin layer was formed, which was then irradiated with an ultraviolet ray so that the resin was allowed to cure, and thus the transparent layer 13 was formed. After that, an initializing process in which the recording layer 104 is crystallized with the laser beam was performed. In the above-mentioned manner, a plurality of the samples in each of which the crystalline nucleation layer 103 is made of a different material were manufactured.

The fourth dielectric layer 106 and the first dielectric layer 101 have thicknesses determined precisely by calculation based on the matrix method. Specifically, these thicknesses were determined so that at a wavelength of 405 nm, a reflectance $R_c$ (%) in a mirror-surface portion of the substrate of the information recording medium 1 when the recording layer 104 was in a crystalline phase satisfies $15 \leq R_c \leq 25$ as much as possible, and a reflectance $R_a$ (%) in the mirror-surface portion of the substrate of the information recording medium 1 when the recording layer 104 was in an amorphous phase satisfies $0.5 \leq R_a \leq 5$ as much as possible.

With respect to each of the samples of the information recording medium thus obtained, the erasing rate was determined initially using the recording/reproducing device 81 shown in FIG. 13. At this time, the laser beam 10 having a wavelength of 405 nm was used, and the objective lens 82 was set to have a numerical aperture (NA) of 0.85. In the determination, each sample had a linear velocity of 5.3 m/s or 10.6 m/s, and the shortest mark length of 0.149 µm was obtained. Further, information was recorded on the grooves.

The erasing rate was determined in the following manner. That is, the laser beam 10 was modulated in power level between $P_p$ and $P_b$, and signals having a mark length of 0.149 µm (2T) and 0.671 µm (9T), respectively, were recorded sequentially and alternately on the same groove by a (1-7) modulation method. The determination was performed by measuring an extinction ratio of the amplitude of the signal 2T when the signal 2T was rewritten to the signal 9T, using a spectrum analyzer. The erasing ratio, which has a negative value, preferably has a higher absolute value, and specifically has a value not more than −30 dB.

The number of times of recording/rewriting was evaluated in the following manner. That is, the laser beam 10 was modulated in power level between $P_p$ and $P_b$, and random signals having a mark length of 0.149 µm (2T) to 0.596 µm (8T) were recorded sequentially on the same groove by a (1-7) modulation method. The evaluation was performed by measuring, at each time of recording/rewriting, a leading edge jitter (jitter at a leading edge portion of a recording mark) and a trailing edge jitter (jitter at a trailing edge portion of a recording mark) using a time interval analyzer. The number of times of rewriting at which a jitter value is increased by 3% with respect to an average jitter value of a leading edge jitter and a trailing edge jitter obtained at the first time was defined as an upper limit value of the number of times of recording/rewriting. Further, $P_p$ and $P_b$ were determined so that the smallest average jitter value was obtained.

The archival characteristics and archival overwrite characteristics were determined in the following manner. That is, initially the laser beam 10 was modulated in power level between $P_p$ and $P_b$, and random signals having a mark length of 0.149 µm (2T) to 0.596 µm (8T) were recorded sequentially on the same groove by a (1-7) modulation method. The determination was performed by measuring, at ten times of rewriting, a leading edge jitter and a trailing edge jitter using a time interval analyzer. After that, each sample on which the signals were recorded was left standing in a thermo-humidistat tank for 100 hours under the conditions of a temperature of 90° C. and a relative humidity of 20%. A leading edge jitter and a trailing edge jitter obtained after each sample with the signals recorded thereon was left standing for 100 hours were measured and compared with respective jitter values obtained before each sample was left standing. Further, the archival overwrite characteristics were evaluated in the following manner. That is, a leading edge jitter and a trailing edge jitter obtained after each sample with the signals recorded thereon was left standing for 100 hours and then the recorded signals were rewritten once were measured and compared with respective jitter values obtained before each sample was left standing.

The material of the crystalline nucleation layer 103 of the information recording medium 1 and the erasing rate, the number of times of recording/rewriting, the archival characteristics, and the archival overwrite characteristics of the information recording medium 1 obtained as a result of the evaluations are shown in Table 1 and Table 2 with respect to the cases where each sample had a linear velocity of 5.3 m/s and 10.6 m/s, respectively. The evaluations of the archival characteristics and the archival overwrite characteristics were made as o when a difference of the jitter values between before and after each sample was left standing is less than 2%, and as x when the difference of the jitter values was not less than 2%.

TABLE 1

(Linear velocity: 5.3 m/s)

| Sample No. | Material of Crystalline nucleation layer | Erasing Rate (dB) | Repeated Rewriting Capability (Times) | Archival Characteristics | Archival Overwrite Characteristics |
|---|---|---|---|---|---|
| 1-a | BiDy | −35 | 10000 | ◯ | ◯ |
| 1-b | TeDy | −35 | 10000 | ◯ | ◯ |
| 1-c | BiTeDy$_2$ | −35 | 10000 | ◯ | ◯ |
| 1-d | Bi$_2$TeDy | −35 | 10000 | ◯ | ◯ |
| 1-e | BiTe$_2$Dy | −35 | 10000 | ◯ | ◯ |
| 1-f | Bi$_2$Te$_3$ | −35 | 1000 | ◯ | ◯ |
| 1-g | None | −30 | 10000 | ◯ | ◯ |

TABLE 2

(Linear velocity: 10.6 m/s)

| Sample No. | Material of Crystalline nucleation layer | Erasing Rate (dB) | Repeated Rewriting Capability (Times) | Archival Characteristics | Archival Overwrite Characteristics |
|---|---|---|---|---|---|
| 1-a | BiDy | −30 | 10000 | ◯ | ◯ |
| 1-b | TeDy | −30 | 10000 | ◯ | ◯ |
| 1-c | BiTeDy$_2$ | −30 | 10000 | ◯ | ◯ |
| 1-d | Bi$_2$TeDy | −30 | 10000 | ◯ | ◯ |
| 1-e | BiTe$_2$Dy | −30 | 10000 | ◯ | ◯ |
| 1-f | Bi$_2$Te$_3$ | −30 | 1000 | ◯ | ◯ |
| 1-g | None | −20 | 1000 | ◯ | X |

According to the above results, it can be seen that in the case of Sample 1-f in which the crystalline nucleation layer 103 conventionally was formed of Bi—Te without containing Dy, the number of times of recording/rewriting was insufficient, i.e., 1000 times. Further, it can be seen that in the case of Sample 1-g in which the crystalline nucleation layer 103 was not provided, the erasing rate and the archival overwrite characteristics at a high transfer rate, i.e., a linear velocity of 10.6 m/s were insufficient, and further the number of times of recording/rewriting was also insufficient, i.e., 1000 times. It can be seen that with respect to each of Samples 1-a, 1-b, 1-c, 1-d, and 1-e in which the crystalline nucleation layer 103 contains Dy, the erasing rate, the repeated rewriting capability, the archival characteristics, and the archival overwrite characteristics were excellent in both the cases of a low transfer rate, i.e., a linear velocity of 5.3 m/s and a high transfer rate, i.e., a linear velocity of 10.6 m/s.

Further, the same experiment also was performed with respect to the cases where the crystalline nucleation layer 103 was made of a material containing at least one of Bi and Te and at least one of M1 other than Dy, a material containing at least one of Bi(M1) and Te(M1), and a material containing at least one of BiTe(M1)$_2$, Bi$_2$Te(M1), and BiTe$_2$ (M1), respectively. As a result, it can be seen that the erasing rate, the repeated rewriting capability, the archival characteristics, and the archival overwrite characteristics were excellent in both the cases of a low transfer rate, i.e., a linear velocity of 5.3 m/s and a high transfer rate, i.e., a linear velocity of 10.6 m/s.

Further, samples of the information recording medium 14 shown in FIG. 2, in which the crystalline nucleation layer 103 was arranged at the interface between the recording layer 104 and the third dielectric layer 105, and the information recording medium 15 shown in FIG. 3, in which the crystalline nucleation layers 103 and 109 were arranged on both sides of the recording layer 104 also were manufactured in the same manner. With respect to each of the samples, the erasing rate, the number of times of recording/rewriting, the archival characteristics, and the archival overwrite characteristics were determined in the same manner, and similar results were obtained.

Example 2

In Example 2, with respect to the information recording medium 3 in FIG. 7, the relationship between a material of the crystalline nucleation layer 203 as well as the crystalline nucleation layer 303 and an erasing rate, the number of times of recording/rewriting, archival characteristics, and archival overwrite characteristics of each of the first information layer $32_1$ and the second information layer $32_2$ of the information recording medium 3 was examined. Specifically, samples of the information recording medium 3 were manufactured using different materials for the crystalline nucleation layer 203 and the crystalline nucleation layer 303. With respect to each of the manufactured samples, the erasing rate, the number of times of recording/rewriting, the archival characteristics, and the archival overwrite characteristics of each of the first information layer $32_1$ and the second information layer $32_2$ of the information recording medium 3 were determined.

Each of the samples was manufactured in the following manner. Initially, a polycarbonate substrate (having a diameter of 120 mm and a thickness of 1,100 μm) on which guide grooves (having a depth of 20 nm and a track pitch of 0.32 μm) for guiding the laser beam 10 were formed was prepared as the substrate 31. Then, on the polycarbonate substrate, an Ag—Pd—Cu layer (thickness: 80 nm) as the reflective layer 308, an Al layer (thickness: 10 nm) as the interface layer 307, a ZnS—SiO₂ layer (thickness: 22 nm, ZnS: 80 mol %, SiO₂: 20 mol %) as the fourth dielectric layer 306, an SiO₂—Cr₂O₃—ZrO₂ layer. (thickness: 5 nm, SiO₂: 25 mol %, Cr₂O₃: 50 mol %, ZrO₂: 25 mol %) as the third dielectric layer 305, a Ge₂₂Sb₂Te₂₅ layer (thickness: 10 nm) as the recording layer 304, the crystalline nucleation layer 303 (thickness: 1 nm), an SiO₂—Cr₂O₃—ZrO₂ layer (thickness: 5 nm, SiO₂: 25 mol %, Cr₂O₃: 50 mol %, ZrO₂: 25 mol %) as the second dielectric layer 302, and a ZnS—SiO₂ layer (thickness: 60 nm, ZnS: 80 mol %, SiO₂: 20 mol %) as the first dielectric layer 302 were laminated in order by a sputtering method. By calculation based on the matrix method, the thicknesses of the fourth dielectric layer 306 and the first dielectric layer 301, respectively, were determined precisely so that at a wavelength of 405 nm, an amount of reflected light obtained when the recording layer 304 was in a crystalline phase was larger than an amount of reflected light obtained when the recording layer 304 was in an amorphous phase, a change in an amount of reflected light between when the recording layer 304 was in the crystalline phase and when the recording layer 304 was in the amorphous phase was increased further, and the light absorption efficiency of the recording layer 304 was increased.

Next, an ultraviolet curable resin was applied on the first dielectric layer 301. A transfer substrate on which guide grooves (having a depth of 20 nm and a track pitch of 0.32 μm) were formed was set on and bonded to the first dielectric layer 301 with the ultraviolet curable resin applied thereon. The laminate thus obtained was rotated, so that a uniform resin layer was formed. Then, the resin was allowed to cure, and after that, the transfer substrate was peeled off from the resin. This process allowed the formation of the optical separation layer 34 with the guide grooves for guiding the laser beam 10 formed on a surface on a side of the first information layer $32_1$.

After that, a TiO₂ layer (thickness: 20 nm) as the transmittance adjusting layer 207, an Ag—Pd—Cu layer (thickness: 10 nm) as the reflective layer 206, an SiO₂—Cr₂O₃—ZrO₂ layer (thickness: 10 nm, SiO₂: 20 mol %, Cr₂O₃: 30 mol %, ZrO₂: 50 mol %) as the third dielectric layer 205, a Ge₂₂Sb₂Te₂₅ layer (thickness: 6 nm) as the recording layer 204, the crystalline nucleation layer 203 (thickness: 1 nm), an SiO₂—Cr₂O₃—ZrO₂ layer (thickness: 5 nm, SiO₂: 35 mol %, Cr₂O₃: 30 mol %, ZrO₂: 35 mol %) as the second dielectric layer 202, and a ZnS—SiO₂ layer (thickness: 40 nm, ZnS: 80 mol %, SiO₂: 20 mol %) as the first dielectric layer 201 were laminated in order on the optical separation layer 34 by a sputtering method. Then, an ultraviolet curable resin was applied on the first dielectric layer 201, and a polycarbonate sheet (having a diameter of 120 mm and a thickness of 90 μm) was bonded to the first dielectric layer 201. The laminate thus obtained was rotated, so that a uniform resin layer was formed, which was then irradiated with an ultraviolet ray so that the resin was allowed to cure, and thus the transparent layer 23 was formed. Finally, an initializing process in which an entire surface of the recording layer 304 of the second information layer 322 was crystallized and an initializing process in which an entire surface of the recording layer 204 of the first information layer $32_1$ was crystallized were performed in this order. In the above-mentioned manner, a plurality of the samples in each of which the crystalline nucleation layers 203 and 303 are made of a different material were manufactured.

With respect to each of the samples thus obtained, the erasing rate, the number of times of recording/rewriting, the archival characteristics, and the archival overwrite characteristics of each of the first information layer $32_1$ and the second information layer $32_2$ of the information recording medium 3 were determined in the same manner as in Example 1. The results of the determination are shown in Table 3 and Table 4 with respect to the cases where each sample had a linear velocity of 5.3 m/s and 10.6 m/s, respectively. The evaluations of the archival characteristics and the archival overwrite characteristics were made as o when a difference of jitter values between before and after each sample was left standing is less than 2%, and as x when the difference of the jitter values was not less than 2%.

TABLE 3

| | | (Linear velocity: 5.3 m/s) | | | | |
|---|---|---|---|---|---|---|
| Sample No. | Information Layer No. | Material of Crystalline nucleation layer | Erasing Rate (dB) | Repeated Rewriting Capability (Times) | Archival Characteristics | Archival Overwrite Characteristics |
| 2-a | First Information Layer | BiDy | −32 | 10000 | ○ | ○ |
| | Second Information Layer | BiDy | −35 | 10000 | ○ | ○ |

TABLE 3-continued (Linear velocity: 5.3 m/s)

| Sample No. | Information Layer No. | Material of Crystalline nucleation layer | Erasing Rate (dB) | Repeated Rewriting Capability (Times) | Archival Characteristics | Archival Overwrite Characteristics |
|---|---|---|---|---|---|---|
| 2-b | First Information Layer | TeDy | −32 | 10000 | ○ | ○ |
|  | Second Information Layer | TeDy | −35 | 10000 | ○ | ○ |
| 2-c | First Information Layer | $BiTeDy_2$ | −32 | 10000 | ○ | ○ |
|  | Second Information Layer | $BiTeDy_2$ | −35 | 10000 | ○ | ○ |
| 2-d | First Information Layer | $Bi_2TeDy$ | −32 | 10000 | ○ | ○ |
|  | Second Information Layer | $Bi_2TeDy$ | −35 | 10000 | ○ | ○ |
| 2-e | First Information Layer | $BiTe_2Dy$ | −32 | 10000 | ○ | ○ |
|  | Second Information Layer | $BiTe_2Dy$ | −35 | 10000 | ○ | ○ |
| 2-f | First Information Layer | $Bi_2Te_3$ | −32 | 1000 | ○ | ○ |
|  | Second Information Layer | $Bi_2Te_3$ | −35 | 1000 | ○ | ○ |
| 2-g | First Information Layer | None | −27 | 10000 | ○ | ○ |
|  | Second Information Layer | None | −30 | 10000 | ○ | ○ |

TABLE 4

(Linear velocity: 10.6 m/s)

| Sample No. | Information Layer No. | Material of Crystalline nucleation layer | Erasing Rate (dB) | Repeated Rewriting Capability (Times) | Archival Characteristics | Archival Overwrite Characteristics |
|---|---|---|---|---|---|---|
| 2-a | First Information Layer | BiDy | −27 | 10000 | ○ | ○ |
|  | Second Information Layer | BiDy | −30 | 10000 | ○ | ○ |
| 2-b | First Information Layer | TeDy | −27 | 10000 | ○ | ○ |
|  | Second Information Layer | TeDy | −30 | 10000 | ○ | ○ |
| 2-c | First Information Layer | $BiTeDy_2$ | −27 | 10000 | ○ | ○ |
|  | Second Information Layer | $BiTeDy_2$ | −30 | 10000 | ○ | ○ |
| 2-d | First Information Layer | $Bi_2TeDy$ | −27 | 10000 | ○ | ○ |

TABLE 4-continued (Linear velocity: 10.6 m/s)

| Sample No. | Information Layer No. | Material of Crystalline nucleation layer | Erasing Rate (dB) | Repeated Rewriting Capability (Times) | Archival Characteristics | Archival Overwrite Characteristics |
|---|---|---|---|---|---|---|
|  | Second Information Layer | $Bi_2TeDy$ | −30 | 10000 | ○ | ○ |
| 2-e | First Information Layer | $BiTe_2Dy$ | −27 | 10000 | ○ | ○ |
|  | Second Information Layer | $BiTe_2Dy$ | −30 | 10000 | ○ | ○ |
| 2-f | First Information Layer | $Bi_2Te_3$ | −27 | 1000 | ○ | ○ |
|  | Second Information Layer | $Bi_2Te_3$ | −30 | 1000 | ○ | ○ |
| 2-g | First Information Layer | None | −17 | 10000 | ○ | X |
|  | Second Information Layer | None | −20 | 10000 | ○ | X |

According to the above results, it can be seen that in the case of Sample 2-f in which the crystalline nucleation layer 203 and the crystalline nucleation layer 303 did not contain Dy, the repeated rewriting capability was insufficient, i.e., 1000 times. Further, it can be seen that in the case of Sample 2-g in which the crystalline nucleation layer was not provided in each of the first information layer $32_1$ and the second information layer $32_2$, the erasing rate and the archival overwrite characteristics at a high transfer rate, i.e., a linear velocity of 10.6 m/s were insufficient. It can be seen that with respect to each of Samples 2-a, 2-b, 2-c, 2-d, and 2-e in which both the crystalline nucleation layer 203 and the crystalline nucleation layer 303 contain Dy, the erasing rate, the repeated rewriting capability, the archival characteristics, and the archival overwrite characteristics were excellent in both the cases of a low transfer rate, i.e., a linear velocity of 5.3 m/s and a high transfer rate, i.e., a linear velocity of 10.6 m/s.

Further, the same experiment also was performed with respect to the cases where the crystalline nucleation layers 203 and 303 were made of a material containing at least one of Bi and Te and at least one of M1 other than Dy, a material containing at least one of Bi(M1) and Te(M1), and a material containing at least one of $BiTe(M1)_2$, $Bi_2Te(M1)$, and $BiTe_2$(M1), respectively. As a result, it can be seen that the erasing rate, the repeated rewriting capability, the archival characteristics, and the archival overwrite characteristics were excellent in both the cases of a low transfer rate, i.e., a linear velocity of 5.3 m/s and a high transfer rate, i.e., a linear velocity of 10.6 m/s.

Further, samples of the information recording medium 35 shown in FIG. 8, in which the crystalline nucleation layer 208 was arranged at the interface between the recording layer 204 and the third dielectric layer 205 and the crystalline nucleation layer 309 was arranged between the recording layer 304 and the third dielectric layer 305, and the information recording medium 36 shown in FIG. 9, in which the crystalline nucleation layers 203 and 208 were arranged on both sides of the recording layer 204 and the crystalline nucleation layers 303 and 309 were arranged on both sides of the recording layer 304 also were manufactured in the same manner. With respect to each of the samples, the erasing rate, the number of times of recording/rewriting, the archival characteristics, and the archival overwrite characteristics were determined in the same manner, and similar results were obtained.

Example 3

In Example 3, samples of an information recording medium that is the same as the information recording medium 4 shown in FIG. 10 except that only the first information layer $42_1$ was formed were manufactured, and the relationship between a material of the crystalline nucleation layer 203 and an erasing rate, the number of times of recording/rewriting, archival characteristics, and archival overwrite characteristics of the first information layer $42_1$ of the information recording medium 4 was examined. Specifically, samples were manufactured using different materials for the crystalline nucleation layer 203, and with respect to each of the manufactured samples, the erasing rate, the number of times of recording/rewriting, the archival characteristics, and the archival overwrite characteristics of the first information layer $42_1$ of the information recording medium 4 were determined.

Each of the samples was manufactured in the following manner. Initially, a polycarbonate substrate (having a diameter of 120 mm and a thickness of 600 μm) on which guide grooves (having a depth of 40 nm and a track pitch of 0.344 μm) for guiding the laser beam 10 were formed was prepared as the substrate 41. Then, on the polycarbonate substrate, a $ZnS$—$SiO_2$ layer (thickness: 40 nm, ZnS: 80 mol %, $SiO_2$: 20 mol %) as the first dielectric layer 201, an $SiO_2$—$Cr_2O_3$—$ZrO_2$ layer (thickness: 5 nm, $SiO_2$: 35 mol %, $Cr_2O_3$: 30 mol %, $ZrO_2$: 35 mol %) as the second dielectric layer 202, the crystalline nucleation layer 203 (thickness: 1 nm), a $Ge_{22}Sb_2Te_{25}$ layer (thickness: 6 nm) as the recording layer 204, an $SiO_2$—$Cr_2O_3$—$ZrO_2$ layer (thickness: 10 nm, $SiO_2$: 20 mol %, $Cr_2O_3$: 30 mol %, $ZrO_2$: 50 mol %) as the third dielectric layer 205, an Ag—Pd—Cu layer (thickness: 10 nm)

as the reflective layer 206, and a TiO$_2$ layer (thickness: 20 nm) as the transmittance adjusting layer 207 were laminated in order by a sputtering method. Then, an ultraviolet curable resin was applied on the transmittance adjusting layer 207, and the dummy substrate 45 (having a diameter of 120 mm and a thickness of 600 μm) was bonded to the transmittance adjusting layer 207. The laminate thus obtained was subjected to spin coating so that a uniform resin layer was formed, which was then irradiated with an ultraviolet ray so that the resin was allowed to cure, and thus the adhesive layer 44 was formed. In this manner, the transmittance adjusting layer 207 and the dummy substrate 45 were adhered to each other through the adhesive layer 44. Finally, an initializing process for crystallizing an entire surface of the recording film 204 was performed. In the above-mentioned manner, a plurality of the samples in each of which the crystalline nucleation layer 203 is made of a different material were manufactured. In this example, each sample was manufactured using the same materials as those shown in Example 2 for the crystalline nucleation layer 203.

With respect to each of the samples thus obtained, an erasing rate, the number of times of recording/rewriting, archival characteristics, and archival overwrite characteristics of the first information layer $42_1$ were measured in the same manner as in Example 1.

In this case, the laser beam 10 having a wavelength of 405 nm was used, and the objective lens 82 (see FIG. 13) was set to have a numerical aperture (NA) of 0.65. In the measurement, each sample had a linear velocity of 8.6 m/s or 17.2 m/s, and the shortest mark length of 0.294 μm was obtained. Further, information was recorded on the grooves.

As a result of the measurements, as in Example 2, it can be seen that in the case where the crystalline nucleation layer 203 contains at least one element selected from Bi and Te, and M1, an information recording medium having excellent erasing rate, number of times of recording/rewriting, archival characteristics, and archival overwrite characteristics was obtained.

Further, samples of the information recording medium 46 shown in FIG. 11, in which the crystalline nucleation layer 208 was arranged at the interface between the recording layer 204 and the third dielectric layer 205, and of the information recording medium 47 shown in FIG. 12, in which the crystalline nucleation layers 203 and 208 were arranged on both sides of the recording layer 204 also were manufactured in the same manner. Then, the erasing rate, the number of times of recording/rewriting, the archival characteristics, and the archival overwrite characteristics were measured in the same manner with respect to each of the samples, and similar results were obtained.

Example 4

With respect to the cases where the recording layers 104, 204, and 304 of the information recording media in Examples 1, 2, and 3, respectively, were formed of a material represented by a formula $Ge_a Sb_b Te_{3+a}$ or $Ge_a Bi_b Te_{3+a}$, or a material represented by a formula $Ge_a(Sb-Bi)_b Te_{3+a}$ in which Bi is substituted for a part of Sb of $Ge_a Sb_b Te_{3+a}$, an erasing rate, the number of times of recording/rewriting, archival characteristics, and archival overwrite characteristics were measured in the same manner. Similar results to those shown in Examples 1 to 3 also were obtained in these cases. Further, in the case where $2 \leq a$ was satisfied, an optical change of the recording layer was increased, resulting in an information recording medium with a large signal amplitude. In the case where $a \leq 50$ was satisfied, a melting point of the recording layer was not too high, and excellent recording sensitivity was obtained. In the case where $2 \leq b \leq 4$ was satisfied, a more excellent recording/rewriting capability was obtained.

Example 5

With respect to the cases where the recording layers 104, 204, and 304 of the information recording media in Examples 1, 2, and 3, respectively, were formed of a material represented by a formula $(Ge-(M3))_a Sb_b Te_{3+a}$ or $(Ge-(M3))_a Bi_b Te_{3+a}$, or a material represented by a formula $(Ge-(M3))_a(Sb-Bi)_b Te_{3+a}$ in which Bi is substituted for a part of Sb of $(Ge-(M3))_a Sb_b Te_{3+a}$, an erasing rate, the number of times of recording/rewriting, archival characteristics, and archival overwrite characteristics were measured in the same manner. Similar results to those shown in Examples 1 to 3 also were obtained in these cases. At least one of Sn and Pb was used as M3. Further, in the case where $2 \leq a$ was satisfied, an optical change of the recording layer was increased, resulting in an information recording medium with a large signal amplitude. In the case where $a \leq 50$ was satisfied, a melting point of the recording layer was not too high, and excellent recording sensitivity was obtained. In the case where $2 \leq b \leq 4$ was satisfied, a more excellent recording/rewriting capability was obtained.

Example 6

With respect to the cases where the recording layers 104, 204, and 304 of the information recording media in Examples 1, 2, and 3, respectively, were formed of a material represented by a formula $(Ge_a Sb_b Te_{3+a})_{100-c}(M4)_c$ or $(Ge_a Bi_b Te_{3+a})_{100-c}(M4)_c$, or a material represented by a formula $(Ge_a(Sb-Bi)_b Te_{3+a})_{100-c}(M4)_c$ in which Bi is substituted for a part of Sb of $(Ge_a Sb_b Te_{3+a})_{100-c}(M4)_c$, an erasing rate, the number of times of recording/rewriting, archival characteristics, and archival overwrite characteristics were measured in the same manner. Similar results to those shown in Examples 1 to 3 also were obtained in these cases. At least one element selected from Si, Ti, V, Cr, Mn, Fe, Co, Ni, Cu, Se, Zr, Nb, Mo, Ru, Rh, Pd, Ag, In, Sn, Ta, W, Os, Ir, Pt, and Au was used as M4. Further, in the case where $2 \leq a$ was satisfied, an optical change of the recording layer was increased, resulting in an information recording medium with a large signal amplitude. In the case where $a \leq 50$ was satisfied, a melting point of the recording layer was not too high, and excellent recording sensitivity was obtained. In the cases where $2 \leq b \leq 4$ was satisfied and where $0 < c \leq 20$ was satisfied, a more excellent recording/rewriting capability was obtained.

Example 7

With respect to the cases where the recording layers 104, 204, and 304 of the information recording media in Examples 1, 2, and 3, respectively, were formed of a material represented by a formula $(Sb_b Te_{100-d})_{100-e}(M5)_e$, an erasing rate, the number of times of recording/rewriting, archival characteristics, and archival overwrite characteristics were measured in the same manner. Similar results to those shown in Examples 1 to 3 also were obtained in these cases. At least one element selected from Ge, Ag, In, Sn, Se, Bi, Au, and Mn was used as M5. Further, in the case where $50 \leq d$ was satisfied, the crystallization ability of the recording layer was high, and the erasing rate was improved. In the case where $d \leq 95$ was satisfied, the crystallization ability was not too high, and thus sufficient archival characteristics were obtained. In the cases where $0 < e \leq 20$ was satisfied, an excellent recording/rewriting capability was obtained.

Example 8

With respect to the cases where the film thickness of the crystalline nucleation layers 103, 203, and 303 of the information recording media in Examples 1, 2, and 3, respectively, was changed, an erasing rate, the number of times of recording/rewriting, archival characteristics, and archival overwrite characteristics were measured in the same manner. Similar results to those shown in Examples 1 to 3 also were obtained in these cases. However, when the crystalline nucleation layers had a film thickness of not less than 0.3 nm, a sufficient effect of accelerating crystallization of the recording layer was obtained, resulting in excellent archival overwrite characteristics even in the case of high linear velocity. Further, when the crystalline nucleation layers had a film thickness of not more than 3 nm, the crystallization ability of the recording layer was prevented from being too high, resulting in excellent archival characteristics even in the case of low linear velocity.

Example 9

With respect to the cases where the film thickness of the recording layers 104 and 304 of the information recording media in Examples 1 and 2, respectively, was changed, an erasing rate, the number of times of recording/rewriting, archival characteristics, and archival overwrite characteristics were measured in the same manner as in Example 1. Similar results to those shown in Example 1 were obtained in these cases. However, when the recording layers 104 and 304 had a film thickness of not less than 6 nm, the crystallization ability of the recording layers 104 and 304 was increased, and a more excellent erasing rate was obtained. Further, when the recording layers 104 and 304 had a film thickness of not more than 14 nm, it became easy to cause a phase change to an amorphous phase, and thus more excellent recording sensitivity was obtained. Further, the film thickness of the recording layer 204 of the first information layer $32_1$ of the information recording medium in Example 2 also was changed. As a result, when the recording layer 204 had a film thickness of not less than 3 nm, the crystallization ability was increased, and a more excellent erasing rate was obtained. When the recording layer 204 had a film thickness of not more than 9 nm, the transmittance of the first information layer $32_1$ was not decreased substantially, and sufficient recording sensitivity also was obtained with respect to the second information layer $32_2$.

Example 10

With respect to the case where the transmittance adjusting layer 207 of the information recording medium of Example 2 was formed using a material containing at least one selected from $TiO_2$, $ZrO_2$, ZnO, $Nb_2O_5$, $Ta_2O_5$, $SiO_2$, $Al_2O_3$, $Bi_2O_3$, $Cr_2O_3$, Sr—O, Ti—N, Zr—N, Nb—N, Ta—N, Si—N, Ge—N, Cr—N, Al—N, Ge—Si—N, Ge—Cr—N, and ZnS, an erasing rate, the number of times of recording/rewriting, archival characteristics, and archival overwrite characteristics were measured in the same manner. Similar results to those shown in Example 2 also were obtained in this case.

Example 11

With respect to the cases where the substrates 11, 21, 31, and 41 of the information recording media in Examples 1 to 10 were formed of a polycarbonate substrate having a diameter of 50.8 mm and a thickness of 800 μm, an erasing rate, the number of times of recording/rewriting, archival characteristics, and archival overwrite characteristics were measured in the same manner. Similar results to those shown in Examples 1 to 10 also were obtained in these cases.

Example 12

In Example 12, the information recording medium 6 shown in FIG. 18 was manufactured, and a phase change caused by application of a current was confirmed.

An Si substrate whose surface had been subjected to nitriding was prepared as the substrate 61. On the substrate 61, Pt as the lower electrode 62 in an area of 10 μm×10 μm and a thickness of 0.1 μm, $Ge_2Sb_2Te_5$ as the recording layer 63 in an area of 5 μm×5 μm and a thickness of 0.1 μm, $BiTeDy_2$ as the crystalline nucleation layer 64 in an area of 5 μm×5 μm and a thickness of 3 nm, and Pt as the upper electrode 65 in an area of 5 μm×5 μm and a thickness of 0.1 μm were laminated in order by a sputtering method. Then, an Au lead wire was bonded to the lower electrode 62 and the upper electrode 65, so that the electric information recording/reproducing apparatus 92 was connected to the information recording medium 6 via the application parts 87. By the electric information recording/reproducing apparatus 92, the pulse power source 90 was connected between the lower electrode 62 and the upper electrode 65 via the switch 89, and a change in resistance value due to a phase change of the recording layer 63 was detected by the resistance measuring device 88 connected between the lower electrode 62 and the upper electrode 65 via the switch 91.

When the recording layer 63 was in an amorphous phase and in a state of high resistance, and a current pulse having an amplitude of 2 mA and a pulse width of 80 ns was applied between the lower electrode 62 and the upper electrode 65, the recording layer 63 was changed in phase from the amorphous phase to a crystalline phase. Further, when the recording layer 63 was in a crystalline phase and in a state of low resistance, and a current pulse having an amplitude of 10 mA and a pulse width of 50 ns was applied between the lower electrode 62 and the upper electrode 65, the recording layer 63 was changed in phase from the crystalline phase to an amorphous phase. Further, a sample in which the crystalline nucleation layer 64 was not formed also was manufactured, and the same experiment was performed with respect thereto. As a result, the recording layer 63 was not changed in phase from an amorphous phase to a crystalline phase unless a current pulse having a pulse width of not less than 100 ns was applied.

As described above, it can be seen that even in the information recording medium in which a phase change was caused by the electrical means, the crystalline nucleation layer 64 contributed to increasing the crystallization speed of the recording layer 63.

Example 13

In Example 13, a plurality of samples of the information recording medium 5 shown in FIG. 14 were prepared using various combinations of Bi and the element M1 for the crystalline nucleation layers 5. A substrate made of a polycarbonate resin having a diameter of 12 cm and a thickness of 0.6 mm was used as the substrate 51. Spiral shaped grooves having a track pitch of 0.615 μm and a depth of 50 nm were formed on one surface of the substrate 51. The other surface of the substrate 51 was a flat surface.

On the surface of the substrate 51 on which the grooves (the land portions 55 and the groove portions 56) were formed, the first dielectric layer 501 in a thickness of 130 nm, the second dielectric layer 502 in a thickness of 2 nm, the crystalline nucleation layer 503 in a thickness of 1 nm, the recording layer 504 in a thickness of 8 nm, the third dielectric layer 505 in a thickness of 55 nm, the light absorption correction layer 506 in a thickness of 40 nm, and the reflective layer 507 in a thickness of 80 nm were formed in this order.

With respect to the respective layers constituting the information layer 52 formed on the substrate 51, specifically, the first dielectric layer 501 was formed using a sputtering target of $(ZnS)_{80}(SiO_2)_{20}$ (mol %). The second dielectric layer 502 was formed using a sputtering target of $(ZrO_2)_{25}(SiO_2)_{25}(Cr_2O_3)_{50}$ (mol %).

The crystalline nucleation layer 503 was formed using a sputtering target of BiLa, BiPr, BiGd, BiTb, or BiDy.

The recording layer 504 was formed using a sputtering target of $Ge_8Sb_2Te_{11}$. The third dielectric layer 505 was formed using a sputtering target of $(ZrO_2)_{28.6}(SiO_2)_{28.6}(Cr_2O_3)_{21.4}(LaF_3)_{21.4}$ (mol %). The light absorption correction layer 506 was formed using a sputtering target of $Ge_{80}Cr_{20}$. The reflective layer 507 was formed using a sputtering target of $Ag_{98}Pd_1Cu_1$.

On a surface of the multi-layer film thus formed, the adhesive layer 53 made of an ultraviolet curable resin was applied by a spin coating method. The laminate thus obtained was irradiated with an ultraviolet ray to be adhered to the dummy substrate 54. Since the recording layer 504 was in an amorphous phase when it was formed, an initializing process in which an entire surface of the recording layer 504 was changed in phase to a crystalline phase was performed by irradiation of a laser beam from a side of the substrate 51.

Recording of random signals on each of the samples manufactured in this example was performed 10 times using an optical system having a wavelength of 650 nm and an NA of 0.6 under the conditions of linear velocities of 8.2 m/s and 20.5 m/s, respectively. The random signals have the shortest mark (3T) of 0.42 μm and the longest mark (11T) of 1.54 μm and are obtained by arranging signals of 3T to 11T at random. This corresponds to a capacity of 4.7 GB in the information recording medium 5 of this example. Reproduction was performed with respect to tracks on which such recording was performed, and a jitter was measured with respect to each of the samples. The jitter measured in this example was an average of a leading edge jitter and a trailing edge jitter of a recording mark.

Table 5 shows a jitter in the groove portions 56 at a linear velocity of 8.2 m/s and a jitter in the groove portions 56 at a linear velocity of 20.5 m/s as a result of measurements with respect to each of the samples in which the crystalline nucleation layer 503 was made of a different material. Sample 13-f is an information recording medium given as a comparative example, in which SnTe was laminated on the recording layer 504 as the crystalline nucleation layer 503.

TABLE 5

| Sample No. | Material of Crystalline nucleation layer | Jitter (%) (Linear Velocity: 8.2 m/s) | Jitter (%) (Linear Velocity: 20.5 m/s) |
|---|---|---|---|
| 13-a | BiLa | 8.5 | 8.3 |
| 13-b | TePr | 8.2 | 8.4 |
| 13-c | BiGd | 8.4 | 8.3 |
| 13-d | BiTb | 8.3 | 8.5 |
| 13-e | BiDy | 8.2 | 8.3 |
| 13-f | SnTe | 8.3 | 9.1 |

According to Table 5, with respect to each of Samples 13-a to 13-e in which the crystalline nucleation layer 503 was formed of a material containing Bi and the element M1, excellent jitter values were obtained at linear velocities of both 8.2 m/s and 20.5 m/s, which were greatly different from each other.

From the above results, the crystalline nucleation layer 503 formed of a material made of Bi and the element M1 increases the crystallization speed of the recording layer 504, and thus a phase change to a crystalline phase can be caused in a shorter time. Therefore, an excellent jitter can be maintained even when the linear velocity is high (a linear velocity of 20.5 m/s).

Example 14

In Example 14, each of Samples 13-a to 13-f shown in Example 13 was stored in a high-temperature environment of a temperature of 80° C. and a humidity of 20% for 50 hours. Before each sample was stored in the high-temperature environment, recording of a random signal was performed with respect to each sample at a linear velocity of 8.2 m/s and 20.5 m/s for 10 times.

Table 6 shows a difference between jitters of archival characteristics measured before and after each sample was stored in the high-temperature environment, and a difference between jitters of archival overwrite characteristics measured before and after each sample was stored in the high-temperature environment (difference between jitters obtained before and after each sample was stored). In this example, jitters of the archival characteristics were measured only in the case of a low velocity (linear velocity of 8.2 m/s). This is because a jitter of the archival characteristics is deteriorated at a lower recording rate, and thus a jitter value obtained at a linear velocity of 20.5 m/s, which is higher than a linear velocity of 8.2 m/s, is thought to be better than that obtained at a linear velocity of 8.2 m/s. On the other hand, jitters of the archival overwrite characteristics were measured only in the case of a high velocity (linear velocity of 20.5 m/s). This is because a jitter of the archival overwrite characteristics is deteriorated at a higher recording rate, and thus a jitter value obtained at a linear velocity of 8.2 m/s, which is higher than a linear velocity of 20.5 m/s, is thought to be better than that obtained at a linear velocity of 20.5 m/s.

The description is directed to a method for measuring jitters of the archival characteristics and archival overwrite characteristics in this example.

A jitter of the archival characteristics after each sample was stored in the high-temperature environment was measured in the following manner: the sample that was stored in the high-temperature environment was taken, and reproduction was performed with respect to tracks on which recording had been performed before the sample storage, at the same linear velocity.

A jitter of the archival overwrite characteristics after each sample was stored in the high-temperature environment was measured in the following manner: the sample that was stored in the high-temperature environment was taken, recording of a random signal was performed once with respect to tracks on which recording had been performed before the sample storage, at the same linear velocity, and the recorded signal was reproduced.

TABLE 6

| Sample No. | Material of Crystalline nucleation layer | Difference in Jitter (%) (Linear Velocity: 8.2 m/s) Archival Characteristics | Difference in Jitter (%) (Linear Velocity: 20.5 m/s) Archival Overwrite Characteristics |
|---|---|---|---|
| 14-a | BiLa | 0.1 | 1.2 |
| 14-b | TePr | 0.2 | 1.3 |
| 14-c | BiGd | 0.2 | 1.1 |
| 14-d | BiTb | 0.1 | 0.9 |
| 14-e | BiDy | 0.1 | 0.8 |
| 14-f | SnTe | 0.0 | 5.1 |

As shown in Table 6, with respect to each of Samples 14-a to 14-f, the difference between before and after sample storage in the high-temperature environment was within 2%, and excellent archival characteristics were exhibited. On the other hand, with respect to the archival overwrite characteristics, only Samples 14-a to 14-e in each of which the crystalline nucleation layer 503 was formed of a material made of Bi and the element M1 exhibited excellent results with a difference in jitter of within 2%. With respect to Sample 14-f in which SnTe was used, it was confirmed that the difference in jitter was large at 5.1% and excellent archival characteristics were not obtained. As described above, it was confirmed that in the case where the crystalline nucleation layer 503 was made of a material made of Bi and the element M1, both excellent archival characteristics in the case of a linear velocity of 8.2 m/s (low velocity) and excellent archival overwrite characteristics in the case of a linear velocity of 20.5 m/s (high velocity) were obtained.

When a sample is stored in a high-temperature environment, an amorphous phase of the recording layer 504 is changed from an energy state before the sample storage to another energy state, which allows the energy state to be more stable. When an amorphous phase is changed to a more stable energy state in this manner, the amorphous phase of the recording layer 504 is less likely to be crystallized. However, as shown by the above results, with respect to Samples 14-a to 14-e in which the crystalline nucleation layer 503 was formed of a material of Bi and the element M1, an amorphous phase after storage of each of the samples was able to be crystallized easily, resulting in excellent archival overwrite characteristics. On the other hand, with respect to Sample 14-f in which SnTe was used, a difference in jitter of the archival overwrite characteristics obtained when the signal was recorded after sample storage in the high-temperature environment was large at 5.1%. This is thought to be because SnTe has a low melting point, and thus in the high-temperature environment, the crystalline nucleation layer 503 was allowed to melt so as to be mixed into the recording layer 504, whereby the recording layer 504 included an impurity. On the other hand, it is thought that the material made of Bi and the element M1 has a higher melting point than that of SnTe, and thus even after sample storage in the high-temperature environment, the recording layer 504 was free from mixture of impurities, resulting in excellent archival overwrite characteristics.

With respect to the jitter of the archival characteristics, a jitter value after each sample was stored in the high-temperature environment continuously up to 500 hours also was measured. This is because the archival characteristics tend to be deteriorated as a storage time becomes longer. After sample storage in the high-temperature environment for 500 hours, with respect to each of Samples 14-a to 14-e in which the crystalline nucleation layer 503 was formed of a compound of Bi and the element M1, a difference of jitters between before and after the sample storage was within 1%, and excellent archival characteristics were exhibited. Also, with respect to Sample 14-f in which SnTe was used for the crystalline nucleation layer 503, excellent archival characteristics were obtained, although a difference value of jitter was slightly larger than in the case of Samples 14-a to 14-e. A jitter of the archival overwrite characteristics after each sample was stored for 500 hours was not measured. This is because the archival overwrite characteristics was the worst when a storage time was about 50 hours and thereafter they tended to be better gradually with time. Accordingly, the jitter of the archival overwrite characteristics is thought to be the worst when a storage time is about 50 hours.

According to the results as described above, it was confirmed that the crystalline nucleation layer 503 formed of a material containing Bi and the element M1 allowed a more excellent effect of accelerating crystallization to be achieved than in the case of using a conventional crystalline nucleation layer formed of SnTe.

Example 15

In Example 15, a plurality of samples in each of which the crystalline nucleation layer 503 was made of $BiTe_2Dy$ and had a different film thickness were manufactured.

With respect to the respective layers formed on the substrate 51, specifically, the first dielectric layer 501 was formed using a sputtering target of $(ZnS)_{80}(SiO_2)_{20}$ (mol %). The second dielectric layer 502 was formed using a sputtering target of $(ZrO_2)_{25}(SiO_2)_{25}(Cr_2O_3)_{50}$ (mol %). The crystalline nucleation layer 503 was formed using a sputtering target of $Bi_{25}Te_{50}Dy_{25}$. The recording layer 504 was formed using a sputtering target of $Ge_8Sb_2Te_{11}$. The third dielectric layer 505 was formed using a sputtering target of $(ZrO_2)_{28.6}(SiO_2)_{28.6}(Cr_2O_3)_{21.4}(LaF_3)_{21.4}$ (mol %). The light absorption correction layer 506 was formed using a sputtering target of $Ge_{80}Cr_{20}$. The reflective layer 507 was formed using a sputtering target of $Ag_{98}Pd_1Cu_1$.

Recording of random signals on each of the manufactured samples was performed 10 times using an optical system having a wavelength of 650 nm and an NA of 0.6 under the conditions of linear velocities of 8.2 m/s and 20.5 m/s, respectively. The random signals have the same conditions as those shown in Example 13. Reproduction was performed with respect to tracks on which such recording had been performed, and a jitter was measured. The jitter was an average of a leading edge jitter and a trailing edge jitter of a recording mark. Table 7 shows a jitter in the groove portions 56 at a linear velocity of 8.2 m/s and a jitter in the groove portions 56 at a linear velocity of 20.5 m/s with respect to each film thickness of the crystalline nucleation layer 503.

TABLE 7

| Sample No. | Film Thickness of Crystalline nucleation layer (nm) | Jitter (%) (Linear Velocity: 8.2 m/s) | Jitter (%) (Linear Velocity: 20.5 m/s) |
|---|---|---|---|
| 15-a | 0.1 | 8.3 | 10.5 |
| 15-b | 0.2 | 8.3 | 8.9 |
| 15-c | 0.5 | 8.3 | 8.6 |
| 15-d | 1.0 | 8.4 | 8.3 |
| 15-e | 1.5 | 8.5 | 8.3 |

TABLE 7-continued

| Sample No. | Film Thickness of Crystalline nucleation layer (nm) | Jitter (%) (Linear Velocity: 8.2 m/s) | Jitter (%) (Linear Velocity: 20.5 m/s) |
|---|---|---|---|
| 15-f | 2.0 | 8.7 | 8.5 |
| 15-g | 3.0 | 8.8 | 8.8 |
| 15-h | 4.0 | 9.5 | 9.1 |

According to Table 7, excellent jitter values were obtained at linear velocities of both 8.2 m/s and 20.5 m/s when the crystalline nucleation layer 503 has a film thickness in a range of 0.2 nm to 3.0 nm.

Example 16

In Example 16, samples in each of which the crystalline nucleation layer 508 was provided between the recording layer 504 and the third dielectric layer 505 were manufactured. The crystalline nucleation layer 508 was formed of $Bi_2TeDy$, and the recording layer 504 was formed of Ge—Sn—Sb—Te, Ge—Sb—Bi—Te, or Ge—Sn—Sb—Bi—Te in which Sn or Bi is substituted for a part of Ge—Sb—Te.

With respect to the respective layers formed on the substrate 51, specifically, the first dielectric layer 501 was formed using a sputtering target of $(Zns)_{80}(SiO_2)_{20}$ (mol %). The second dielectric layer 502 was formed using a sputtering target of $(ZrO_2)_{25}(SiO_2)_{25}(Cr_2O_3)_{50}$ (mol %). Then, in this example, the recording layer 504 was formed on the second dielectric layer 502. For the recording layer 504, a composition of $(Ge—Sn)_8Sb_2Te_{11}$ in which the content ratio of Sn was 8 atom %, a composition of $Ge_8(Sb—Bi)_2Te_{11}$ in which the content ratio of Bi was 4 atom %, or a composition of $(Ge—Sn)_8(Sb—Bi)_2Te_{11}$ in which the content ratio of Sn was 3 atom % and the content ratio of Bi was 4 atom % was used. After forming the recording layer 504, the crystalline nucleation layer 508 was formed using a sputtering target of $Bi_{50}Te_{25}Dy_{25}$ (at. %). After forming the crystalline nucleation layer 508, the third dielectric layer 505 was formed using a sputtering target of $(ZrO_2)_{28.6}(SiO_2)_{28.6}(Cr_2O_3)_{21.4}(LaF_3)_{21.4}$ (mol %). The light absorption correction layer 506 was formed using a sputtering target of $Ge_{80}Cr_{20}$. The reflective layer 507 was formed using a sputtering target of $Ag_{98}Pd_1Cu_1$.

Recording of random signals on each of the manufactured samples was performed 10 times using an optical system having a wavelength of 650 nm and an NA of 0.6 under the conditions of linear velocities of 8.2 m/s and 20.5 m/s, respectively. The random signals have the same conditions as those shown in Example 13. Reproduction was performed with respect to tracks on which such recording had been performed, and a jitter was measured. The jitter was an average of a leading edge jitter and a trailing edge jitter of a recording mark.

Table 8 shows a jitter in the groove portions 56 at a linear velocity of 8.2 m/s and a jitter in the groove portions 56 at a linear velocity of 20.5 m/s with respect the recording layer 504 of each sample.

TABLE 8

| Sample No. | Recording Layer | | Jitter (%) (Linear Velocity: 8.2 m/s) | Jitter (%) (Linear Velocity: 20.5 m/s) |
|---|---|---|---|---|
| | Sn (atom %) | Bi (atom %) | | |
| 16-a | 8 | 0 | 8.5 | 8.6 |
| 16-b | 0 | 4 | 8.4 | 8.4 |
| 16-c | 3 | 4 | 8.5 | 8.2 |
| 16-d | 25 | 0 | 11.5 | 8.0 |
| 16-e | 0 | 15 | 11.0 | 7.8 |

As shown in Table 8, excellent jitters also were obtained at the respective linear velocities in Example 16. However, according to the results of Samples 16-a to 16-c and Samples 16-d and 16-e given for comparison, jitters were particularly excellent when the content of Sn in the recording layer 504 was in a range of 0 to 20 atom % and when the content of Bi was in a range of 0 to 10 atom %.

As described above, it can be seen that also with the configuration in which the crystalline nucleation layer 503 was provided between the recording layer 504 and the third dielectric layer 505, an excellent rewriting capability can be obtained when the linear velocity is higher.

Example 17

In example 17, a plurality of samples of the information recording medium 5 shown in FIG. 14 in each of which the crystalline nucleation layer 503 and the recording layer 504 had different film thicknesses were manufactured. $BiTe_2Dy$ was used for the crystalline nucleation layer 503, and Ge—Sb—Bi—Te in which Bi is substituted for a part of Ge—Sb—Te was used for the recording layer 504.

With respect to the respective layers formed on the substrate 51, specifically, the first dielectric layer 501 was formed using a sputtering target of $(Zns)_{80}(SiO_2)_{20}$ (mol %). The second dielectric layer 502 was formed using a sputtering target of $(ZrO_2)_{25}(SiO_2)_{25}(Cr_2O_3)_{50}$ (mol %). The crystalline nucleation layer 503 was formed using a sputtering target of $Bi_{25}Te_{50}Dy_{25}$. The recording layer 504 was formed using a sputtering target having a composition of $(Ge—Sn)_8(Sb—Bi)_2Te_{11}$ in which the content ratio of Sn was 5 atom % and the content ratio of Bi was 6 atom %. The third dielectric layer 505 was formed using a sputtering target of $(ZrO_2)_{28.6}(SiO_2)_{28.6}(Cr_2O_3)_{21.4}(LaF_3)_{21.4}$ (mol %). The light absorption correction layer 506 was formed using a sputtering target of $Ge_{80}Cr_{20}$ (at. %). The reflective layer 507 was formed using a sputtering target of $Ag_{98}Pd_1Cu_1$ (at. %). Samples were prepared in which the crystalline nucleation layers 503 had film thicknesses of 0.5 nm, 1.0 nm, and 1.5 nm, respectively, while the recording layers 504 had a fixed film thickness of 8 nm. Further, samples were prepared in which the recording layers 54 had film thicknesses of 6 nm, 8 nm, and 12 nm, respectively, while the crystalline nucleation layers 503 had a fixed film thickness of 1.5 nm.

Recording of random signals on each of the samples manufactured in Example 17 was performed 10 times using an optical system having a wavelength of 650 nm and an NA of 0.6 under the conditions of linear velocities of 8.2 m/s, 20.5 m/s, and 32.8 m/s, respectively. The random signals have the same conditions as those shown in Example 13. Then, each sample was stored in a high-temperature environment of a temperature of 80° C. and a humidity of 20% for 50 hours as in Example 14.

Table 9 shows a difference between jitters of archival characteristics in the groove portions 56 measured before and after each sample was stored in the high-temperature environment, and a difference between jitters of archival overwrite characteristics in the groove portions 56 measured before and after each sample was stored in the high-temperature environment (difference between jitters obtained before and after each sample was stored), with respect to each of the linear velocities of 8.2 m/, 20.5 m/s, and 32.8 m/s. The jitter was an average of a leading edge jitter and a trailing edge jitter of a recording mark.

The jitters of the archival characteristics and archival overwrite characteristics were measured by the same method as that shown in Example 14.

With respect to the respective layers formed on the substrate 51, specifically, the first dielectric layer 501 was formed using a sputtering target of $(ZnS)_{80}(SiO_2)_{20}$ (mol %). The second dielectric layer 502 was formed using a sputtering target of $(ZrO_2)_{25}(SiO_2)_{25}(Cr_2O_3)_{50}$ (mol %). Then, in Example 18, the crystalline nucleation layer 503 was formed on the second dielectric layer 502. The crystalline nucleation layer 503 was formed using a sputtering target of $Bi_{50}Te_{25}Dy_{25}$ (at. %). The recording layer 504 was formed on the crystalline nucleation layer 503. For the recording layer 504, a composition of $(Ge-Sn)_8Sb_2Te_{11}$ in which the content ratio of Sn was 8 atom %, a composition of $Ge_8(Sb-Bi)_2Te_{11}$ in which the content ratio of Bi was 4 atom

TABLE 9

| Sample No. | Film Thickness of Crystalline nucleation layer (nm) | Film Thickness of Recording Layer (nm) | Difference in Jitter (%) (Linear Velocity: 8.2 m/s) | | Difference in Jitter (%) (Linear Velocity: 20.5 m/s) | | Difference in Jitter (%) (Linear Velocity: 32.8 m/s) | |
|---|---|---|---|---|---|---|---|---|
| | | | Archival Characteristics | Archival Overwrite Characteristics | Archival Characteristics | Archival Overwrite Characteristics | Archival Characteristics | Archival Overwrite Characteristics |
| 17-a | 1.5 | 6 | 0.6 | 0.2 | 0.2 | 0.6 | 0.1 | 2.0 |
| 17-b | 0.5 | 8 | 0.5 | 0.1 | 0.1 | 0.3 | 0.0 | 1.9 |
| 17-c | 1.0 | 8 | 0.4 | 0.1 | 0.1 | 0.4 | 0.1 | 1.8 |
| 17-d | 1.5 | 8 | 0.4 | 0.2 | 0.1 | 0.5 | 0.1 | 1.9 |
| 17-e | 1.5 | 12 | 0.7 | 0.1 | 0.2 | 0.4 | 0.1 | 2.0 |

Even in the case where the linear velocity was significantly high at 32.8 m/s, the difference in archival overwrite characteristics between before and after each sample was stored in the high-temperature environment was within 2%, and the difference in archival characteristics in the case of a linear velocity of 8.2 m/s was also not more than 0.7%. Further, it was confirmed that even after each sample was stored in the high-temperature environment of a temperature of 80° C. and a humidity of 20% for 500 hours, the difference in archival characteristics between before and after the sample storage in the case of a linear velocity of 8.2 m/s was 2%.

From Example 17, it was confirmed that even in the case where the linear velocity is different in a range of 8.2 m/s to 32.8 m/s, which was four times as high as 8.2 m/s, an excellent recording property was obtained at each linear velocity. Further, in the case where the recording layer 504 is used singly (no crystalline nucleation layer is provided in contact with the recording layer), the recording layer 504 is less likely to be crystallized as the film thickness thereof becomes smaller. However, the provision of the crystalline nucleation layer 503 allowed excellent archival overwrite characteristics to be realized in the case of a high linear velocity due to the effect of accelerating crystallization of the crystalline nucleation layer 103 even when the recording layer 504 has a small film thickness of 6 nm.

Example 18

Figure 16:
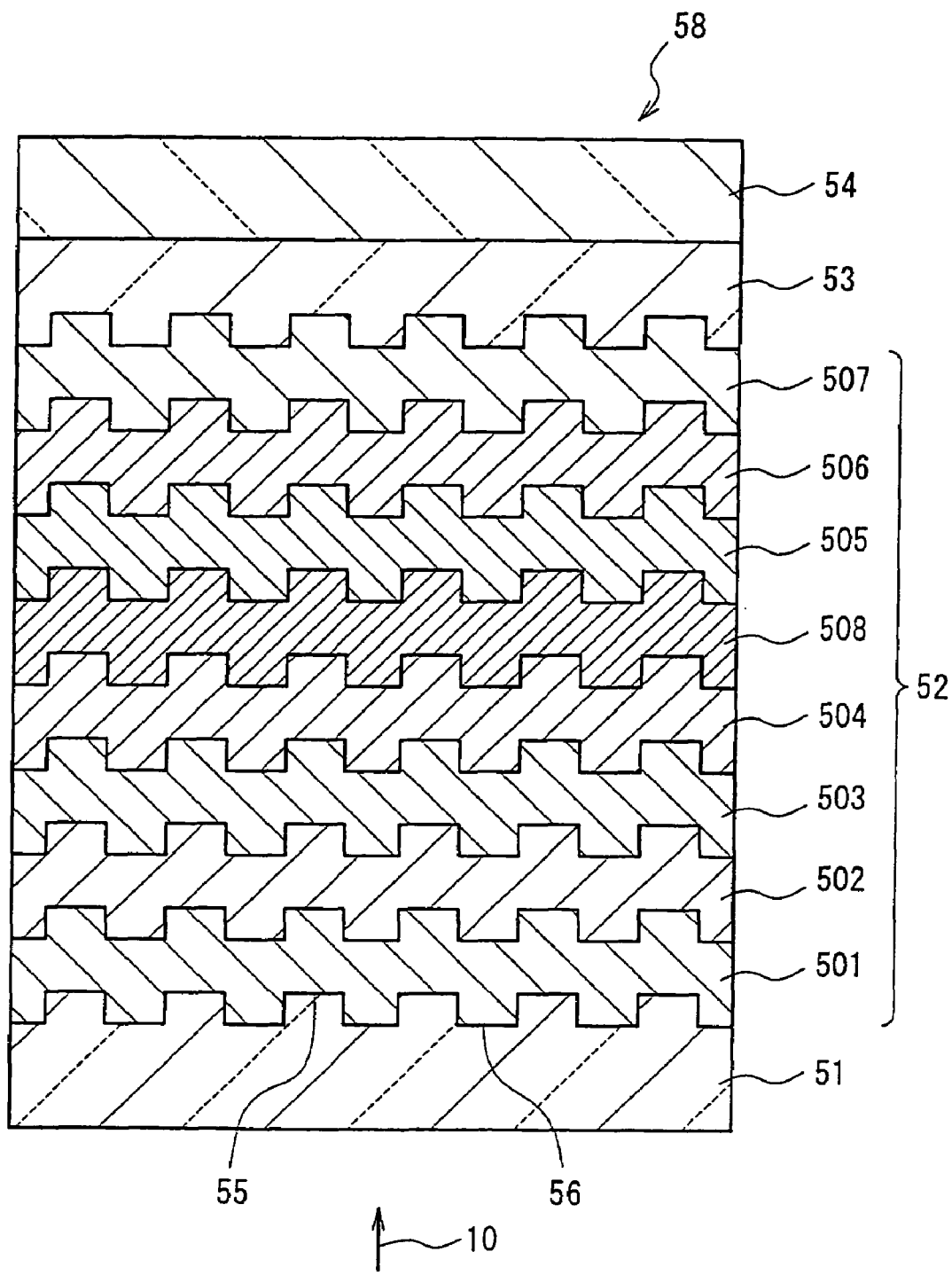
FIG. 16 is a cross-sectional view showing still another exemplary configuration of an information recording medium according to Embodiment 6 of the present invention.

In Example 18, samples in which the crystalline nucleation layers 503 and 508 were formed on both side of the recording layer 504 as shown in FIG. 16 were manufactured. The crystalline nucleation layers 503 and 508 were formed of $Bi_2TeDy$, and the recording layer 504 was formed of Ge—Sn—Sb—Te, Ge—Sb—Bi—Te, or Ge—Sn—Sb—Bi—Te in which Sn or Bi is substituted for a part of Ge—Sb—Te.

%, or a composition of $(Ge-Sn)_8(Sb-Bi)_2Te_{11}$ in which the content ratio of Sn was 3 atom % and the content ratio of Bi was 4 atom % was used.

After forming the recording layer 504, the crystalline nucleation layer 508 was formed. The crystalline nucleation layer 508 was formed using a sputtering target of $Bi_{50}Te_{25}Dy_{25}$. The third dielectric layer 505 was formed using a sputtering target of $(ZrO_2)_{28.6}(SiO_2)_{28.6}(Cr_2O_3)_{21.4}(LaF_3)_{21.4}$ (mol %). The light absorption correction layer 506 was formed using a sputtering target of $Ge_{80}Cr_{20}$. The reflective layer 507 was formed using a sputtering target of $Ag_{98}Pd_1Cu_1$.

Recording of random signals on each of the manufactured samples was performed 10 times using an optical system having a wavelength of 650 nm and an NA of 0.6 under the conditions of linear velocities of 8.2 m/s and 20.5 m/s, respectively. The random signals have the same conditions as those shown in Example 13. Reproduction was performed with respect to tracks on which such recording had been performed, and a jitter was measured. The jitter was an average of a leading edge jitter and a trailing edge jitter of a recording mark.

Table 10 shows a jitter at a linear velocity of 8.2 m/s and a jitter at a linear velocity of 20.5 m/s with respect to the recording layer 504 of each sample.

TABLE 10

| | Recording Layer | | Jitter (%) (Linear Velocity: 8.2 m/s) | Jitter (%) (Linear Velocity: 20.5 m/s) |
|---|---|---|---|---|
| Sample No. | Sn (atom %) | Bi (atom %) | | |
| 18-a | 8 | 0 | 8.4 | 8.3 |
| 18-b | 0 | 4 | 8.5 | 8.1 |
| 18-c | 3 | 4 | 8.6 | 8.1 |

TABLE 10-continued

| | Recording Layer | | Jitter (%) (Linear | Jitter (%) (Linear |
|---|---|---|---|---|
| Sample No. | Sn (atom %) | Bi (atom %) | Velocity: 8.2 m/s) | Velocity: 20.5 m/s) |
| 18-d | 25 | 0 | 11.8 | 7.9 |
| 18-e | 0 | 15 | 11.5 | 7.7 |

As shown in Table 10, excellent jitters also were obtained at the respective linear velocities in this example. However, according to the results of Samples 18-a to 18-c and Samples 18-d and 18-e given for comparison, jitters were particularly excellent when the content of Sn in the recording layer 504 was in a range of 0 to 20 atom % and when the content of Bi was in a range of 0 to 10 atom %. As described above, also in the case where the crystalline nucleation layers 503 and 508 were formed on both sides of the recording layer 504, the crystalline nucleation layers 503 and 508 allowed the crystallization speed of the recording layer 504 to be increased and caused a phase change to a crystalline phase in a shorter time in the case of a high linear velocity, resulting in improvement of rewriting capability.

Example 19

Figure 17:
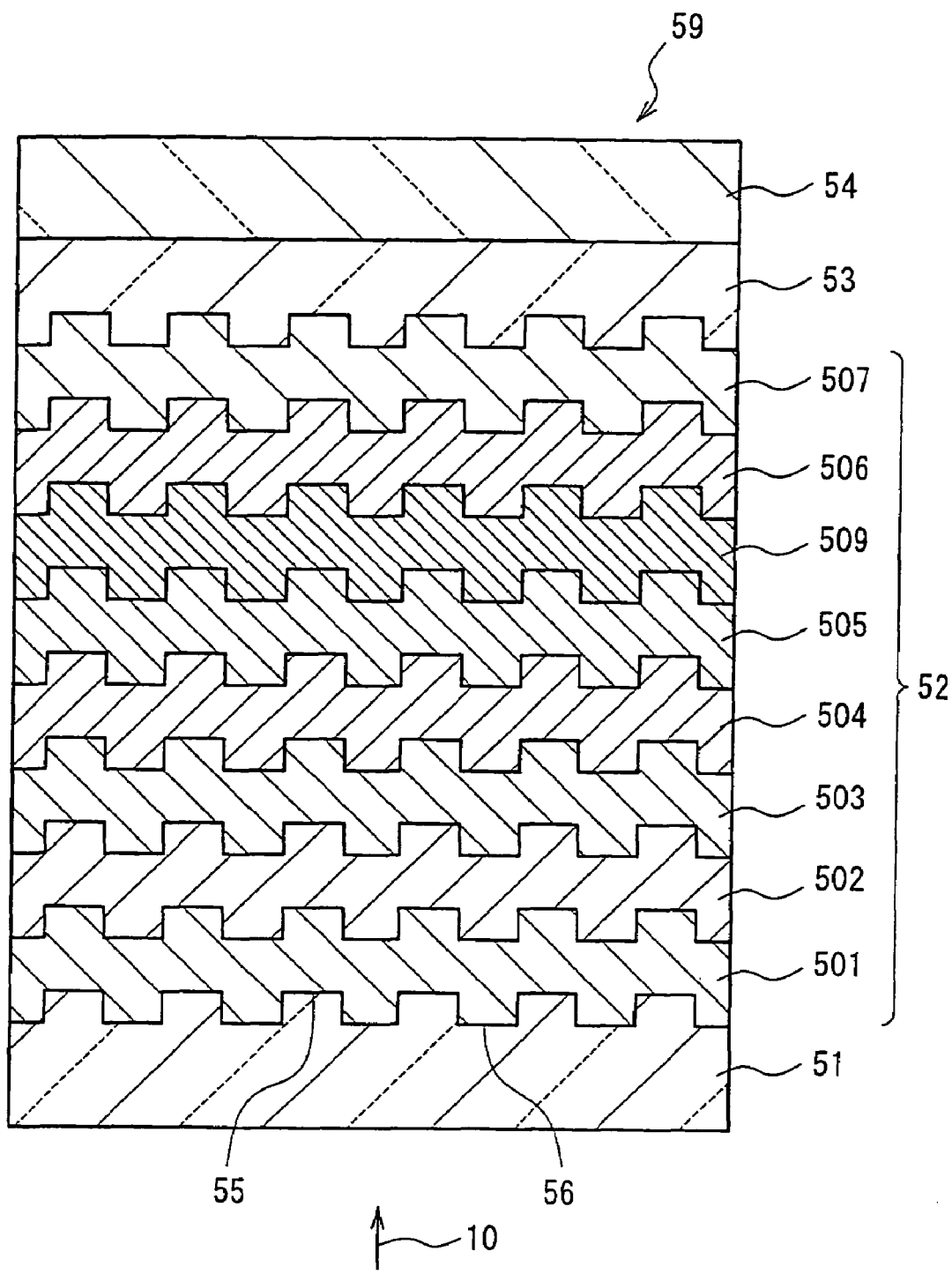
FIG. 17 is a cross-sectional view showing yet another exemplary configuration of an information recording medium according to Embodiment 6 of the present invention.

In Example 19, two samples of the information recording medium 59 as shown in FIG. 17 in each of which the fourth dielectric layer 509 was provided further between the third dielectric layer 505 and the light absorption correction layer 506 and the second dielectric layer 502 and the third dielectric layer 505 were made of different materials from each other were manufactured. In each of the samples, $(ZnS)_{80}(SiO_2)_{20}$ (mol %) was used for the fourth dielectric layer 105. The crystalline nucleation layer 503 was formed of $BiTeDy_2$, and the recording layer 504 was formed of Ge—Sb—Bi—Te in which Bi is substituted for a part of Ge—Sb—Te.

With respect to the respective layers formed on the substrate 51, specifically, the first dielectric layer 501 was formed using a sputtering target of $(ZnS)_{80}(SiO_2)_{20}$ (mol %). The second dielectric layer 502 was formed using a sputtering target of $(ZrO_2)_{25}(SiO_2)_{25}(Cr_2O_3)_{50}$ (mol %). Then, the crystalline nucleation layer 503 was formed on the second dielectric layer 502. The crystalline nucleation layer 503 was formed using a sputtering target of $Bi_{25}Te_{25}Dy_{50}$. The recording layer 504 was formed on the crystalline nucleation layer 503. For the recording layer 504, a composition of $Ge_7(Sb—Bi)_2Te_{11}$ in which the content ratio of Bi was 4 atom % was used.

After forming the recording layer 504, the third dielectric layer 505 was formed. The third dielectric layer 505 was formed using a sputtering target of $(ZrO_2)_{25}(SiO_2)_{25}(Cr_2O_3)_{50}$ (mol %) in one sample and $(HfO_2)_{25}(SiO_2)_{25}(Cr_2O_3)_{50}$ in the other sample (mol %). After forming the third dielectric layer 505, the fourth dielectric layer 509 was formed. The fourth dielectric layer 504 was formed using a sputtering target of $(ZnS)_{80}(SiO_2)_{20}$ (mol %). Further, the light absorption correction layer 506 was formed using a sputtering target of $Ge_{80}Cr_{20}$. The reflective layer 507 was formed using a sputtering target of $Ag_{98}Pd_1Cu_1$.

Recording of random signals on each of the manufactured samples was performed 10 times using an optical system having a wavelength of 650 nm and an NA of 0.6 under the conditions of linear velocities of 8.2 m/s and 20.5 m/s, respectively. The random signals have the same conditions as those shown in Example 13. Reproduction was performed with respect to tracks on which such recording had been performed, and a jitter was measured. The jitter was an average of a leading edge jitter and a trailing edge jitter of a recording mark.

Table 11 shows a jitter at a linear velocity of 8.2 m/s and a jitter at a linear velocity of 20.5 m/s with respect to the recording layer 504 of each sample.

TABLE 11

| Sample No. | Third Dielectric Layer (mol %) | Jitter (%) (Linear Velocity: 8.2 m/s) | Jitter (%) (Linear Velocity: 20.5 m/s) |
|---|---|---|---|
| 19-a | $(ZrO_2)_{25}(SiO_2)_{25}(Cr_2O_3)_{50}$ | 8.4 | 8.3 |
| 19-b | $(HfO_2)_{25}(SiO_2)_{25}(Cr_2O_3)_{50}$ | 8.5 | 8.1 |

Also with respect to the information recording medium configured as shown in FIG. 17, excellent jitters were obtained at the respective linear velocities.

INDUSTRIAL APPLICABILITY

According to an information recording medium and a method for manufacturing the information recording medium of the present invention, it is possible to obtain an information recording medium in which a crystalline nucleation layer has a high melting point and excellent thermal stability, which achieves both archival overwrite characteristics at a high transfer rate and archival characteristics at a low transfer rate, and which has an excellent repeated rewriting capability.

The invention claimed is:

1. An information recording medium including a substrate and an information layer arranged on the substrate, the information layer comprising:
   a recording layer that is changed in phase reversibly between a crystalline phase and an amorphous phase by at least one of optical means and electrical means; and
   at least one crystalline nucleation layer that contains at least one element selected from Bi and Te and at least one element (M1) selected from Sc, Y, Nd, Sm, Gd, Tb, Dy, Ho, Er, Yb, and Lu, and is provided in contact with the recording layer,
   wherein the recording layer contains at least one element (M2) selected from Sb and Bi, Ge, and Te, and where the element M2, Ge, and Te are represented by a composition formula $Ge_a(M2)_b Te_{3+a}$,
   $2 \leq a \leq 50$ and
   $2 \leq b \leq 4$ are satisfied.

2. An information recording medium including a substrate and an information layer arranged on the substrate, the information layer comprising:
   a recording layer that is changed in phase reversibly between a crystalline phase and an amorphous phase by at least one of optical means and electrical means; and
   at least one crystalline nucleation layer that contains at least one element selected from Bi and Te and at least one element (M1) selected from Sc, Y, Nd, Sm, Gd, Tb, Dy, Ho, Er, Yb, and Lu, and is provided in contact with the recording layer,
   wherein the recording layer contains Sb, Te, and at least one element (M5) selected from Ag, In, Ge, Sn, Se, Si, Au, and Mn, and where Sb, Te, and the element M5 are represented by a composition formula $(Sb_d Te_{100-d})_{100-e}(M5)_e$,
   $50 \leq d \leq 95$ and
   $0 < e \leq 20$ are satisfied.

3. The information recording medium according to claim 1, wherein the crystalline nucleation layer contains at least one selected from Bi(M1) and Te(M1).

4. The information recording medium according to claim 1, wherein the crystalline nucleation layer contains at least one selected from $BiTe(M1)_2$, $Bi_2Te(M1)$, and $BiTe_2(M1)$.

5. The information recording medium according to claim 1, wherein the crystalline nucleation layer contains at least one element selected from N and O.

6. The information recording medium according to claim 1, wherein in the composition formula $Ge_a(M2)_bTe_{3+a}$, at least one element (M3) selected from, Sn and Pb is substituted for at least a part of Ge.

7. The information recording medium according to claim 1, wherein in the recording layer, the element M2 is Sb, and Bi is substituted for at least a part of Sb.

8. The information recording medium according to claim 6, wherein in the recording layer, a content ratio of Sn atoms is more than 0 atom % and less than 20 atom %.

9. The information recording medium according to claim 7, wherein in the recording layer, a content ratio of Bi atoms is more than 0 atom % and less than 10 atom %.

10. The information recording medium according to claim 1, wherein the recording layer further contains at least one element (M4) selected from Si, Ti, V, Cr, Mn, Fe, Ce, Ni, Cu, Se, Zr, Nb, Mo, Ru, Rh, Pd, Ag, In, Sn, Ta, W, Os, Ir, Pt, and Au, and where the elements M2 and M4, Ge, and Te are represented by a composition formula $(Ge_a(M2)_b Te_{3+a})_{100-c}(M4)_c$,
$2 \leq a \leq 50$,
$2 \leq b \leq 4$, and
$0 < c \leq 20$ are satisfied.

11. The information recording medium according to claim 1, wherein the crystalline nucleation layer has a thickness not less than 0.2 nm and not more than 3 nm.

12. The information recording medium according to claim 1, wherein the recording layer has a thickness not less than 3 nm and not more than 14 nm.

13. The information recording medium according to claim 1, the medium having a multi-layer structure in which a first to an N-th information layers (N represents a natural number not smaller than 2) are laminated, wherein at least one of the first to N-th information layers is the information layer.

14. The information recording medium according to claim 1,
wherein the recording layer is changed in phase reversibly between a crystalline phase and art amorphous phase by irradiation of a laser beam, and
the information layer further comprises a dielectric layer provided on both sides of a laminated body formed of the recording layer and the crystalline nucleation layer, and a reflective layer arranged on a side opposite to an incident side of the laser beam with respect to the laminated body.

15. The information recording medium according to claim 14, wherein the information layer further comprises a light absorption correction layer arranged between the laminated body and the reflective layer.

16. The information recording medium according to claim 1,
wherein the recording layer is changed in phase reversibly between a crystalline phase and an amorphous phase by irradiation of a laser beam,
the information layer comprises at least a first dielectric layer, a second dielectric layer, the recording layer, a third dielectric layer, and a reflective layer in this order from an incident side of the laser beam, and
the crystalline nucleation layer is formed at least one of between the second dielectric layer and the recording layer and between the third dielectric layer and the recording layer.

17. The information recording medium according to claim 16, wherein the information layer further comprises a fourth dielectric layer provided between the third dielectric layer and the reflective layer.

18. The information recording medium according to claim 16, wherein the information layer further comprises an interface layer that is provided between the third dielectric layer and the reflective layer and has a thermal conductivity lower than that of the reflective layer.

19. The information recording medium according to claim 16, the medium having a multi-layer structure in which a first to an N-th information layers (N represents a natural number not smaller than 2) on which information is recorded by irradiation of a laser beam are laminated in this order from an incident side of the laser beam,
wherein at least the first information layer is the information layer.

20. The information recording medium according to claim 19, wherein the information layer further includes a transmittance adjusting layer and the transmittance adjusting layer contains at least one selected from $TiO_2$, $ZrO_2$, $ZnO$, $Nb_2O_5$, $Ta_2O_5$, $SiO_2$, $Al_2O_3$, $Bi_2O_3$, $Cr_2O_3$, Sr—O, Ti—N, Zr—N, Nb—N, Ta—N, Si—N, Ge—N, Cr—N, Al—N, Ge—Si—N, Ge—Cr—N, and ZnS.

21. The information recording medium according to claim 17, wherein the fourth dielectric layer contains $(ZnS)_{80}(SiO_2)_{20}$.

22. The information recording medium according to claim 16, wherein the third dielectric layer is formed of an oxide-fluoride-based material containing at least one selected from $HfO_2$ and $ZrO_2$, $SiO_2$, $Cr_2O_3$, and a fluoride.

23. The information recording medium according to claim 22, wherein the fluoride contains at least one selected from $CeF_3$, $ErF_3$, $GdF_3$, $LaF_3$, $TbF_3$, $DyF_3$, $NdF_3$, $YF_3$, and $YbF_3$.

24. The information recording medium according to claim 22, wherein where the oxide-fluoride-based material is represented by a composition formula $(HfO_2)_{A1}(SiO_2)_{B1}(Cr_2O_3)_{C1}(fluoride)_{100-A1-B1-C1}$ or $(ZrO_2)_{A1}(SiO_2)_{B1}(Cr_2O_3)_{C1}(fluoride)_{100-A1-B1-C1}$,
A1, B1, C1, and A1+B1+C1 satisfy:
$10 \leq A1 \leq 50$;
$10 \leq B1 \leq 50$;
$10 \leq C1 \leq 50$; and
$50 \leq A1+B1+C1 \leq 90$, respectively.

25. The information recording medium according to claim 16, wherein at least one of the second dielectric layer and the third dielectric layer is formed of an oxide-based material containing at least one selected from $HfO_2$ and $ZrO_2$, $SiO_2$, and $Cr_2O_3$.

26. The information recording medium according to claim 25, wherein where the oxide-based material is represented by a composition formula $(HfO_2)_{A2}(SiO_2)_{B2}(Cr_2O_3)_{100-A2-B2}$ or $(ZrO_2)_{A2}(SiO_2)_{B2}(Cr_2O_3)_{100-A2-B2}$,
A2, B2, and A2+B2 satisfy:
$10 \leq A2 \leq 50$;
$10 \leq B2 \leq 50$; and
$20 \leq A2+B2 \leq 80$, respectively.

27. A method for manufacturing an information recording medium that is provided with at least one information layer on a substrate,
wherein a step of forming the information layer comprises:
a step of forming a recording layer that is changed in phase reversibly between a crystalline phase and an amorphous phase by at least one of optical means and electrical means and contains at least one element (M2) selected from Sb and Bi, Ge, and Te, wherein where the element M2, Ge, and Te are represented by a composition formula $Ge_a(M2)_bTe_{3+a}$, $2 \leq a \leq 50$ and $2 \leq b \leq 4$ are satisfied; and a step of forming a crystalline nucleation layer by performing sputtering using a sputtering target containing at least one element selected from Bi and Te and at least one element (M1) selected from Sc, Y, Nd, Sm, Gd, Tb, Dy, Ho, Er, Yb, and Lu, and the step of forming the recording layer and the step of forming the crystalline nucleation layer are performed sequentially.

28. The method for manufacturing an information recording medium according to claim 27, wherein the sputtering target contains at least one selected from Bi(M1) and Te(M1).

29. The method for manufacturing an information recording medium according to claim 27, wherein the sputtering target contains at least one selected from $BiTe(M1)_2$, $Bi_2Te(M1)$, and $BiTe_2(M1)$.

30. The method for manufacturing an information recording medium according to claim 27, wherein in the step of forming the crystalline nucleation layer, at least one selected from Ar gas, Kr gas, a mixture of Ar gas and a reactive gas, and a mixture of Kr gas and a reactive gas is used in performing sputtering, the reactive gas being at least one selected from $N_2$ gas and $O_2$ gas.

* * * * *